US012521523B2

United States Patent
Ogle et al.

(10) Patent No.: US 12,521,523 B2
(45) Date of Patent: *Jan. 13, 2026

(54) CATHETER SYSTEMS FOR APPLYING EFFECTIVE SUCTION IN REMOTE VESSELS AND THROMBECTOMY PROCEDURES FACILITATED BY CATHETER SYSTEMS

(71) Applicant: Route 92 Medical, Inc., San Mateo, CA (US)

(72) Inventors: Matthew F. Ogle, Edina, MN (US); James Alexander, Excelsior, MN (US); Alexander Halaszyn, St. Paul, MN (US)

(73) Assignee: Route 92 Medical, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,299

(22) Filed: Aug. 25, 2023

(65) Prior Publication Data

US 2023/0405272 A1 Dec. 21, 2023

Related U.S. Application Data

(63) Continuation of application No. 16/877,796, filed on May 19, 2020, now Pat. No. 11,786,699, which is a
(Continued)

(51) Int. Cl.
*A61M 25/00* (2006.01)
*A61B 17/00* (2006.01)
(Continued)

(52) U.S. Cl.
CPC ......... *A61M 25/0074* (2013.01); *A61B 17/22* (2013.01); *A61M 1/84* (2021.05);
(Continued)

(58) Field of Classification Search
CPC ............... A61B 2017/00991; A61B 2217/005; A61M 25/0074; A61M 25/09
See application file for complete search history.

(56) References Cited

U.S. PATENT DOCUMENTS

| 2,623,520 A | 12/1952 | Bamford, Jr. et al. |
| 2,730,101 A | 1/1956 | Hoffman |
| (Continued) | | |

FOREIGN PATENT DOCUMENTS

| CN | 101121055 A | 2/2008 |
| CN | 101588835 A | 11/2009 |
| (Continued) | | |

OTHER PUBLICATIONS

Endovascular Today, "First Stroke Patients Treated With Insera's Clear Cyclical Aspiration System", www.evtoday.com/news/first-stroke-patients-treated-with-inseras-clear-cyclical-aspiration-system, (Oct. 7, 2019). (Abstract Only).
(Continued)

*Primary Examiner* — Darwin P Erezo
*Assistant Examiner* — Raihan R Khandker
(74) *Attorney, Agent, or Firm* — Mintz Levin Cohn Ferris Glovsky and Popeo, P.C.

(57) ABSTRACT

A suction catheter system is described with a suction nozzle that can extend from a guide catheter of the like. The suction nozzle can be positioned by tracking the suction nozzle through a vessel while moving a proximal portion of the suction extension within the lumen of the guide catheter. A suction lumen extends from the proximal end of the guide catheter through at least part of the guide catheter central lumen and through the suction tip. Desirable suction flow can be established using the guide lumen to facilitate the suction. Also, a delivery catheter is described with an elastic tip that can track closely over a guidewire. The elastic tip of
(Continued)

the delivery catheter can be expanded to provide for the delivery of medical devices past the tip.

22 Claims, 13 Drawing Sheets

Related U.S. Application Data continuation of application No. 14/949,574, filed on Nov. 23, 2015, now Pat. No. 10,716,915.

(51) Int. Cl.
| | |
|---|---|
| *A61B 17/22* | (2006.01) |
| *A61M 1/00* | (2006.01) |
| *A61M 25/01* | (2006.01) |
| *A61M 25/09* | (2006.01) |
| *A61M 25/10* | (2013.01) |
| *A61B 17/221* | (2006.01) |

(52) U.S. Cl.
CPC ............ *A61M 25/09* (2013.01); *A61M 25/10* (2013.01); *A61B 2017/00991* (2013.01); *A61B 17/22032* (2013.01); *A61B 2017/22079* (2013.01); *A61B 2017/2212* (2013.01); *A61B 2217/005* (2013.01); *A61M 2025/0004* (2013.01); *A61M 2025/0006* (2013.01); *A61M 25/0068* (2013.01); *A61M 2025/0175* (2013.01)

(56) References Cited

U.S. PATENT DOCUMENTS

| | | | |
|---|---|---|---|
| 3,589,368 A | 6/1971 | Jackson et al. |
| 3,612,050 A | 10/1971 | Sheridan |
| 3,631,848 A | 1/1972 | Muller |
| 3,949,757 A | 4/1976 | Sabel |
| 3,996,938 A | 12/1976 | Clark, III |
| 4,013,080 A | 3/1977 | Froning |
| 4,020,829 A | 5/1977 | Wilson et al. |
| 4,033,331 A | 7/1977 | Guss et al. |
| 4,174,715 A | 11/1979 | Hasson |
| 4,319,580 A | 3/1982 | Colley et al. |
| 4,323,071 A | 4/1982 | Simpson et al. |
| 4,406,656 A | 9/1983 | Hattler et al. |
| 4,571,240 A | 2/1986 | Samson et al. |
| 4,610,662 A | 9/1986 | Weikl et al. |
| 4,619,263 A | 10/1986 | Frisbie et al. |
| 4,676,249 A | 6/1987 | Arenas et al. |
| 4,723,549 A | 2/1988 | Wholey et al. |
| 4,728,319 A | 3/1988 | Masch |
| 4,739,768 A | 4/1988 | Engleson |
| 4,762,128 A | 8/1988 | Rosenbluth |
| 4,771,777 A | 9/1988 | Horzewski et al. |
| 4,784,636 A | 11/1988 | Rydell |
| 4,790,812 A | 12/1988 | Hawkins, Jr. et al. |
| 4,794,928 A | 1/1989 | Kletschka |
| 4,795,434 A | 1/1989 | Kujawski |
| 4,798,012 A | 1/1989 | Pasquier |
| 4,799,496 A | 1/1989 | Hargreaves et al. |
| 4,834,709 A | 5/1989 | Banning et al. |
| 4,840,690 A | 6/1989 | Melinyshyn et al. |
| 4,863,431 A | 9/1989 | Vaillancourt |
| 4,865,581 A | 9/1989 | Lundquist et al. |
| 4,873,978 A | 10/1989 | Ginsburg |
| 4,873,979 A | 10/1989 | Ginsburg |
| 4,883,460 A | 11/1989 | Zanetti |
| 4,887,613 A | 12/1989 | Farr et al. |
| 4,898,575 A | 2/1990 | Fischell et al. |
| 4,900,303 A | 2/1990 | Lemelson |
| 4,921,478 A | 5/1990 | Solano et al. |
| 4,921,479 A | 5/1990 | Grayzel |
| 4,921,484 A | 5/1990 | Hillstead |
| 4,923,462 A | 5/1990 | Stevens |
| 4,946,440 A | 8/1990 | Hall |
| 4,946,443 A | 8/1990 | Hauser et al. |
| 4,994,033 A | 2/1991 | Shockey et al. |
| 4,994,067 A | 2/1991 | Summers |
| 4,998,919 A | 3/1991 | Schnepp-Pesch et al. |
| 5,011,488 A | 4/1991 | Ginsburg |
| 5,011,490 A | 4/1991 | Fischell et al. |
| 5,053,008 A | 10/1991 | Bajaj |
| 5,059,178 A | 10/1991 | Ya |
| 5,102,415 A | 4/1992 | Guenther et al. |
| 5,103,827 A | 4/1992 | Smith |
| 5,108,419 A | 4/1992 | Reger et al. |
| 5,135,484 A | 8/1992 | Wright |
| 5,152,277 A | 10/1992 | Honda et al. |
| 5,161,534 A | 11/1992 | Berthaume |
| 5,163,906 A | 11/1992 | Ahmadi |
| 5,185,004 A | 2/1993 | Lashinski |
| 5,188,621 A | 2/1993 | Samson |
| 5,200,248 A | 4/1993 | Thompson et al. |
| 5,207,648 A | 5/1993 | Gross |
| 5,211,651 A | 5/1993 | Reger et al. |
| 5,217,705 A | 6/1993 | Reno et al. |
| 5,219,332 A | 6/1993 | Nelson et al. |
| 5,243,997 A | 9/1993 | Uflacker et al. |
| 5,250,060 A | 10/1993 | Carbo et al. |
| 5,257,979 A | 11/1993 | Jagpal |
| 5,263,938 A | 11/1993 | Orr et al. |
| 5,267,960 A | 12/1993 | Hayman et al. |
| 5,269,297 A | 12/1993 | Weng et al. |
| 5,303,714 A | 4/1994 | Abele et al. |
| 5,308,318 A | 5/1994 | Plassche, Jr. |
| 5,312,338 A | 5/1994 | Nelson et al. |
| 5,312,356 A | 5/1994 | Engelson et al. |
| RE34,633 E | 6/1994 | Sos et al. |
| 5,318,032 A | 6/1994 | Lonsbury et al. |
| 5,321,338 A | 6/1994 | Nuckolls et al. |
| 5,324,262 A | 6/1994 | Fischell et al. |
| 5,325,868 A | 7/1994 | Kimmelstiel |
| 5,328,471 A | 7/1994 | Slepian |
| 5,334,160 A | 8/1994 | Ellis |
| 5,338,300 A | 8/1994 | Cox |
| 5,352,197 A | 10/1994 | Hammersmark et al. |
| 5,364,358 A | 11/1994 | Hweitt et al. |
| 5,370,623 A | 12/1994 | Kreamer |
| 5,380,284 A | 1/1995 | Don Michael |
| 5,385,562 A | 1/1995 | Adams et al. |
| 5,391,152 A | 2/1995 | Patterson |
| 5,392,778 A | 2/1995 | Horzewski |
| 5,395,383 A | 3/1995 | Adams et al. |
| 5,413,575 A | 5/1995 | Haenggi |
| 5,423,331 A | 6/1995 | Wysham |
| 5,429,605 A | 7/1995 | Richling: Bernd et al. |
| 5,437,632 A | 8/1995 | Engelson |
| 5,438,993 A | 8/1995 | Lynch et al. |
| 5,441,051 A | 8/1995 | Hileman et al. |
| 5,443,454 A | 8/1995 | Tanabe et al. |
| 5,454,788 A | 10/1995 | Walker et al. |
| 5,454,795 A | 10/1995 | Samson |
| 5,465,716 A | 11/1995 | Avitall |
| 5,466,222 A | 11/1995 | Ressemann et al. |
| 5,476,450 A | 12/1995 | Ruggio |
| 5,484,407 A | 1/1996 | Osypka |
| 5,484,412 A | 1/1996 | Pierpont |
| 5,484,418 A | 1/1996 | Quiachon et al. |
| 5,485,667 A | 1/1996 | Kleshinski |
| 5,490,859 A | 2/1996 | Mische et al. |
| 5,492,530 A | 2/1996 | Fischell et al. |
| 5,496,294 A | 3/1996 | Hergenrother et al. |
| 5,499,975 A | 3/1996 | Cope et al. |
| 5,501,694 A | 3/1996 | Resseman et al. |
| 5,522,836 A | 6/1996 | Palermo |
| 5,527,292 A | 6/1996 | Adams et al. |
| 5,531,715 A | 7/1996 | Engelson et al. |
| 5,533,967 A | 7/1996 | Irman |
| 5,538,512 A | 7/1996 | Zenzon et al. |
| 5,542,936 A | 8/1996 | Razi |
| 5,542,937 A | 8/1996 | Chee et al. |
| 5,546,958 A | 8/1996 | Thorud et al. |

(56) References Cited

U.S. PATENT DOCUMENTS

| | | |
|---|---|---|
| 5,549,119 A | 8/1996 | Solar |
| 5,549,601 A | 8/1996 | McIntyre et al. |
| 5,549,626 A | 8/1996 | Miller et al. |
| 5,558,635 A | 9/1996 | Cannon |
| 5,571,122 A | 11/1996 | Kelly et al. |
| 5,573,520 A | 11/1996 | Schwartz et al. |
| 5,578,009 A | 11/1996 | Kraus et al. |
| 5,591,194 A | 1/1997 | Berthiaume |
| 5,599,307 A | 2/1997 | Bacher et al. |
| 5,599,326 A | 2/1997 | Carter |
| 5,603,698 A | 2/1997 | Roberts et al. |
| 5,628,754 A | 5/1997 | Shevlin et al. |
| 5,643,254 A | 7/1997 | Scheldrup et al. |
| 5,658,263 A | 8/1997 | Dang et al. |
| 5,658,264 A | 8/1997 | Samson |
| 5,658,309 A | 8/1997 | Berthiaume et al. |
| 5,662,622 A | 9/1997 | Gore et al. |
| 5,667,499 A | 9/1997 | Welch et al. |
| 5,676,659 A | 10/1997 | McGurk |
| 5,682,894 A | 11/1997 | Orr et al. |
| 5,693,029 A | 12/1997 | Leonhardt |
| 5,695,483 A | 12/1997 | Samson |
| 5,702,373 A | 12/1997 | Samson |
| 5,702,439 A | 12/1997 | Keith et al. |
| 5,707,376 A | 1/1998 | Kavteladze et al. |
| 5,720,764 A | 2/1998 | Naderlinger |
| 5,730,734 A | 3/1998 | Adams et al. |
| 5,749,849 A | 5/1998 | Engelson |
| 5,749,858 A | 5/1998 | Cramer |
| 5,766,191 A | 6/1998 | Trerotola |
| 5,776,141 A | 7/1998 | Klein et al. |
| 5,776,142 A | 7/1998 | Gunderson |
| 5,794,629 A | 8/1998 | Frazee |
| 5,795,341 A | 8/1998 | Samson |
| 5,810,869 A | 9/1998 | Kaplan et al. |
| 5,810,874 A | 9/1998 | Lefebvre |
| 5,814,064 A | 9/1998 | Daniel et al. |
| 5,817,101 A | 10/1998 | Fiedler |
| 5,827,229 A | 10/1998 | Auth et al. |
| 5,827,242 A | 10/1998 | Follmer et al. |
| 5,833,650 A | 11/1998 | Imran |
| 5,836,868 A | 11/1998 | Resseman et al. |
| 5,836,926 A | 11/1998 | Peterson et al. |
| 5,836,955 A | 11/1998 | Buelna et al. |
| 5,838,645 A | 11/1998 | Hirokane et al. |
| 5,843,002 A | 12/1998 | Pecor et al. |
| 5,843,051 A | 12/1998 | Adams et al. |
| 5,843,103 A | 12/1998 | Wulfman |
| 5,846,251 A | 12/1998 | Hart |
| 5,851,189 A | 12/1998 | Forber |
| 5,851,210 A | 12/1998 | Torossian |
| 5,853,400 A | 12/1998 | Samson |
| 5,876,367 A | 3/1999 | Kaganov et al. |
| 5,876,386 A | 3/1999 | Samson |
| 5,882,329 A | 3/1999 | Patterson et al. |
| 5,882,334 A | 3/1999 | Sepetka et al. |
| 5,885,209 A | 3/1999 | Green |
| 5,891,114 A | 4/1999 | Chien et al. |
| 5,895,399 A | 4/1999 | Barbut et al. |
| 5,897,567 A | 4/1999 | Resseman et al. |
| 5,899,890 A | 5/1999 | Chiang et al. |
| 5,899,892 A | 5/1999 | Mortier et al. |
| 5,908,407 A | 6/1999 | Frazee et al. |
| 5,910,154 A | 6/1999 | Tsguita et al. |
| 5,911,725 A | 6/1999 | Boury |
| 5,911,734 A | 6/1999 | Tsguita et al. |
| 5,913,848 A | 6/1999 | Luther et al. |
| 5,916,192 A | 6/1999 | Nita et al. |
| 5,916,208 A | 6/1999 | Luther et al. |
| 5,921,952 A | 7/1999 | Desmond, III et al. |
| 5,928,192 A | 7/1999 | Maahs |
| 5,928,260 A | 7/1999 | Chin et al. |
| 5,935,122 A | 8/1999 | Fourkas et al. |
| 5,935,139 A | 8/1999 | Bates |
| 5,938,645 A | 8/1999 | Gordon |
| 5,941,869 A | 8/1999 | Patterson et al. |
| 5,957,882 A | 9/1999 | Nita et al. |
| 5,972,019 A | 10/1999 | Engleson et al. |
| 5,976,093 A | 11/1999 | Jang |
| 5,976,120 A | 11/1999 | Chow et al. |
| 5,976,178 A | 11/1999 | Goldsteen et al. |
| 5,997,508 A | 12/1999 | Lunn et al. |
| 5,997,523 A | 12/1999 | Jang |
| 5,997,557 A | 12/1999 | Barbut et al. |
| 6,004,310 A | 12/1999 | Bardsley et al. |
| 6,007,530 A | 12/1999 | Dornhofer et al. |
| 6,010,522 A | 1/2000 | Barbut et al. |
| 6,013,085 A | 1/2000 | Howard |
| 6,022,336 A | 2/2000 | Zadno-Azizi et al. |
| 6,022,340 A | 2/2000 | Sepetka et al. |
| 6,030,349 A | 2/2000 | Wilson et al. |
| 6,030,369 A | 2/2000 | Engleson et al. |
| 6,033,388 A | 3/2000 | Nordstrom et al. |
| 6,044,845 A | 4/2000 | Lewis |
| 6,053,903 A | 4/2000 | Samson |
| 6,053,904 A | 4/2000 | Scribner et al. |
| 6,066,149 A | 5/2000 | Samson et al. |
| 6,071,263 A | 6/2000 | Kirkman |
| 6,074,357 A | 6/2000 | Kaganov et al. |
| 6,074,398 A | 6/2000 | Leschinsky |
| 6,090,072 A | 7/2000 | Kratoska et al. |
| 6,090,118 A | 7/2000 | McGuckin, Jr. |
| 6,106,530 A | 8/2000 | Harada |
| 6,110,139 A | 8/2000 | Loubser |
| 6,117,141 A | 9/2000 | Ouchi |
| 6,120,480 A | 9/2000 | Zhang et al. |
| 6,135,991 A | 10/2000 | Muni et al. |
| 6,139,524 A | 10/2000 | Killion |
| 6,142,958 A | 11/2000 | Hammarstrom et al. |
| 6,142,987 A | 11/2000 | Tsugita |
| 6,146,370 A | 11/2000 | Barbut |
| 6,146,373 A | 11/2000 | Cragg et al. |
| 6,146,396 A | 11/2000 | Konya et al. |
| 6,146,415 A | 11/2000 | Fitz |
| 6,152,909 A | 11/2000 | Bagaoisan et al. |
| 6,152,912 A | 11/2000 | Jansen et al. |
| 6,156,005 A | 12/2000 | Theron |
| 6,159,195 A | 12/2000 | Ha et al. |
| 6,159,230 A | 12/2000 | Samuels |
| 6,161,547 A | 12/2000 | Barbut |
| 6,165,163 A | 12/2000 | Chien et al. |
| 6,165,167 A | 12/2000 | Delaloye |
| 6,165,199 A | 12/2000 | Barbut |
| 6,168,579 B1 | 1/2001 | Tsugita |
| 6,171,295 B1 | 1/2001 | Garabedian et al. |
| 6,171,296 B1 | 1/2001 | Chow |
| 6,176,844 B1 | 1/2001 | Lee |
| 6,197,016 B1 | 3/2001 | Fourkas et al. |
| 6,203,561 B1 | 3/2001 | Ramee et al. |
| 6,206,868 B1 | 3/2001 | Parodi |
| 6,210,370 B1 | 4/2001 | Chi-Sing et al. |
| 6,221,038 B1 | 4/2001 | Brisken |
| 6,221,049 B1 | 4/2001 | Selmon et al. |
| 6,228,046 B1 | 5/2001 | Brisken |
| 6,228,052 B1 | 5/2001 | Pohndorf |
| 6,234,971 B1 | 5/2001 | Jang |
| 6,238,402 B1 | 5/2001 | Sullivan, III et al. |
| 6,238,412 B1 | 5/2001 | Dubrul et al. |
| 6,238,430 B1 | 5/2001 | Klumb et al. |
| 6,240,231 B1 | 5/2001 | Ferrera et al. |
| 6,254,628 B1 | 7/2001 | Wallace et al. |
| 6,258,052 B1 | 7/2001 | Milo |
| 6,258,080 B1 | 7/2001 | Samson |
| 6,258,115 B1 | 7/2001 | Dubrul |
| 6,270,477 B1 | 8/2001 | Bagaoisna et al. |
| 6,277,115 B1 | 8/2001 | Saadat |
| 6,277,139 B1 | 8/2001 | Levinson et al. |
| 6,287,319 B1 | 9/2001 | Aboul-Hosn et al. |
| 6,295,989 B1 | 10/2001 | Connors, III |
| 6,295,990 B1 | 10/2001 | Lewis et al. |
| 6,306,106 B1 | 10/2001 | Boyle |
| 6,306,163 B1 | 10/2001 | Fitz |
| 6,309,379 B1 | 10/2001 | Willard et al. |
| 6,346,116 B1 | 2/2002 | Brooks et al. |

(56) References Cited

U.S. PATENT DOCUMENTS

| | | |
|---|---|---|
| 6,355,027 B1 | 3/2002 | Le et al. |
| 6,361,545 B1 | 3/2002 | Macoviak et al. |
| 6,364,894 B1 | 4/2002 | Healy et al. |
| 6,364,900 B1 | 4/2002 | Heuser |
| 6,368,316 B1 | 4/2002 | Jansen et al. |
| 6,368,338 B1 | 4/2002 | Konya et al. |
| 6,368,344 B1 | 4/2002 | Fitz |
| 6,379,325 B1 | 4/2002 | Benett et al. |
| 6,383,172 B1 | 5/2002 | Barbut |
| 6,391,044 B1 | 5/2002 | Yadav et al. |
| 6,394,976 B1 | 5/2002 | Winston et al. |
| 6,413,235 B1 | 7/2002 | Parodi |
| 6,423,032 B2 | 7/2002 | Parodi |
| 6,423,086 B1 | 7/2002 | Barbut et al. |
| 6,428,531 B1 | 8/2002 | Visuri et al. |
| 6,435,189 B1 | 8/2002 | Lewis et al. |
| 6,436,087 B1 | 8/2002 | Lewis et al. |
| 6,451,005 B1 | 9/2002 | Saitou et al. |
| 6,454,741 B1 | 9/2002 | Muni et al. |
| 6,454,775 B1 | 9/2002 | Demarais et al. |
| 6,458,151 B1 | 10/2002 | Saltiel |
| 6,464,664 B1 | 10/2002 | Jonkman et al. |
| 6,468,219 B1 | 10/2002 | Njemanze |
| 6,475,195 B1 | 11/2002 | Voda |
| 6,475,244 B2 | 11/2002 | Herweck et al. |
| 6,481,439 B1 | 11/2002 | Lewis et al. |
| 6,482,172 B1 | 11/2002 | Thramann |
| 6,482,217 B1 | 11/2002 | Pintor et al. |
| 6,485,466 B2 | 11/2002 | Hamilton |
| 6,485,500 B1 | 11/2002 | Kokish et al. |
| 6,485,501 B1 | 11/2002 | Green |
| 6,508,824 B1 | 1/2003 | Flaherty et al. |
| 6,511,470 B1 | 1/2003 | Hamilton |
| 6,511,471 B2 | 1/2003 | Rosenman et al. |
| 6,514,261 B1 | 2/2003 | Randall et al. |
| 6,514,273 B1 | 2/2003 | Voss et al. |
| 6,517,520 B2 | 2/2003 | Chang et al. |
| 6,524,303 B1 | 2/2003 | Garibaldi |
| 6,527,746 B1 | 3/2003 | Oslund et al. |
| 6,533,800 B1 | 3/2003 | Barbut |
| 6,537,241 B1 | 3/2003 | Odland |
| 6,537,295 B2 | 3/2003 | Petersen |
| 6,540,712 B1 | 4/2003 | Parodi et al. |
| 6,540,768 B1 | 4/2003 | Diaz et al. |
| 6,544,276 B1 | 4/2003 | Azizi |
| 6,549,800 B1 | 4/2003 | Atalar et al. |
| 6,551,268 B1 | 4/2003 | Kaganov et al. |
| 6,551,273 B1 | 4/2003 | Olson et al. |
| 6,551,302 B1 | 4/2003 | Rosinko et al. |
| 6,554,820 B1 | 4/2003 | Wendlandt et al. |
| 6,554,827 B2 | 4/2003 | Chandrasekaran et al. |
| 6,555,057 B1 | 4/2003 | Barbut et al. |
| 6,558,377 B2 | 5/2003 | Lee et al. |
| 6,558,405 B1 | 5/2003 | McInnes |
| 6,562,049 B1 | 5/2003 | Norlander et al. |
| 6,562,052 B2 | 5/2003 | Nobles et al. |
| 6,569,148 B2 | 5/2003 | Bagaoisan et al. |
| 6,579,246 B2 | 6/2003 | Jacobsen et al. |
| 6,579,260 B2 | 6/2003 | Maki et al. |
| 6,579,264 B1 | 6/2003 | Rossi |
| 6,579,484 B1 | 6/2003 | Tierman et al. |
| 6,582,390 B1 | 6/2003 | Sanderson |
| 6,582,396 B1 | 6/2003 | Parodi |
| 6,582,440 B1 | 6/2003 | Brumbach |
| 6,582,448 B1 | 6/2003 | Boyle et al. |
| 6,589,262 B1 | 7/2003 | Honebrink et al. |
| 6,592,616 B1 | 7/2003 | Stack et al. |
| 6,595,953 B1 | 7/2003 | Coppi et al. |
| 6,595,980 B1 | 7/2003 | Barbut |
| 6,596,011 B2 | 7/2003 | Johnson et al. |
| 6,605,074 B2 | 8/2003 | Zadno-Azizi et al. |
| 6,610,077 B1 | 8/2003 | Hancock et al. |
| 6,612,999 B2 | 9/2003 | Brennan et al. |
| 6,616,681 B2 | 9/2003 | Hanson et al. |
| 6,620,148 B1 | 9/2003 | Tsugita |
| 6,622,367 B1 | 9/2003 | Bolduc et al. |
| 6,623,471 B1 | 9/2003 | Barbut |
| 6,623,491 B2 | 9/2003 | Thompson |
| 6,623,518 B2 | 9/2003 | Thompson et al. |
| 6,626,886 B1 | 9/2003 | Barbut |
| 6,632,236 B2 | 10/2003 | Hogendijk |
| 6,635,070 B2 | 10/2003 | Leeflang et al. |
| 6,638,243 B2 | 10/2003 | Kupiecki |
| 6,638,245 B2 | 10/2003 | Miller et al. |
| 6,641,573 B1 | 11/2003 | Parodi |
| 6,645,160 B1 | 11/2003 | Heesch |
| 6,645,222 B1 | 11/2003 | Parodi et al. |
| 6,652,480 B1 | 11/2003 | Imran et al. |
| 6,656,152 B2 | 12/2003 | Putz |
| 6,663,650 B2 | 12/2003 | Sepetka et al. |
| 6,663,652 B2 | 12/2003 | Daniel et al. |
| 6,673,025 B1 | 1/2004 | Richardson et al. |
| 6,676,637 B1 | 1/2004 | Bonnette et al. |
| 6,679,893 B1 | 1/2004 | Tran |
| 6,682,505 B2 | 1/2004 | Bates et al. |
| 6,685,672 B1 | 2/2004 | Forman |
| 6,685,722 B1 | 2/2004 | Rosenbluth et al. |
| 6,689,144 B2 | 2/2004 | Gerberding |
| 6,692,473 B2 | 2/2004 | St. Cyr et al. |
| 6,695,858 B1 | 2/2004 | Dubrul et al. |
| 6,695,865 B2 | 2/2004 | Boyle et al. |
| 6,702,782 B2 | 3/2004 | Miller et al. |
| 6,702,834 B1 | 3/2004 | Boylan et al. |
| 6,706,055 B2 | 3/2004 | Douk et al. |
| 6,711,436 B2 | 3/2004 | Duhaylongsod |
| 6,716,183 B2 | 4/2004 | Clayman et al. |
| 6,719,717 B1 | 4/2004 | Johnson et al. |
| 6,723,064 B2 | 4/2004 | Babaev |
| 6,726,675 B1 | 4/2004 | Beyar |
| 6,730,104 B1 | 5/2004 | Sepetka et al. |
| 6,733,517 B1 | 5/2004 | Collins |
| 6,740,104 B1 | 5/2004 | Solar et al. |
| 6,749,627 B2 | 6/2004 | Thompson et al. |
| 6,755,803 B1 | 6/2004 | Le et al. |
| 6,755,812 B2 | 6/2004 | Peterson et al. |
| 6,755,847 B2 | 6/2004 | Eskuri |
| 6,758,854 B1 | 7/2004 | Butler et al. |
| 6,761,708 B1 | 7/2004 | Chiu et al. |
| 6,764,464 B2 | 7/2004 | McGuckin, Jr. et al. |
| 6,773,448 B2 | 8/2004 | Kusleika et al. |
| 6,790,204 B2 | 9/2004 | Zadno-Azizi et al. |
| 6,805,684 B2 | 10/2004 | Bonnette et al. |
| 6,805,692 B2 | 10/2004 | Muni et al. |
| 6,824,545 B2 | 11/2004 | Sepetka et al. |
| 6,824,550 B1 | 11/2004 | Noriega et al. |
| 6,824,553 B1 | 11/2004 | Samson et al. |
| 6,827,730 B1 | 12/2004 | Leschinsky |
| 6,837,881 B1 | 1/2005 | Barbut |
| 6,840,949 B2 | 1/2005 | Barbut |
| 6,849,068 B1 | 2/2005 | Bagaoisan et al. |
| 6,855,136 B2 | 2/2005 | Dorros et al. |
| 6,866,669 B2 | 3/2005 | Buzzard et al. |
| 6,878,151 B2 | 4/2005 | Carrison et al. |
| 6,879,854 B2 | 4/2005 | Windheuser et al. |
| 6,884,235 B2 | 4/2005 | McGuckin, Jr. et al. |
| 6,902,540 B2 | 6/2005 | Dorros et al. |
| 6,905,490 B2 | 6/2005 | Parodi |
| 6,905,505 B2 | 6/2005 | Nash et al. |
| 6,908,474 B2 | 6/2005 | Hogendijk et al. |
| 6,911,036 B2 | 6/2005 | Douk et al. |
| 6,926,658 B2 | 8/2005 | Farnan |
| 6,929,632 B2 | 8/2005 | Nita et al. |
| 6,929,634 B2 | 8/2005 | Dorros et al. |
| 6,936,060 B2 | 8/2005 | Hogendijk et al. |
| 6,945,956 B2 | 9/2005 | Waldhauser et al. |
| 6,949,104 B2 | 9/2005 | Griffis et al. |
| 6,951,570 B2 | 10/2005 | Linder et al. |
| 6,958,059 B2 | 10/2005 | Zadno-Azizi |
| 6,960,189 B2 | 11/2005 | Bates et al. |
| 6,969,395 B2 | 11/2005 | Eskuri |
| 6,972,030 B2 | 12/2005 | Lee et al. |
| 6,977,068 B1 | 12/2005 | Nair et al. |
| 6,991,642 B2 | 1/2006 | Petersen |
| 6,995,858 B2 | 2/2006 | Murakami et al. |

(56) References Cited

U.S. PATENT DOCUMENTS

| | | |
|---|---|---|
| 7,001,400 B1 | 2/2006 | Modesitt et al. |
| 7,004,924 B1 | 2/2006 | Brugger et al. |
| 7,004,931 B2 | 2/2006 | Hogendijk |
| 7,004,952 B2 | 2/2006 | Nobles et al. |
| 7,022,100 B1 | 4/2006 | Aboul-Hosn et al. |
| 7,029,488 B2 | 4/2006 | Schonholz et al. |
| 7,033,325 B1 | 4/2006 | Sullivan |
| 7,033,336 B2 | 4/2006 | Hogendijk |
| 7,033,344 B2 | 4/2006 | Imran |
| 7,037,267 B1 | 5/2006 | Lipson et al. |
| 7,048,758 B2 | 5/2006 | Boyle et al. |
| 7,052,500 B2 | 5/2006 | Bashiri et al. |
| 7,056,328 B2 | 6/2006 | Arnott |
| 7,063,714 B2 | 6/2006 | Dorros et al. |
| 7,083,594 B2 | 8/2006 | Coppi |
| 7,104,979 B2 | 9/2006 | Jansen et al. |
| 7,108,677 B2 | 9/2006 | Courtney et al. |
| 7,115,134 B2 | 10/2006 | Chambers |
| 7,115,138 B2 | 10/2006 | Renati et al. |
| 7,118,539 B2 | 10/2006 | Vrba et al. |
| 7,144,386 B2 | 12/2006 | Korkor et al. |
| 7,150,712 B2 | 12/2006 | Buehlmann et al. |
| 7,152,605 B2 | 12/2006 | Khairkhahan et al. |
| 7,166,088 B2 | 1/2007 | Heuser |
| 7,166,120 B2 | 1/2007 | Kusleika |
| 7,169,165 B2 | 1/2007 | Belef et al. |
| 7,172,621 B2 | 2/2007 | Theron |
| 7,172,623 B2 | 2/2007 | Hansen et al. |
| 7,220,271 B2 | 5/2007 | Clubb et al. |
| 7,223,253 B2 | 5/2007 | Hogendijk |
| 7,229,431 B2 | 6/2007 | Houser et al. |
| 7,229,463 B2 | 6/2007 | Sutton et al. |
| 7,229,464 B2 | 6/2007 | Hanson et al. |
| 7,232,452 B2 | 6/2007 | Adams et al. |
| 7,235,061 B2 | 6/2007 | Tsugita |
| 7,242,977 B2 | 7/2007 | Partridge et al. |
| 7,250,042 B2 | 7/2007 | Kataishi et al. |
| 7,285,126 B2 | 10/2007 | Septka et al. |
| 7,306,585 B2 | 12/2007 | Ross |
| 7,309,334 B2 | 12/2007 | von Hoffman et al. |
| 7,316,678 B2 | 1/2008 | Nash et al. |
| 7,329,278 B2 | 2/2008 | Segiun et al. |
| 7,367,982 B2 | 5/2008 | Nash et al. |
| 7,374,560 B2 | 5/2008 | Ressemann et al. |
| 7,374,561 B2 | 5/2008 | Barbut |
| 7,374,564 B2 | 5/2008 | Brown |
| 7,381,200 B2 | 6/2008 | Katoh et al. |
| 7,384,412 B2 | 6/2008 | Coppi |
| 7,402,151 B2 | 7/2008 | Rosenman et al. |
| 7,422,579 B2 | 9/2008 | Wahr et al. |
| 7,449,010 B1 | 11/2008 | Hayase et al. |
| 7,458,980 B2 | 12/2008 | Barbut |
| 7,473,271 B2 | 1/2009 | Gunderson |
| 7,476,232 B2 | 1/2009 | Deal |
| 7,497,844 B2 | 3/2009 | Spear et al. |
| 7,507,229 B2 | 3/2009 | Hewitt et al. |
| 7,524,303 B1 | 4/2009 | Don Michael et al. |
| 7,534,250 B2 | 5/2009 | Schaeffer et al. |
| 7,537,568 B2 | 5/2009 | Moehring |
| 7,549,974 B2 | 6/2009 | Nayak |
| 7,558,622 B2 | 7/2009 | Tran |
| 7,604,612 B2 | 10/2009 | Ressemann et al. |
| 7,615,042 B2 | 11/2009 | Beyar et al. |
| 7,625,207 B2 | 12/2009 | Hershey et al. |
| 7,691,121 B2 | 4/2010 | Rosenbluth et al. |
| 7,717,934 B2 | 5/2010 | Kusleika |
| 7,731,683 B2 | 6/2010 | Jang et al. |
| 7,736,355 B2 | 6/2010 | Itou et al |
| 7,766,049 B2 | 8/2010 | Miller et al. |
| 7,766,820 B2 | 8/2010 | Core |
| 7,771,358 B2 | 8/2010 | Moehring et al. |
| 7,785,286 B2 | 8/2010 | Magnin et al. |
| 7,803,136 B2 | 9/2010 | Schatz |
| 7,806,906 B2 | 10/2010 | Don Michael |
| 7,815,626 B1 | 10/2010 | McFadden et al. |
| 7,837,692 B2 | 11/2010 | Mulholland et al. |
| 7,842,055 B2 | 11/2010 | Pintor et al. |
| 7,842,065 B2 | 11/2010 | Belef et al. |
| 7,850,642 B2 | 12/2010 | Moll et al. |
| 7,850,654 B2 | 12/2010 | Belhe et al. |
| 7,854,746 B2 | 12/2010 | Dorn et al. |
| 7,867,216 B2 | 1/2011 | Wahr et al. |
| 7,879,062 B2 | 2/2011 | Galdonik et al. |
| 7,905,856 B2 | 3/2011 | McGuckin, Jr. et al. |
| 7,905,877 B1 | 3/2011 | Jimenez et al. |
| 7,905,891 B2 | 3/2011 | Self |
| 7,909,812 B2 | 3/2011 | Jansen et al. |
| 7,927,309 B2 | 4/2011 | Palm |
| 7,927,347 B2 | 4/2011 | Hogendijk et al. |
| 7,931,659 B2 | 4/2011 | Bose et al. |
| 7,938,820 B2 | 5/2011 | Webster et al. |
| 7,967,789 B2 | 6/2011 | Solar et al. |
| 7,972,294 B2 | 7/2011 | Nash et al. |
| 7,972,298 B2 | 7/2011 | Wallace et al. |
| 7,972,308 B2 | 7/2011 | Putz |
| 7,988,646 B2 | 8/2011 | Taber |
| 7,998,104 B2 | 8/2011 | Chang |
| 8,021,351 B2 | 9/2011 | Boldenow et al. |
| 8,029,533 B2 | 10/2011 | Bagaoisan et al. |
| 8,043,279 B2 | 10/2011 | Hisamatsu et al. |
| 8,048,032 B2 | 11/2011 | Root et al. |
| 8,052,636 B2 | 11/2011 | Moll et al. |
| 8,052,640 B2 | 11/2011 | Fiorella et al. |
| 8,066,757 B2 | 11/2011 | Ferrera et al. |
| 8,070,694 B2 | 12/2011 | Galdonik et al. |
| 8,084,246 B2 | 12/2011 | Hoon et al. |
| 8,092,483 B2 | 1/2012 | Galdonik et al. |
| 8,114,032 B2 | 2/2012 | Ferry et al. |
| 8,142,413 B2 | 3/2012 | Root et al. |
| RE43,300 E | 4/2012 | Saadat et al. |
| 8,152,782 B2 | 4/2012 | Jang et al. |
| 8,157,760 B2 | 4/2012 | Criado et al. |
| 8,172,831 B2 | 5/2012 | Webler, Jr. |
| 8,181,324 B2 | 5/2012 | McFadden et al. |
| 8,211,023 B2 | 7/2012 | Swan et al. |
| 8,221,348 B2 | 7/2012 | Hackett et al. |
| 8,231,600 B2 | 7/2012 | von Hoffmann |
| 8,235,968 B2 | 8/2012 | Tremaglio |
| 8,251,978 B2 | 8/2012 | Nash et al. |
| 8,252,010 B1 | 8/2012 | Raju et al. |
| 8,252,014 B2 | 8/2012 | Fisher |
| 8,257,302 B2 | 9/2012 | Beyar et al. |
| 8,292,850 B2 | 10/2012 | Root et al. |
| 8,308,712 B2 | 11/2012 | Provost et al. |
| 8,343,089 B2 | 1/2013 | Chang |
| 8,361,105 B2 | 1/2013 | Adams et al. |
| 8,366,735 B2 | 2/2013 | Bose et al. |
| 8,414,516 B2 | 4/2013 | Chang |
| 8,419,786 B2 | 4/2013 | Cottone, Jr. et al. |
| 8,425,549 B2 | 4/2013 | Lenker et al. |
| 8,460,312 B2 | 6/2013 | Bose et al. |
| 8,465,456 B2 | 6/2013 | Stivland |
| 8,523,801 B2 | 9/2013 | Nash et al. |
| 8,535,272 B2 | 9/2013 | Wang et al. |
| 8,540,759 B2 | 9/2013 | Porter |
| 8,545,514 B2 | 10/2013 | Ferrera |
| 8,545,552 B2 | 10/2013 | Garrison et al. |
| 8,574,245 B2 | 11/2013 | Garrison et al. |
| 8,600,477 B2 | 12/2013 | Beyar et al. |
| 8,609,426 B2 | 12/2013 | Silver |
| 8,636,714 B2 | 1/2014 | McFerran |
| 8,663,259 B2 | 3/2014 | Levine et al. |
| 8,682,411 B2 | 3/2014 | Kassab et al. |
| 8,690,907 B1 | 4/2014 | Janardhan et al. |
| 8,702,680 B2 | 4/2014 | Jimenez et al. |
| 8,708,954 B2 | 4/2014 | Webler |
| 8,715,314 B1 | 5/2014 | Janardhan et al. |
| 8,725,249 B2 | 5/2014 | Bar-Yoseph et al. |
| 8,734,374 B2 | 5/2014 | Aklog et al. |
| 8,758,325 B2 | 6/2014 | Webster et al. |
| 8,764,779 B2 | 7/2014 | Levine et al. |
| 8,764,813 B2 | 7/2014 | Jantzen et al. |
| 8,795,305 B2 | 8/2014 | Martin et al. |
| 8,801,670 B2 | 8/2014 | Drontle et al. |

(56) References Cited

U.S. PATENT DOCUMENTS

| | | |
|---|---|---|
| 8,801,749 B2 | 8/2014 | Adams et al. |
| 8,814,892 B2 | 8/2014 | Galdonik et al. |
| 8,870,805 B2 | 10/2014 | Chang |
| 8,876,776 B2 | 11/2014 | Kassab et al. |
| 8,932,286 B2 | 1/2015 | Terry et al. |
| 8,932,320 B1 | 1/2015 | Janardhan et al. |
| RE45,380 E | 2/2015 | Root et al. |
| 8,961,533 B2 | 2/2015 | Stahler et al. |
| 8,961,549 B2 | 2/2015 | Conn |
| 8,974,411 B2 | 3/2015 | McKinnon |
| 8,996,095 B2 | 3/2015 | Anderson et al. |
| 9,014,786 B2 | 4/2015 | Carmeli et al. |
| 9,023,070 B2 | 5/2015 | Levine et al. |
| 9,034,007 B2 | 5/2015 | Janardhan |
| 9,107,691 B2 | 8/2015 | Fojtik |
| 9,119,656 B2 | 9/2015 | Bose et al. |
| 9,126,018 B1 | 9/2015 | Garrison |
| 9,144,383 B2 | 9/2015 | Zharov |
| 9,144,662 B2 | 9/2015 | Di Caprio et al. |
| RE45,760 E | 10/2015 | Root et al. |
| RE45,776 E | 10/2015 | Root et al. |
| 9,199,057 B2 | 12/2015 | Nielsen |
| 9,211,132 B2 | 12/2015 | Bowman |
| 9,220,562 B2 | 12/2015 | Brannan et al. |
| 9,233,230 B2 | 1/2016 | Puhasmagi et al. |
| 9,241,699 B1 | 1/2016 | Kume et al. |
| 9,259,215 B2 | 2/2016 | Chou et al. |
| 9,259,228 B2 | 2/2016 | Cruise et al. |
| 9,265,512 B2 | 2/2016 | Garrison et al. |
| 9,278,201 B2 | 3/2016 | Rapaport et al. |
| 9,282,992 B2 | 3/2016 | Levine et al. |
| 9,295,817 B2 | 3/2016 | Chang |
| 9,314,268 B2 | 4/2016 | Cahill |
| 9,351,993 B2 | 5/2016 | Cruise et al. |
| 9,352,123 B2 | 5/2016 | Zhou et al. |
| 9,370,639 B2 | 6/2016 | Plassman et al. |
| 9,375,223 B2 | 6/2016 | Wallace |
| 9,381,278 B2 | 7/2016 | Constant et al. |
| 9,399,118 B2 | 7/2016 | Kume et al. |
| RE46,116 E | 8/2016 | Root et al. |
| 9,408,916 B2 | 8/2016 | Cruise et al. |
| 9,414,819 B2 | 8/2016 | Fitz et al. |
| 9,433,427 B2 | 9/2016 | Look et al. |
| 9,439,791 B2 | 9/2016 | Vong et al. |
| 9,445,927 B2 | 9/2016 | Lee et al. |
| 9,451,884 B2 | 9/2016 | Zharov et al. |
| 9,451,963 B2 | 9/2016 | Cruise et al. |
| 9,486,221 B2 | 11/2016 | Cruise et al. |
| 9,486,611 B2 | 11/2016 | Petersen et al. |
| 9,492,637 B2 | 11/2016 | Garrison et al. |
| 9,504,476 B2 | 11/2016 | Gulachenski |
| 9,510,855 B2 | 12/2016 | Rapaport et al. |
| 9,523,792 B2 | 12/2016 | Seo et al. |
| 9,526,504 B2 | 12/2016 | Chang |
| 9,526,505 B2 | 12/2016 | Marks et al. |
| 9,532,792 B2 | 1/2017 | Galdonik et al. |
| 9,533,344 B2 | 1/2017 | Monetti et al. |
| 9,539,022 B2 | 1/2017 | Bowman |
| 9,539,122 B2 | 1/2017 | Burke et al. |
| 9,546,236 B2 | 1/2017 | Cruise et al. |
| 9,561,121 B2 | 2/2017 | Sudin et al. |
| 9,561,125 B2 | 2/2017 | Bowman et al. |
| 9,561,345 B2 | 2/2017 | Garrison et al. |
| 9,597,101 B2 | 3/2017 | Galdonik et al. |
| 9,615,832 B2 | 4/2017 | Bose et al. |
| 9,622,753 B2 | 4/2017 | Cox |
| 9,623,228 B2 | 4/2017 | Ryan et al. |
| 9,655,633 B2 | 5/2017 | Leynov et al. |
| 9,655,755 B2 | 5/2017 | Chou et al. |
| 9,655,989 B2 | 5/2017 | Cruise et al. |
| 9,662,118 B2 | 5/2017 | Chang |
| 9,662,129 B2 | 5/2017 | Galdonik et al. |
| 9,662,480 B2 | 5/2017 | Kume et al. |
| 9,669,183 B2 | 6/2017 | Chang |
| 9,681,882 B2 | 6/2017 | Garrison et al. |
| 9,688,788 B2 | 6/2017 | Plotkin et al. |
| 9,693,789 B2 | 7/2017 | Garrison et al. |
| 9,693,852 B2 | 7/2017 | Lam et al. |
| 9,717,500 B2 | 8/2017 | Tieu et al. |
| 9,724,103 B2 | 8/2017 | Cruise et al. |
| 9,764,111 B2 | 9/2017 | Gulachenski |
| 9,764,118 B2 | 9/2017 | Anderson et al. |
| 9,770,251 B2 | 9/2017 | Bowman et al. |
| 9,789,242 B2 | 10/2017 | Criado et al. |
| 9,803,043 B2 | 10/2017 | Cruise et al. |
| 9,820,761 B2 | 11/2017 | Garrison et al. |
| 9,827,047 B2 | 11/2017 | Fudaba et al. |
| 9,861,783 B2 | 1/2018 | Garrison et al. |
| 9,867,725 B2 | 1/2018 | Tieu et al. |
| 9,877,731 B2 | 1/2018 | Cruise et al. |
| 9,883,885 B2 | 2/2018 | Hendrick et al. |
| 9,907,880 B2 | 3/2018 | Cruise et al. |
| 9,993,613 B2 | 6/2018 | Wang et al. |
| 10,058,339 B2 | 8/2018 | Galdonik et al. |
| 10,124,146 B2 | 11/2018 | Di Caprio et al. |
| 10,192,230 B2 | 1/2019 | Look et al. |
| 10,213,582 B2 | 2/2019 | Garrison et al. |
| 10,299,944 B2 | 5/2019 | Al-Lamee et al. |
| 10,441,301 B2 | 10/2019 | Vale et al. |
| 10,456,552 B2 | 10/2019 | Goyal |
| 10,463,386 B2 | 11/2019 | Ogle et al. |
| 10,478,535 B2 | 11/2019 | Ogle |
| 10,485,956 B2 | 11/2019 | O'Donovan |
| 10,518,066 B2 | 12/2019 | Pokorney et al. |
| 10,624,772 B2 | 4/2020 | Strauss et al. |
| 10,667,871 B2 | 6/2020 | Romo et al. |
| 10,716,915 B2 | 7/2020 | Ogle et al. |
| 11,020,133 B2 | 6/2021 | Wilson et al. |
| 11,786,699 B2 * | 10/2023 | Ogle .............. A61M 1/84 606/200 |
| 2001/0014790 A1 | 8/2001 | Heller et al. |
| 2001/0027310 A1 | 10/2001 | Parisi et al. |
| 2001/0031980 A1 | 10/2001 | Wensel et al. |
| 2001/0044598 A1 | 11/2001 | Parodi |
| 2001/0044600 A1 | 11/2001 | Elkins |
| 2001/0044632 A1 | 11/2001 | Daniel et al. |
| 2001/0049486 A1 | 12/2001 | Evans et al. |
| 2001/0049517 A1 | 12/2001 | Zadno-Azizi et al. |
| 2001/0051811 A1 | 12/2001 | Bonnette et al. |
| 2002/0016565 A1 | 2/2002 | Zadno-Azizi et al. |
| 2002/0026145 A1 | 2/2002 | Bagaoisan et al. |
| 2002/0035347 A1 | 3/2002 | Bagaoisan et al. |
| 2002/0055747 A1 | 5/2002 | Cano et al. |
| 2002/0062133 A1 | 5/2002 | Gilson et al. |
| 2002/0072705 A1 | 6/2002 | Vrba et al. |
| 2002/0072730 A1 | 6/2002 | McGill et al. |
| 2002/0077600 A1 | 6/2002 | Sirimanne |
| 2002/0087076 A1 | 7/2002 | Meguro et al. |
| 2002/0087119 A1 | 7/2002 | Parodi |
| 2002/0091407 A1 | 7/2002 | Zadno-Azizi et al. |
| 2002/0095174 A1 | 7/2002 | Tsugita et al. |
| 2002/0111648 A1 | 8/2002 | Kusleika et al. |
| 2002/0111666 A1 | 8/2002 | Hart et al. |
| 2002/0123765 A1 | 9/2002 | Sepetka et al. |
| 2002/0128679 A1 | 9/2002 | Turovskiy et al. |
| 2002/0133111 A1 | 9/2002 | Shadduck |
| 2002/0138094 A1 | 9/2002 | Borillo et al. |
| 2002/0143362 A1 | 10/2002 | Mackoviak et al. |
| 2002/0151922 A1 | 10/2002 | Hogendijk et al. |
| 2002/0151927 A1 | 10/2002 | Douk et al. |
| 2002/0156455 A1 | 10/2002 | Barbut |
| 2002/0156460 A1 | 10/2002 | Ye et al. |
| 2002/0165571 A1 | 11/2002 | Hebert et al. |
| 2002/0165574 A1 | 11/2002 | Ressemann et al. |
| 2002/0165598 A1 | 11/2002 | Wahr et al. |
| 2002/0169472 A1 | 11/2002 | Douk et al. |
| 2002/0173785 A1 | 11/2002 | Spear et al. |
| 2002/0173815 A1 | 11/2002 | Hogendijk et al. |
| 2002/0177869 A1 | 11/2002 | Eidenschink et al. |
| 2002/0177899 A1 | 11/2002 | Eum et al. |
| 2002/0183782 A1 | 12/2002 | Tsugita et al. |
| 2002/0183783 A1 | 12/2002 | Shadduck |
| 2003/0023263 A1 | 1/2003 | Krolik et al. |
| 2003/0040762 A1 | 2/2003 | Dorros et al. |

(56) References Cited

U.S. PATENT DOCUMENTS

| | | |
|---|---|---|
| 2003/0050600 A1 | 3/2003 | Ressemann et al. |
| 2003/0065353 A1 | 4/2003 | Horzewski et al. |
| 2003/0065356 A1 | 4/2003 | Tsugita et al. |
| 2003/0069468 A1 | 4/2003 | Bolling et al. |
| 2003/0078562 A1 | 4/2003 | Makower et al. |
| 2003/0120208 A1 | 6/2003 | Houser et al. |
| 2003/0130577 A1 | 7/2003 | Purdy et al. |
| 2003/0135193 A1 | 7/2003 | Hilgers et al. |
| 2003/0135198 A1 | 7/2003 | Berhow et al. |
| 2003/0135232 A1 | 7/2003 | Douk et al. |
| 2003/0153942 A1 | 8/2003 | Wang et al. |
| 2003/0186203 A1 | 10/2003 | Aboud |
| 2003/0191492 A1 | 10/2003 | Gellman et al. |
| 2003/0195546 A1 | 10/2003 | Solar et al. |
| 2003/0212304 A1 | 11/2003 | Lattouf |
| 2003/0212384 A1 | 11/2003 | Hayden |
| 2003/0233038 A1 | 12/2003 | Hassett |
| 2004/0006344 A1 | 1/2004 | Nguyen et al. |
| 2004/0006365 A1 | 1/2004 | Brady et al. |
| 2004/0015138 A1 | 1/2004 | Currier et al. |
| 2004/0015151 A1 | 1/2004 | Chambers |
| 2004/0019322 A1 | 1/2004 | Hoffmann |
| 2004/0059243 A1 | 3/2004 | Flores et al. |
| 2004/0082879 A1 | 4/2004 | Klint |
| 2004/0087933 A1 | 5/2004 | Lee et al. |
| 2004/0106977 A1 | 6/2004 | Sullivan et al. |
| 2004/0116878 A1 | 6/2004 | Byrd et al. |
| 2004/0122360 A1 | 6/2004 | Waldhauser et al. |
| 2004/0133232 A1 | 7/2004 | Rosenbluth et al. |
| 2004/0138608 A1 | 7/2004 | Barbut et al. |
| 2004/0153049 A1 | 8/2004 | Hewitt et al. |
| 2004/0153118 A1 | 8/2004 | Clubb et al. |
| 2004/0193177 A1 | 9/2004 | Houghton et al. |
| 2004/0210194 A1 | 10/2004 | Bonnette et al. |
| 2004/0220611 A1 | 11/2004 | Ogle |
| 2004/0230285 A1 | 11/2004 | Gifford, III et al. |
| 2004/0236215 A1 | 11/2004 | Mihara et al. |
| 2004/0243102 A1 | 12/2004 | Berg et al. |
| 2004/0254602 A1 | 12/2004 | Lehe et al. |
| 2005/0004523 A1 | 1/2005 | Osborne et al. |
| 2005/0004553 A1 | 1/2005 | Douk |
| 2005/0021002 A1 | 1/2005 | Deckman et al. |
| 2005/0021075 A1 | 1/2005 | Bonnette et al. |
| 2005/0021152 A1 | 1/2005 | Ogle et al. |
| 2005/0027236 A1 | 2/2005 | Douk |
| 2005/0038453 A1 | 2/2005 | Raulerson |
| 2005/0049574 A1 | 3/2005 | Petrick et al. |
| 2005/0059957 A1 | 3/2005 | Campbell et al. |
| 2005/0065467 A1 | 3/2005 | Pudelko et al. |
| 2005/0065498 A1 | 3/2005 | McFerran |
| 2005/0075661 A1 | 4/2005 | Levine et al. |
| 2005/0085746 A1 | 4/2005 | Adams et al. |
| 2005/0085847 A1 | 4/2005 | Galdonik et al. |
| 2005/0090802 A1 | 4/2005 | Connors et al. |
| 2005/0103332 A1 | 5/2005 | Gingles et al. |
| 2005/0107738 A1 | 5/2005 | Slater et al. |
| 2005/0131453 A1 | 6/2005 | Parodi |
| 2005/0154344 A1 | 7/2005 | Chang |
| 2005/0154349 A1 | 7/2005 | Renz et al. |
| 2005/0182386 A1 | 8/2005 | Aggerholm |
| 2005/0209559 A1 | 9/2005 | Thornton et al. |
| 2005/0209631 A1 | 9/2005 | Galdonik et al. |
| 2005/0209674 A1 | 9/2005 | Kutscher et al. |
| 2005/0209675 A1 | 9/2005 | Ton et al. |
| 2005/0228479 A1 | 10/2005 | Pavcnik et al. |
| 2005/0245892 A1 | 11/2005 | Elkins et al. |
| 2005/0245894 A1 | 11/2005 | Zadno-Azizi |
| 2005/0273051 A1 | 12/2005 | Coppi |
| 2005/0277976 A1 | 12/2005 | Galdonik et al. |
| 2006/0020165 A1 | 1/2006 | Adams |
| 2006/0030835 A1 | 2/2006 | Sherman et al. |
| 2006/0030876 A1 | 2/2006 | Peacock, III et al. |
| 2006/0047301 A1 | 3/2006 | Ogle |
| 2006/0058836 A1 | 3/2006 | Bose et al. |
| 2006/0058837 A1 | 3/2006 | Bose et al. |
| 2006/0058838 A1 | 3/2006 | Bose et al. |
| 2006/0064036 A1 | 3/2006 | Osborne et al. |
| 2006/0079787 A1 | 4/2006 | Whiting et al. |
| 2006/0089618 A1 | 4/2006 | McFerran et al. |
| 2006/0095062 A1 | 5/2006 | Stephens |
| 2006/0100530 A1 | 5/2006 | Kliot et al. |
| 2006/0129091 A1 | 6/2006 | Bonnette et al. |
| 2006/0135961 A1 | 6/2006 | Rosenman et al. |
| 2006/0173440 A1 | 8/2006 | Lamson et al. |
| 2006/0195137 A1 | 8/2006 | Sepetka et al. |
| 2006/0200047 A1 | 9/2006 | Galdonik et al. |
| 2006/0200191 A1 | 9/2006 | Zadno-Azizi |
| 2006/0217664 A1 | 9/2006 | Hattler et al. |
| 2006/0247755 A1 | 11/2006 | Pal et al. |
| 2006/0258987 A1 | 11/2006 | Lentz et al. |
| 2006/0259063 A1 | 11/2006 | Bates et al. |
| 2006/0264759 A1 | 11/2006 | Moehring et al. |
| 2006/0270977 A1 | 11/2006 | Fisher et al. |
| 2006/0271098 A1 | 11/2006 | Peacock |
| 2007/0005002 A1 | 1/2007 | Millman et al. |
| 2007/0005084 A1 | 1/2007 | Clague et al. |
| 2007/0016132 A1 | 1/2007 | Oepen et al. |
| 2007/0021778 A1 | 1/2007 | Carly |
| 2007/0043333 A1 | 2/2007 | Kampa et al. |
| 2007/0060888 A1 | 3/2007 | Goff et al. |
| 2007/0060908 A1 | 3/2007 | Webster et al. |
| 2007/0060911 A1 | 3/2007 | Webster et al. |
| 2007/0060944 A1 | 3/2007 | Boldenow et al. |
| 2007/0073264 A1 | 3/2007 | Stedman et al. |
| 2007/0088323 A1 | 4/2007 | Campbell et al. |
| 2007/0106211 A1 | 5/2007 | Provost-Tine et al. |
| 2007/0135733 A1 | 6/2007 | Soukup et al. |
| 2007/0135832 A1 | 6/2007 | Wholey |
| 2007/0173784 A1 | 7/2007 | Johansson et al. |
| 2007/0185501 A1 | 8/2007 | Martin et al. |
| 2007/0185521 A1 | 8/2007 | Bui et al. |
| 2007/0185522 A1 | 8/2007 | Davies et al. |
| 2007/0191820 A1 | 8/2007 | Maksimovich |
| 2007/0197956 A1 | 8/2007 | Le et al. |
| 2007/0198028 A1 | 8/2007 | Miloslavski et al. |
| 2007/0198049 A1 | 8/2007 | Barbut |
| 2007/0208302 A1 | 9/2007 | Webster et al. |
| 2007/0213765 A1 | 9/2007 | Adams et al. |
| 2007/0227543 A1 | 10/2007 | Peichel |
| 2007/0239261 A1 | 10/2007 | Bose et al. |
| 2007/0250040 A1 | 10/2007 | Provost et al. |
| 2007/0250096 A1 | 10/2007 | Yamane et al. |
| 2007/0260115 A1 | 11/2007 | Brock et al. |
| 2007/0260219 A1 | 11/2007 | Root et al. |
| 2007/0265516 A1 | 11/2007 | Wang |
| 2007/0287956 A1 | 12/2007 | Tal |
| 2008/0027379 A1 | 1/2008 | Wilkins |
| 2008/0033525 A1 | 2/2008 | Shaked et al. |
| 2008/0058839 A1 | 3/2008 | Nobles et al. |
| 2008/0082107 A1 | 4/2008 | Miller et al. |
| 2008/0082109 A1 | 4/2008 | Moll et al. |
| 2008/0086110 A1 | 4/2008 | Galdonik et al. |
| 2008/0097251 A1 | 4/2008 | Babaev |
| 2008/0109088 A1 | 5/2008 | Galdonik et al. |
| 2008/0119890 A1 | 5/2008 | Adams et al. |
| 2008/0140010 A1 | 6/2008 | Kennedy et al. |
| 2008/0167678 A1 | 7/2008 | Morsi |
| 2008/0172066 A9 | 7/2008 | Galdonik et al. |
| 2008/0177245 A1 | 7/2008 | Mesallum |
| 2008/0183128 A1 | 7/2008 | Morriss et al. |
| 2008/0188888 A1 | 8/2008 | Adams et al. |
| 2008/0195140 A1 | 8/2008 | Myla et al. |
| 2008/0200946 A1 | 8/2008 | Braun et al. |
| 2008/0234723 A1 | 9/2008 | Buiser et al. |
| 2008/0243222 A1 | 10/2008 | Schafersman et al. |
| 2008/0262350 A1 | 10/2008 | Unger |
| 2008/0262472 A1 | 10/2008 | Lunn et al. |
| 2008/0262506 A1 | 10/2008 | Griffin et al. |
| 2008/0281248 A1 | 11/2008 | Angheloiu et al. |
| 2008/0294111 A1 | 11/2008 | Tal et al. |
| 2008/0312639 A1 | 12/2008 | Weber |
| 2009/0018455 A1 | 1/2009 | Chang |
| 2009/0018525 A1 | 1/2009 | Waite et al. |
| 2009/0024072 A1 | 1/2009 | Criado et al. |

(56) References Cited

U.S. PATENT DOCUMENTS

| | | |
|---|---|---|
| 2009/0024089 A1 | 1/2009 | Levine et al. |
| 2009/0030400 A1 | 1/2009 | Bose et al. |
| 2009/0076319 A1 | 3/2009 | Muyari |
| 2009/0082800 A1 | 3/2009 | Janardhan |
| 2009/0124956 A1 | 5/2009 | Swetlin et al. |
| 2009/0131970 A1 | 5/2009 | Chanduszko et al. |
| 2009/0163891 A1 | 6/2009 | Ewing et al. |
| 2009/0165881 A1 | 7/2009 | Tegg et al. |
| 2009/0198172 A1 | 8/2009 | Garrison et al. |
| 2009/0209857 A1 | 8/2009 | Secretain et al. |
| 2009/0227992 A1 | 9/2009 | Nir et al. |
| 2009/0234321 A1 | 9/2009 | Shapland et al. |
| 2009/0247987 A1 | 10/2009 | Chevalier, Jr. et al. |
| 2009/0254166 A1 | 10/2009 | Chou et al. |
| 2009/0264865 A1 | 10/2009 | Kawai |
| 2009/0270800 A1 | 10/2009 | Spurchise et al. |
| 2009/0270895 A1 | 10/2009 | Churchill et al. |
| 2009/0299393 A1 | 12/2009 | Martin et al. |
| 2009/0312699 A1 | 12/2009 | Pudelko et al. |
| 2009/0312786 A1 | 12/2009 | Trask et al. |
| 2010/0004607 A1 | 1/2010 | Wilson et al. |
| 2010/0022948 A1 | 1/2010 | Wilson et al. |
| 2010/0030141 A1 | 2/2010 | Chermoni |
| 2010/0030186 A1 | 2/2010 | Stivland |
| 2010/0042118 A1 | 2/2010 | Garrison et al. |
| 2010/0049168 A1 | 2/2010 | Parker et al. |
| 2010/0057051 A1 | 3/2010 | Howat et al. |
| 2010/0063479 A1 | 3/2010 | Merdan et al. |
| 2010/0063480 A1 | 3/2010 | Shireman |
| 2010/0094330 A1 | 4/2010 | Barbut |
| 2010/0114017 A1 | 5/2010 | Lenker et al. |
| 2010/0125322 A1 | 5/2010 | Fitzgerald et al. |
| 2010/0145308 A1 | 6/2010 | Layman et al. |
| 2010/0185216 A1 | 7/2010 | Garrison et al. |
| 2010/0204634 A1 | 8/2010 | Baxter et al. |
| 2010/0204672 A1 | 8/2010 | Lockhart et al. |
| 2010/0204684 A1 | 8/2010 | Garrison et al. |
| 2010/0211050 A1 | 8/2010 | Luther |
| 2010/0217235 A1 | 8/2010 | Thorstenson et al. |
| 2010/0217276 A1 | 8/2010 | Garrison et al. |
| 2010/0228269 A1 | 9/2010 | Garrison et al. |
| 2010/0256600 A1 | 10/2010 | Ferrera |
| 2010/0268029 A1 | 10/2010 | Phan et al. |
| 2010/0280451 A1 | 11/2010 | Teeslink et al. |
| 2010/0305475 A1 | 12/2010 | Hinchliffe et al. |
| 2010/0312141 A1 | 12/2010 | Keast et al. |
| 2010/0318097 A1 | 12/2010 | Ferrera et al. |
| 2011/0009875 A1 | 1/2011 | Grandfield et al. |
| 2011/0015482 A1 | 1/2011 | Carrillo, Jr. |
| 2011/0022149 A1 | 1/2011 | Cox et al. |
| 2011/0034986 A1 | 2/2011 | Chou et al. |
| 2011/0046709 A1 | 2/2011 | Coffey et al. |
| 2011/0082373 A1 | 4/2011 | Gurley et al. |
| 2011/0087147 A1 | 4/2011 | Garrison et al. |
| 2011/0092910 A1 | 4/2011 | Schultz |
| 2011/0093000 A1 | 4/2011 | Ogle et al. |
| 2011/0106200 A1 | 5/2011 | Ziegler |
| 2011/0112567 A1 | 5/2011 | Lenker et al. |
| 2011/0125181 A1 | 5/2011 | Brady et al. |
| 2011/0152760 A1 | 6/2011 | Parker |
| 2011/0160833 A1 | 6/2011 | Gonzalez et al. |
| 2011/0172678 A1 | 7/2011 | Behl et al. |
| 2011/0172700 A1 | 7/2011 | Bose et al. |
| 2011/0230859 A1 | 9/2011 | Galdonik et al. |
| 2011/0238041 A1 | 9/2011 | Lim et al. |
| 2011/0245751 A1 | 10/2011 | Hofmann |
| 2011/0264133 A1 | 10/2011 | Hanlon et al. |
| 2012/0040858 A1 | 2/2012 | Ford et al. |
| 2012/0065479 A1 | 3/2012 | Lahiji et al. |
| 2012/0065490 A1 | 3/2012 | Zharov et al. |
| 2012/0071838 A1 | 3/2012 | Fojtik |
| 2012/0071856 A1 | 3/2012 | Goldfarb et al. |
| 2012/0078140 A1 | 3/2012 | Nita |
| 2012/0095485 A1 | 4/2012 | Cully et al. |
| 2012/0101561 A1 | 4/2012 | Porter |
| 2012/0109044 A1 | 5/2012 | Santamore et al. |
| 2012/0116350 A1 | 5/2012 | Strauss et al. |
| 2012/0123466 A1 | 5/2012 | Porter et al. |
| 2012/0148175 A1 | 6/2012 | Wesselmann |
| 2012/0150147 A1 | 6/2012 | Leynov et al. |
| 2012/0165756 A1 | 6/2012 | Root et al. |
| 2012/0172918 A1 | 7/2012 | Fifer et al. |
| 2012/0179097 A1 | 7/2012 | Cully et al. |
| 2012/0253313 A1 | 10/2012 | Galdonik et al. |
| 2012/0271281 A1 | 10/2012 | Schertiger |
| 2012/0277671 A1 | 11/2012 | Fuentes |
| 2012/0296275 A1 | 11/2012 | Martin et al. |
| 2012/0310212 A1 | 12/2012 | Fischell et al. |
| 2012/0310319 A1 | 12/2012 | Tieu et al. |
| 2012/0330196 A1 | 12/2012 | Nita |
| 2013/0006174 A1 | 1/2013 | Phan |
| 2013/0006225 A1 | 1/2013 | Cucin |
| 2013/0018318 A1 | 1/2013 | Ravichandran et al. |
| 2013/0035628 A1 | 2/2013 | Garrison et al. |
| 2013/0046285 A1 | 2/2013 | Griffin et al. |
| 2013/0053792 A1 | 2/2013 | Fischell et al. |
| 2013/0116701 A1 | 5/2013 | Wang et al. |
| 2013/0131691 A1 | 5/2013 | Kozak et al. |
| 2013/0158507 A1 | 6/2013 | Brown |
| 2013/0158578 A1 | 6/2013 | Ghodke et al. |
| 2013/0165873 A1 | 6/2013 | Morriss et al. |
| 2013/0172851 A1 | 7/2013 | Shimada et al. |
| 2013/0184735 A1 | 7/2013 | Fischell et al. |
| 2013/0184742 A1 | 7/2013 | Ganesan et al. |
| 2013/0197621 A1 | 8/2013 | Ryan et al. |
| 2013/0225937 A1 | 8/2013 | Schaeffer et al. |
| 2013/0226276 A1 | 8/2013 | Newell et al. |
| 2013/0261727 A1 | 10/2013 | Perkins et al. |
| 2013/0274783 A1 | 10/2013 | Wynberg |
| 2013/0281788 A1 | 10/2013 | Garrison |
| 2013/0317409 A1 | 11/2013 | Cully et al. |
| 2014/0012281 A1 | 1/2014 | Wang et al. |
| 2014/0018732 A1 | 1/2014 | Bagaoisan et al. |
| 2014/0018773 A1 | 1/2014 | Wang et al. |
| 2014/0025004 A1 | 1/2014 | Falk et al. |
| 2014/0025043 A1 | 1/2014 | Wang et al. |
| 2014/0039461 A1 | 2/2014 | Anderson et al. |
| 2014/0046297 A1 | 2/2014 | Shimada et al. |
| 2014/0081243 A1 | 3/2014 | Zhou et al. |
| 2014/0088510 A1 | 3/2014 | Nimkar et al. |
| 2014/0114287 A1 | 4/2014 | Beasley et al. |
| 2014/0114335 A1 | 4/2014 | Banko |
| 2014/0117397 A1 | 5/2014 | Saeki et al. |
| 2014/0155783 A1 | 6/2014 | Starksen et al. |
| 2014/0155862 A1 | 6/2014 | Baxter et al. |
| 2014/0155908 A1 | 6/2014 | Rosenbluth et al. |
| 2014/0155932 A1 | 6/2014 | Weishaupt et al. |
| 2014/0155980 A1 | 6/2014 | Turjman et al. |
| 2014/0163489 A1 | 6/2014 | Walti et al. |
| 2014/0180246 A1 | 6/2014 | Comerota et al. |
| 2014/0207043 A1 | 7/2014 | Anand et al. |
| 2014/0228808 A1 | 8/2014 | Webster et al. |
| 2014/0236120 A1 | 8/2014 | Tsai et al. |
| 2014/0249508 A1 | 9/2014 | Wang et al. |
| 2014/0257018 A1 | 9/2014 | Farnan |
| 2014/0257186 A1 | 9/2014 | Kerr |
| 2014/0273920 A1 | 9/2014 | Smith |
| 2014/0276537 A1 | 9/2014 | Kruse |
| 2014/0276618 A1 | 9/2014 | Di Caprio et al. |
| 2014/0276920 A1 | 9/2014 | Hendrick et al. |
| 2014/0276923 A1 | 9/2014 | Miller |
| 2014/0288525 A1 | 9/2014 | Fudaba et al. |
| 2014/0296769 A1 | 10/2014 | Hyde et al. |
| 2014/0296868 A1 | 10/2014 | Garrison et al. |
| 2014/0296889 A1 | 10/2014 | Avneri et al. |
| 2014/0343537 A1 | 11/2014 | Eversull et al. |
| 2014/0343585 A1 | 11/2014 | Ferrera et al. |
| 2014/0358123 A1 | 12/2014 | Ueda et al. |
| 2014/0371709 A1 | 12/2014 | Allen et al. |
| 2015/0018937 A1 | 1/2015 | Lagodzki et al. |
| 2015/0025562 A1 | 1/2015 | Dinh et al. |
| 2015/0105729 A1 | 4/2015 | Valeti et al. |
| 2015/0119859 A1 | 4/2015 | Cajamarca et al. |
| 2015/0126861 A1 | 5/2015 | Gambhir et al. |

(56) References Cited

U.S. PATENT DOCUMENTS

| | | |
|---|---|---|
| 2015/0133978 A1 | 5/2015 | Paul, Jr. |
| 2015/0151090 A1 | 6/2015 | Sutton et al. |
| 2015/0165160 A1 | 6/2015 | Thungana et al. |
| 2015/0173782 A1 | 6/2015 | Garrison et al. |
| 2015/0174368 A1 | 6/2015 | Garrison et al. |
| 2015/0190615 A1 | 7/2015 | Shaltis |
| 2015/0196210 A1 | 7/2015 | McCaffrey et al. |
| 2015/0209066 A1 | 7/2015 | Dahm et al. |
| 2015/0216650 A1 | 8/2015 | Shaltis |
| 2015/0245848 A1 | 9/2015 | Shimon |
| 2015/0265802 A1 | 9/2015 | Fukuoka et al. |
| 2015/0282821 A1 | 10/2015 | Look et al. |
| 2015/0314111 A1 | 11/2015 | Solar et al. |
| 2015/0327843 A1 | 11/2015 | Garrison |
| 2015/0327919 A1 | 11/2015 | Clopp et al. |
| 2015/0335857 A1 | 11/2015 | Ishikawa |
| 2015/0352330 A1 | 12/2015 | Wasdyke et al. |
| 2016/0008025 A1 | 1/2016 | Gupta et al. |
| 2016/0008572 A1 | 1/2016 | Di Caprio et al. |
| 2016/0015935 A1 | 1/2016 | Chan et al. |
| 2016/0022964 A1 | 1/2016 | Goyal |
| 2016/0058459 A1 | 3/2016 | Bowman |
| 2016/0066931 A1 | 3/2016 | Kugler et al. |
| 2016/0081825 A1 | 3/2016 | Sudin et al. |
| 2016/0096002 A1 | 4/2016 | Di Caprio et al. |
| 2016/0100819 A1 | 4/2016 | Tieu |
| 2016/0121081 A1 | 5/2016 | Iwano et al. |
| 2016/0128688 A1 | 5/2016 | Garrison et al. |
| 2016/0129221 A1 | 5/2016 | Haverkost et al. |
| 2016/0135829 A1 | 5/2016 | Holochwost et al. |
| 2016/0136398 A1 | 5/2016 | Heilman et al. |
| 2016/0143616 A1 | 5/2016 | Okubo et al. |
| 2016/0143661 A1 | 5/2016 | Wood et al. |
| 2016/0144157 A1 | 5/2016 | Gulachenski et al. |
| 2016/0166265 A1 | 6/2016 | Nita |
| 2016/0166266 A1 | 6/2016 | Nita |
| 2016/0166754 A1 | 6/2016 | Kassab et al. |
| 2016/0199204 A1 | 7/2016 | Pung et al. |
| 2016/0199620 A1 | 7/2016 | Pokorney et al. |
| 2016/0206322 A1 | 7/2016 | Fitz et al. |
| 2016/0220396 A1 | 8/2016 | Zhou et al. |
| 2016/0220741 A1* | 8/2016 | Garrison ........... A61M 25/0054 |
| 2016/0242764 A1 | 8/2016 | Garrison et al. |
| 2016/0242893 A1 | 8/2016 | Joshi et al. |
| 2016/0243157 A1 | 8/2016 | Cruise et al. |
| 2016/0256611 A1 | 9/2016 | Fitz |
| 2016/0270806 A1 | 9/2016 | Wallace |
| 2016/0271315 A1 | 9/2016 | Chang |
| 2016/0296690 A1 | 10/2016 | Kume et al. |
| 2016/0311990 A1 | 10/2016 | Cruise et al. |
| 2016/0317156 A1 | 11/2016 | Fitz et al. |
| 2016/0317288 A1 | 11/2016 | Rogers et al. |
| 2016/0345904 A1 | 12/2016 | Bowman |
| 2016/0346502 A1 | 12/2016 | Fuller et al. |
| 2016/0346508 A1 | 12/2016 | Williams et al. |
| 2016/0346509 A1 | 12/2016 | Anderson et al. |
| 2016/0361180 A1 | 12/2016 | Vong et al. |
| 2016/0361459 A1 | 12/2016 | Baldwin |
| 2016/0367274 A1 | 12/2016 | Wallace |
| 2016/0367275 A1 | 12/2016 | Wallace |
| 2017/0007264 A1 | 1/2017 | Cruise et al. |
| 2017/0007277 A1 | 1/2017 | Drapeau et al. |
| 2017/0020540 A1 | 1/2017 | Chou et al. |
| 2017/0027604 A1 | 2/2017 | Wallace |
| 2017/0028170 A1 | 2/2017 | Ho |
| 2017/0035436 A1 | 2/2017 | Morita |
| 2017/0035446 A1 | 2/2017 | Rapaport et al. |
| 2017/0042548 A1 | 2/2017 | Lam |
| 2017/0056032 A1 | 3/2017 | Look et al. |
| 2017/0056061 A1 | 3/2017 | Ogle et al. |
| 2017/0072165 A1 | 3/2017 | Lim et al. |
| 2017/0072452 A1 | 3/2017 | Monetti et al. |
| 2017/0079680 A1 | 3/2017 | Bowman |
| 2017/0079812 A1 | 3/2017 | Lam et al. |
| 2017/0079817 A1 | 3/2017 | Sepetka et al. |
| 2017/0079819 A1 | 3/2017 | Pung et al. |
| 2017/0079820 A1 | 3/2017 | Lam et al. |
| 2017/0087340 A1 | 3/2017 | Peralta et al. |
| 2017/0100126 A1 | 4/2017 | Bowman et al. |
| 2017/0143938 A1 | 5/2017 | Ogle et al. |
| 2017/0147765 A1 | 5/2017 | Mehta |
| 2017/0164964 A1 | 6/2017 | Galdonik et al. |
| 2017/0172581 A1 | 6/2017 | Bose et al. |
| 2017/0172766 A1 | 6/2017 | Vong et al. |
| 2017/0181760 A1 | 6/2017 | Look et al. |
| 2017/0203036 A1 | 7/2017 | Mazlish et al. |
| 2017/0209260 A1 | 7/2017 | Garrison et al. |
| 2017/0215902 A1 | 8/2017 | Leynov et al. |
| 2017/0216484 A1 | 8/2017 | Cruise et al. |
| 2017/0224953 A1 | 8/2017 | Tran et al. |
| 2017/0231647 A1 | 8/2017 | Saunders et al. |
| 2017/0239440 A1 | 8/2017 | Yang et al. |
| 2017/0239447 A1 | 8/2017 | Yang et al. |
| 2017/0246014 A1 | 8/2017 | Rapaport et al. |
| 2017/0252051 A1 | 9/2017 | Wan et al. |
| 2017/0252057 A1 | 9/2017 | Bonnette et al. |
| 2017/0252536 A1 | 9/2017 | Yang et al. |
| 2017/0259037 A1 | 9/2017 | Kern et al. |
| 2017/0265869 A1 | 9/2017 | Cibulski et al. |
| 2017/0265983 A1 | 9/2017 | Lam et al. |
| 2017/0274180 A1 | 9/2017 | Garrison et al. |
| 2017/0281192 A1 | 10/2017 | Tieu et al. |
| 2017/0283536 A1 | 10/2017 | Cruise et al. |
| 2017/0290600 A1 | 10/2017 | Ulm, III |
| 2017/0303942 A1 | 10/2017 | Greenhalgh et al. |
| 2017/0303948 A1 | 10/2017 | Wallace et al. |
| 2017/0333060 A1 | 11/2017 | Panian |
| 2017/0333237 A1 | 11/2017 | Walzman |
| 2017/0354427 A1 | 12/2017 | Bonnette et al. |
| 2017/0354523 A1 | 12/2017 | Chou et al. |
| 2017/0354803 A1 | 12/2017 | Kume et al. |
| 2017/0360450 A1 | 12/2017 | Tompkins et al. |
| 2017/0361072 A1 | 12/2017 | Chou et al. |
| 2017/0367713 A1 | 12/2017 | Greene, Jr. et al. |
| 2017/0367857 A1 | 12/2017 | Bennett et al. |
| 2017/0368296 A1 | 12/2017 | Chang |
| 2017/0368309 A1 | 12/2017 | Garrison et al. |
| 2018/0008294 A1 | 1/2018 | Garrison et al. |
| 2018/0008295 A1 | 1/2018 | Ulm, III |
| 2018/0008439 A9 | 1/2018 | Tieu et al. |
| 2018/0014840 A1 | 1/2018 | Panian |
| 2018/0028209 A1 | 2/2018 | Sudin et al. |
| 2018/0036155 A1 | 2/2018 | Tieu et al. |
| 2018/0055516 A1 | 3/2018 | Baldwin et al. |
| 2018/0064453 A1 | 3/2018 | Garrison et al. |
| 2018/0116684 A1 | 5/2018 | Garrison et al. |
| 2018/0161541 A1 | 6/2018 | Haldis et al. |
| 2018/0242978 A1 | 8/2018 | Chou et al. |
| 2018/0339130 A1 | 11/2018 | Ogle |
| 2019/0117891 A1 | 4/2019 | Carothers et al. |
| 2019/0133744 A1 | 5/2019 | Janardhan et al. |
| 2019/0183517 A1 | 6/2019 | Ogle et al. |
| 2019/0269538 A1 | 9/2019 | Chou et al. |
| 2020/0016321 A1 | 1/2020 | Criado et al. |
| 2020/0197031 A1 | 6/2020 | Nguyen et al. |
| 2021/0212707 A1 | 7/2021 | Chou et al. |
| 2023/0000510 A1 | 1/2023 | Brady et al. |

FOREIGN PATENT DOCUMENTS

| | | |
|---|---|---|
| CN | 103110998 A | 5/2013 |
| CN | 103260689 A | 8/2013 |
| CN | 103284775 A | 9/2013 |
| CN | 103648574 A | 3/2014 |
| CN | 103861193 A | 6/2014 |
| CN | 204158457 U | 2/2015 |
| CN | 104394785 A | 3/2015 |
| CN | 10475829 A | 7/2015 |
| CN | 104739486 A | 7/2015 |
| CN | 104758029 A | 7/2015 |
| DE | 102006039236 A1 | 2/2008 |
| EP | 0117940 A2 | 9/1984 |
| EP | 0427429 A2 | 5/1991 |
| EP | 1226795 A2 | 7/2002 |

(56) References Cited

FOREIGN PATENT DOCUMENTS

| | | |
|---|---|---|
| EP | 1440663 A1 | 7/2004 |
| EP | 1639951 A1 | 3/2006 |
| EP | 2 069 528 B1 | 3/2013 |
| EP | 2821094 A1 | 1/2015 |
| EP | 1871292 B1 | 10/2019 |
| GB | 2020557 A | 11/1979 |
| JP | 3026200 U | 7/1996 |
| JP | H09-512445 A | 12/1997 |
| JP | 2002-291756 A | 10/2002 |
| JP | 2008-503249 A | 2/2008 |
| JP | 2008-517652 A | 5/2008 |
| JP | 3142466 U | 6/2008 |
| JP | 2014-138756 A | 7/2014 |
| WO | WO-88/01885 A1 | 3/1988 |
| WO | WO-93/17750 A1 | 9/1993 |
| WO | WO-94/02194 A1 | 2/1994 |
| WO | 95-05209 A1 | 2/1995 |
| WO | 98-38930 A1 | 9/1998 |
| WO | WO-99/45835 A2 | 9/1999 |
| WO | 00-16705 A1 | 3/2000 |
| WO | WO-00/32266 A1 | 6/2000 |
| WO | WO-00/76390 A2 | 12/2000 |
| WO | WO-01/15767 A1 | 3/2001 |
| WO | WO-01/58365 A1 | 8/2001 |
| WO | WO-2002/32495 A1 | 4/2002 |
| WO | 02-055146 A1 | 7/2002 |
| WO | 02-085092 A2 | 10/2002 |
| WO | WO-03/018085 A2 | 3/2003 |
| WO | WO-03/090831 A2 | 11/2003 |
| WO | WO-2004/006803 A1 | 1/2004 |
| WO | WO-2005/051206 A1 | 6/2005 |
| WO | WO-2006/111944 A1 | 10/2006 |
| WO | WO-2006/127929 A2 | 11/2006 |
| WO | WO-2006/132434 A1 | 12/2006 |
| WO | WO-2008/006111 A2 | 1/2008 |
| WO | WO-2008/144587 A2 | 11/2008 |
| WO | WO-2009/012473 A3 | 4/2009 |
| WO | WO-2009/099764 A1 | 8/2009 |
| WO | WO-2009/100210 A1 | 8/2009 |
| WO | 2010-014777 A1 | 2/2010 |
| WO | WO-2010/039456 A1 | 4/2010 |
| WO | WO-2010/075445 A1 | 7/2010 |
| WO | WO-2010/075565 A2 | 7/2010 |
| WO | WO-2011/011493 A1 | 1/2011 |
| WO | WO-2011/057282 A2 | 5/2011 |
| WO | WO-2012/009518 A1 | 1/2012 |
| WO | WO-2012/035633 A1 | 3/2012 |
| WO | WO-2012/047803 A2 | 4/2012 |
| WO | WO-2014/203336 A1 | 12/2014 |
| WO | WO-2015/042368 A2 | 3/2015 |
| WO | WO-2015/100178 A1 | 7/2015 |
| WO | 2017-091554 A1 | 6/2017 |

OTHER PUBLICATIONS

Feldman, "Transcatheter Aspiration of a Thrombus in an Aortocoronary Saphenous Vein Graft," American Journal of Cardiology, 60(4):379-380 ( 1987).

Good et al., "Hydrodynamics in Acute Ischemic Stroke Catheters Under Static and Cyclic Aspiration Conditions," Cardiovascular Engineering and Technology, vol. 11 (6), Dec. 2020, 689-698.

Penumbra, Inc., "Penumbra, Inc. Completes Pivotal Stroke Trial of Intracranial Revascularization" Press Release (2007).

Penumbra, Inc., "The Penumbra Pivotal Stroke Trial: Safety and Effectiveness of a New Generation of Mechanical Devices for Clot Removal in Intracranial Large Vessel Occlusive Disease," Stroke, 40:2761-2768 (2009).

Penumbra, Inc., "The Penumbra System®: Continuous Aspiration Thrombectomy (CAT)," Marketing Brochure © 2010 (6 pages).

Penumbra, Inc., "5Max™: Direct Aspiration™ Enables Choice," Marketing brochure © 2013 (6 pages).

Reeder et al., "Aspiration Thrombectomy for Removal of Coronary Thrombosis," American Journal of Cardiology, 70:107-110 (Jul. 1, 1992) (Abstract only).

Simon et al., "Exploring the efficacy of cyclic vs static aspiration in a cerebral thrombectomy model: an initial proof of concept study", Trauma Surgery & Acute Careopen, vol. 6 No. 9, (2013).

Webb et al., "Retrieval and Analysis of Particulate Debris After Saphenous Vein Graft Intervention," Journal of the American College of Cardiology, 34(2);468-475 (1999).

Yoo et al., "The Penumbra Stroke System: a technical review," Journal of NeuroInterventional Surgery, 4:199-205 (2012).

Abstracts from the 2007 International Stroke Conference, Stroke, 38(2):453-607 (2007).

International Search Report and Written Opinion from co-pending application, PCT/US2016/063269, dated Apr. 3, 2017.

Communication from co-pending European Application No. 16869159.0 for PCT/US2016/063269 dated Jul. 5, 2019.

Office Action from co-pending Chinese Patent Application No. 201680079662X dated May 21, 2020.

2012 Buyer's Guide: Microcatheters. Endovascular Today, 2012, pp. 48-51.

"Asahi Fubuki Catheter Dilator Kit." Asahi-Intecc USA Medical. 2017. Web. Accessed Oct. 2, 2017. 3 pages. www.asahi-inteccusa-medical.com/medical-product/fubuki-dilator-kit/. Accessed Oct. 2, 2017.

Adami, M.D., et al., (2002) "Use of the Parodi Anti Embolism System in Carotid Stenting: Italian Trial Results" J Endovasc Ther, 9:147-154.

Alexandrescu et al. (2006) "Filter-protected carotid stenting via a minimal cervical access with transitory aspirated reversed flow during initial passage of the target lesion" J. Endovasc. Ther. 13(2):196-204.

Alvarez et al. (2008). "Transcervical carotid stenting with flow reversal is safe in octogenarians: A preliminary safety study" J. Vasc. Surg. 47:96-100.

Bates M.D., et al. (2003). "Reversal of the Direction of Internal Carotid Artery Blood Flow by Occlusion of the Common and External Carotid Arteries in a Swine Model" Catherization and Cardiovascular Intervention 60:270-275.

Bates, M.D., et al. (2004) "Internal Carotid Artery Flow Arrest/Reversal Cerebral Protection Techniques" The West Virginal Medical Journal, vol. 99:60-63.

Bergeron et al. (1999). "Percutaneous stenting of the internal carotid artery: the European CAST I Study" J. Endovasc. Surg. 6:155-159.

Bergeron et al. (2008) MEET Presentation, Cannes, French Riviera "Why I do not use routine femoral access for CAS". 12 pages.

Bergeron P. et al. (1996).."Recurrent Carotid Disease:.Will Stents be an alternative to surgery?" J Endovasc Surg; 3: 76-79.

Bourekas, E. C., A. P. Slivka, et al. (2004). "Intraarterial thrombolytic therapy within 3 hours of the onset of stroke." Neurosurgery 54(1): 39-44; discussion 44-6.

Chang, D.W., et al, "A new approach to carotid angioplasty and stenting with transcervical occlusion and protective shunting: Why it may be a better carotid artery intervention" (J Vasc Surg 2004; 39:994-1002.).

Chang, M.D., "Carotid Angioplasty and Stenting Using Transcervical Occlusion and Protective Shunting via a Mini Incision in the Neck: A New Technique for Difficult Femoral Access or Filter Placement May Be the Better Carotid Artery Intervention" 30th Global: Vascular and Endovascular Issues, Techniques and Horizons Symposium, New York, NY, Nov. 20-23, 2003; XXVII 6.1-XXVII 6.2.

Chueh, J. Y. et al. (2013). "Reduction in Distal Emboli with Proximal Flow Control During Mechanical Thrombectomy." Stroke, 44(5), 1396-1401.

Cohen et al. (2012). "A reappraisal of the common carotid artery as an access site in interventional procedures for acute stroke therapies", Case Reports, Journal of Clinical Neuroscience 19, pp. 323-326.

Coppi et al. (2005). "Priamus Proximal flow blockage cerebral protection during carotid stenting: Results from a multicenter Italian registry" J. Cardiovasc. Surg. 46:219-227.

Criado et al. (1997). "Evolving indications for and early results of carotid artery stenting" Am. J. Surg.; 174:111-114.

(56) References Cited

OTHER PUBLICATIONS

Criado et al. (2004). "Transcervical carotid artery angioplasty and stenting with carotid flow reversal: Surgical technique" J. Vasc. Surg. 18:257-261.
Criado et al. (2004). "Transcervical carotid stenting with internal carotid artery flow reversal: Feasibility and preliminary results" J. Vasc. Surg. 40:476-483.
Criado, et al. (2007). "Transcervical carotid stenting with carotid artery flow reversal: 3-year follow-up of 103 stents." J Vasc Surg 46(5): 864-9.
Criado, F.J., et al. (2000). "Access strategies for carotid artery intervention." J Invasive Cardiol, 12(1): p. 61-8.
Criado, M.D., et al. (2004). "Carotid angioplasty with internal carotid artery flow reversal is well tolerated in the awake patient." Journal of Vascular Surgery, 40(1):92-7.
Diederich et al. (2004). "First Clinical experiences with an endovascular clamping system for neuroprotection during carotid stenting" Eur. J. Vasc. Endovasc. Surg. 28:629-633.
Diethrich et al., (1996). "Percutaneous techniques for endoluminal carotid interventions" J. Endovasc. Surg. 3:182-202.
Diethrich, E. B. (2004). The Direct Cervical Carotid Artery Approach. Carotid Artery Stenting: Current Practice and Techniques. N. Al Mubarak, G. S. Roubin, S. Iyer and J. Vitek. Philadephia, Lippincott Williams & Wilkins: Chapter 11. pp. 124-136.
Farooq, Vasim et al. "The Use of a Guide Catheter Extension System as an Aid During Transradial Percutaneous Coronary Intervention of Coronary Artery Bypass Grafts." Catheterization and Cardiovascular Interventions, vol. 78, No. 6, 2011, pp. 847-863.
Feldtman, R. W., C. J. Buckley, et al. (2006). "How I do it: cervical access for carotid artery stenting." Am J Surg 192(6): 779-81.
Fiorella, D., M. Kelly, et al. (2008). "Endovascular Treatment of Cerebral Aneurysms." Endovascular Today Jun. 2008. pp. 53-64.
Frazee, J. G. and X. Luo (1999). "Retrograde transvenous perfusion." Crit Care Clin 15(4): 777-88, vii.
Frazee, J. G., X. Luo, et al. (1998). "Retrograde transvenous neuroperfusion: a back door treatment for stroke." Stroke 29(9): 1912-6.
Friedrich, Benjamin, et al. "Distance to Thrombus in Acute Middle Cerebral Artery Occlusion." Stroke, vol. 46, No. 3, 2015, pp. 692-696.
Frölich AM, et al. (2020, Epub Sep. 3, 2020). "The novel Tenzing 7 delivery catheter designed to deliver intermediate catheters to the face of embolus without crossing: clinical performance predicted in anatomically challenging model." J NeuroIntervent Surg, 5 pages. doi:10.1136/neurintsurg-2020-016412.
Goldstein (2007). "Acute Ischemic Stroke Treatment in 2007" Circ 116:1504-1514.
Goyal, M. et al. (Mar. 12, 2015, e-published Feb. 11, 2015). "Randomized Assessment of Rapid Endovascular Treatment of Ischemic Stroke." N Engl J Med, 372(11):1019-1030.
Gray et al. (2007) "The CAPTURE registry: Results of carotid stenting with embolic protection in the post approval setting" Cath. Cardovasc. Interven.69:341-348.
Guidezilla Guide Extension Catheter, Boston Scientific 510k Submission, Feb. 19, 2013, 5 pages. Web. Accessed Oct. 23, 2017.
Heart and Stroke Foundation of Canada. "Vacuum cleaner sucks up strokes." ScienceDaily, Jun. 8, 2010, 4 pages, www.sciencedaily.com/releases/2010/06/100608162240.htm.
Henry et al. (1999). "Carotid stenting with cerebral protection: First clinical experience using the PercuSurge GuardWire System" J. Endovasc. Surg. 6:321-331.
Hoffer et al. (2003). "Percutaneous Arterial Closure Devices" J. Vasc. Interv. Radiol. 14:865-885.
Howell, M., K. Doughtery, et al. (2002). "Percutaneous repair of abdominal aortic aneurysms using the AneuRx stent graft and the percutaneous vascular surgery device." Catheter Cardiovasc Interv 55(3): 281-7.
Jankowitz, Brian, et al. (2012). "Manual Aspiration Thrombectomy Adjunctive Endovascular Recanalization Technique in Acute Stroke Interventions." Stroke, vol. 43, No. 5, pp. 1408-1411.

Koebbe, C. J., E. Veznedaroglu, et al. (2006). "Endovascular management of intracranial aneurysms: current experience and future advances." Neurosurgery 59(5 Suppl 3): S93-102; discussion S3-13.
Kopeck, Rachel. "Penumbra, Inc. Launches 5MAX™ ACE—The Newest Clot Extraction Device to Treat Acute Ischemic Stroke Patients." Penumbra Inc., Jul. 8, 2013, 3 pages, http://www.penumbrainc.com/news/penumbra-inc-launches-5max-ace-the-newest-clot-extraction-device-to-treat-acute-ischemic-stroke-patients/.
Lin et al. (2005). "Protected carotid artery stenting and angioplasty via transfemoral versus transcervical approaches." Vasc. Endovasc. Surg. 39(6):499-503.
Lo et al. (2005) "Advantages and indications of transcervical carotid artery stenting with carotid flow reversal." J. Cardovasc. Surg (Torino). 46(3):229-239.
Luebke, T et al. (2007.) "Meta-analysis of randomized trials comparing carotid endarterectomy and endovascular treatment." Eur. J. Vasc. Endovasc. Surg.34:470-479.
MacDonald, S. (2006) "Is there any evidence that cerebral protection is beneficial?" J. Cardiovasc. Surg. 47:127-36.
Mas et al. (2006). "Endarterectomy versus stenting in patients with symptomatic severe carotid stenosis" NEJM 355:1660-71.
Matas et al. (2007). "Transcervical carotid stenting with flow reversal protection: Experience in high-risk patients" J. Vasc. Surg. 46:49-54.
Mokin, Maxim, et al. (2015). "Primary stentriever versus combined stentriever plus aspiration thrombectomy approaches: in vitro stroke model comparison." Journal of NeuroInterventional Surgery, vol. 7, pp. 453-457.
MomaPresn (AET). Biamino, G. MO.MA as a distal protective device, University of Leipzig, Heart Center Department of Clinical and Interventional, Angiology Leipzig, Germany, 2002. 37 pages.
Nesbit, G. M., G. Luh, et al. (2004). "New and future endovascular treatment strategies for acute ischemic stroke." J Vasc Interv Radiol 15(1 Pt 2): S103-10.
Nii, K., K. Kazekawa, et al. (2006). "Direct carotid puncture for the endovascular treatment of anterior circulation aneurysms." AJNR Am J Neuroradiol 27(7): 1502-4.
Ohki, M.D., et al. (2001)."Efficacy of a proximal occlusion catheter with reversal of flow in the prevention of embolic events during carotid artery stenting: An experimental analysis." J Vasc Surg; 33:504-9.
Ouriel, K., R. K. Greenberg, et al. (2001). "Hemodynamic conditions at the carotid bifurcation during protective common carotid occlusion." J Vasc Surg 34(4): 577-80.
Parodi (2005). "Is flow reversal the best method of protection during carotid stenting?" J Endovasc. Ther. 12:166-170.
Parodi et al. (2000). "Initial evaluation of carotid angioplasty and stenting with three different cerebral protection devices" J. Vasc. Surg. 32:1127-1136.
Parodi, J. C., L. M. Ferreira, et al. (2005). "Cerebral protection during carotid stenting using flow reversal." J Vasc Surg 41(3): 416-22.
Patel, Tejas et al. (2014) "Balloon-Assisted Tracking: A Must-Know Technique to Overcome Difficult Anatomy During Transradial Approach," Catheter Cardiovasc. Interv., 83(2):211-220.
Paullus WS, Pait TG, Rhoton AI Jr. Microsurgical exposure of the petrous portion of the carotid artery. J Neurosurg. 1977;47(5):713-726. (Year: 1977).
Pena, Carlos. "Letter to Sequent Medical Inc Re: K150894, Trade/Device Name: VIA™ 21 Microcatheter." Department of Health & Human Services, Aug. 28, 2015, 14 pages.
Pereira, V.M. et al. (2020, e-published Mar. 3, 2020). "First-in-human, robotic-assisted neuroendovascular intervention." Journal of Neurointerventional Surgery, 12(4), 338-340. https://doi.org/10.1136/neurintsurg-2019-015671.rep.
Perez Arjona, E. A., Z. DelProsto, et al. (2004). "Direct percutaneous carotid artery stenting with distal protection: technical case report." Neurol Res 26(3): 338-41.
Pipinos et al. (2005). "Transcervical approach with protective flow reversal for carotid angioplasty and stenting" J. Endovasc. Ther. 12:446-453.

(56) References Cited

OTHER PUBLICATIONS

Pipinos et al. (2006). "Transcervical carotid stenting with flow reversal for neuroprotection: Technique, results, advantages, and limitations" 14(5):245-255.

Powers, W.J., et al. (2015, e-published online before print Jun. 29, 2015). "2015 AHA/ASA Focused Update of the 2013 Guidelines for the Early Management of Patients With Acute Ischemic Stroke Regarding Endovascular Treatment: A Guideline for Healthcare Professionals From the American Heart Association/American Stroke Association Powers et al. on behalf of the American Heart Association Stroke Council Stroke." Stroke. 46:3020-3035.

Reekers, J. A. (1998). "A balloon protection sheath to prevent peripheral embolization during aortoiliac endovascular procedures." Cardiovasc Intervent Radiol 21(5): 431-3.

Reimers et al. (2005). "Proximal endovascular flow blockage for cerebral protection during carotid artery stenting: Results froma prospective multicenter registry" J. Endovasc. Ther. 12:156-165.

Request for Ex Parte Reexamination Transmittal Form and Request for Ex Parte Reexamination pursuant to 37 CFR 1.150 of U.S. Pat. No. 9,820,761 issued Nov. 21, 2017. Request filed May 11, 2018 and assigned U.S. Appl. No. 90/014,136. 35 pages.

Ribo et al. (2006). "Transcranial doppler monitoring of transcervical carotid stenting with flow reversal protection: a novel carotid revascularization technique" 27:2846-2849 (originally published online Sep. 28, 2006).

Ribo, M., C. Molina, et al. (2008). "Buying Time for Recanalization in Acute Stroke: Arterial Blood Infusion Beyond the Occluding Clot as a Neuroprotective Strategy." J Neuroimaging. 4 pages.

Ross, I. B. and G. D. Luzardo (2006). "Direct access to the carotid circulation by cut down for endovascular neuro interventions." Surg Neurol 65(2): 207-11; discussion 211.

Saver, J.L. et al. (Jun. 11, 2015, e-published Apr. 17, 2015). "Stent-Retriever Thrombectomy after Intravenous t-PA vs. t-PA Alone in Stroke." N Engl J Med, 372(24):2285-2295.

Seidel, A. et al. (2005). "Relationship between the diameter of great saphenous vein and body mass index," J Vasc Bras, vol. 4, No. 3, p. 265-269.

Stejskal, et al., "Experience of 500 Cases of Neurophysiological Monitoring in Carotid Endarterectomy", Acta Neurochir, 2007, 149:681-689.

Stys, Adam T. et al. "A Novel Application of GuideLiner Catheter for Thrombectomy in Acute Myocardial Infarction: A Case Series." Journal of Invasive Cardiology, vol. 25, No. 11, 2013, pp. E254-E259. 6 pages. (http://www.invasivecardiology.com/issue/4284).

Theron, et al. "New Triple Coaxial Catheter System for Carotid Angioplasty with Cerebral Protection.". AJNR 11:869-874, Sep./Oct. 1990. 0195 6108/90/1106 0869. American Society of Neurology.

Yuki et al. (2012). "The Impact of Thromboemboli Histology on the Performance of a Mechanical Thrombectomy Device." AJNR. American Journal of Neuroradiology, 33(4), 643-648.

Zuckerman, Bram. "Letter to Cathera Inc: Re K151638, Trade/Device Name: Phenom™ Catheters." Department of Health & Human Services, Nov. 13, 2015, 6 pages.

Halbach, V.V. et al. (1991). "Management of vascular perforations that occur during neurointerventional procedures." AJNR. American Journal of Neuroradiology, 12(2), 319-327.

Jauch, E.C. et al. (2013). American Heart Association Stroke Council, Council on Cardiovascular Nursing, Council on Peripheral Vascular Disease, & Council on Clinical Cardiology. Guidelines for the early management of patients with acute ischemic stroke: a guideline for healthcare professionals from the American Heart Association/American Stroke Association. Stroke, 44(3), 870-947.

Merci Retrieval System® L Series Animation [Video]. (Mar. 14, 2013). StrokeInfo. YouTube. http://www.youtube.com/embed/9BEH8xzLRSs?wmode=transparent&fs=1&hl=en&modestbranding=1&showsearch=0&rel=0&theme=darkretrieved. Wayback Machine http://web.archive.org/web/20130314142314/http:/www.youtube.com/embed/9BEH8xzLRSs?wmode=transparent&fs=1&hl=en&modestbranding=1&showsearch=0&rel=0&theme=dark , retrieved on May 7, 2025. 2 pages.

Merci® Retrieval System. (2006). Concentric Medical. 2 pages. Archived at https://web.archive.org/web/20061107161134/http://www.concentric-medical.com/pdfs/APM0126_A_OUS%20Spec%20Sheet%202006-05.pdf, retrieved on May 7, 2025.

Stryker Signs Definitive Agreement to Acquire Concentric Medical, Inc. (Aug. 31, 2011). PR Newswire. https://www.prnewswire.com/news-releases/stryker-signs-definitive-agreement-to-acquire-concentric-medical-inc-128833048.html. Archived Wayback Machine Sep. 26, 2011 http://web.archive.org/web/20110926112841/https:/www.prnewswire.com/news-releases/stryker-signs-definitive-agreement-to-acquire-concentric-medical-inc-128833048.html, retrieved on May 7, 2025. 3 pages.

Communication from corresponding European Patent Application No. 16891959.0 for PCT/US2016/063269 dated Jan. 31, 2024.

\* cited by examiner

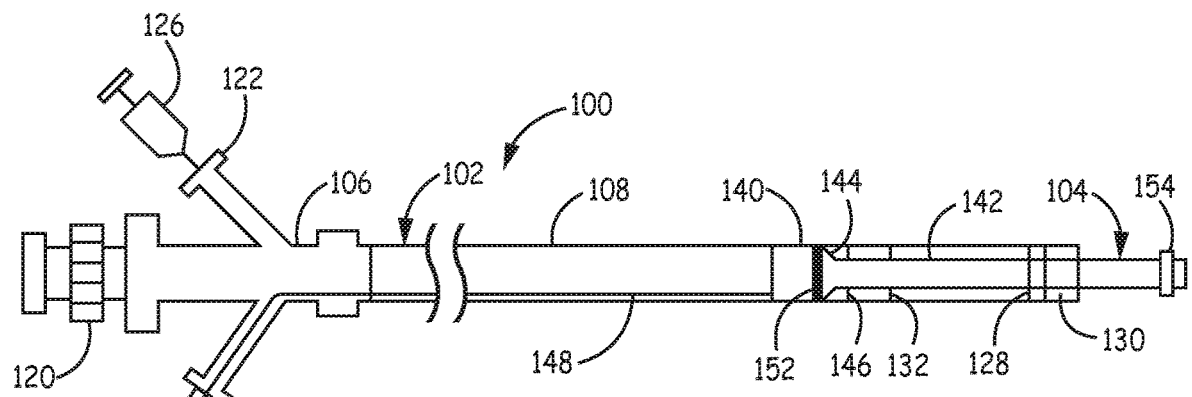
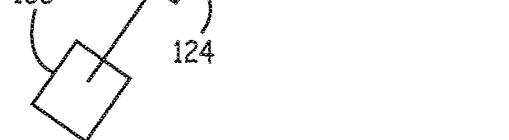
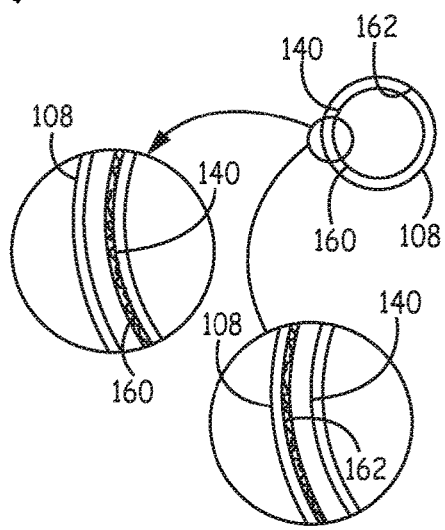
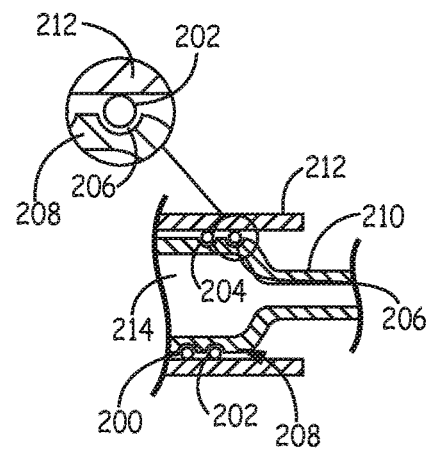
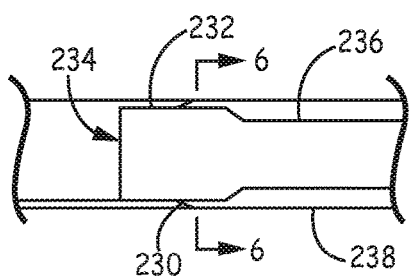
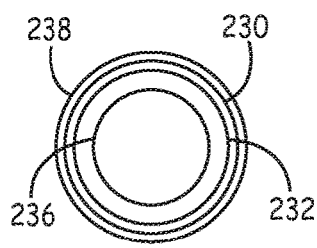

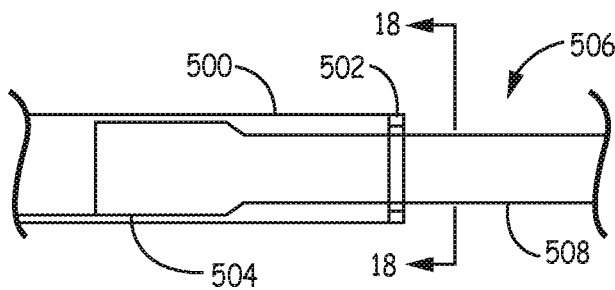
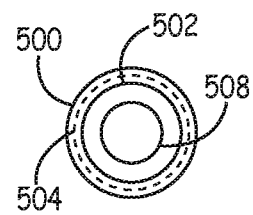
FIG. 17  FIG. 18
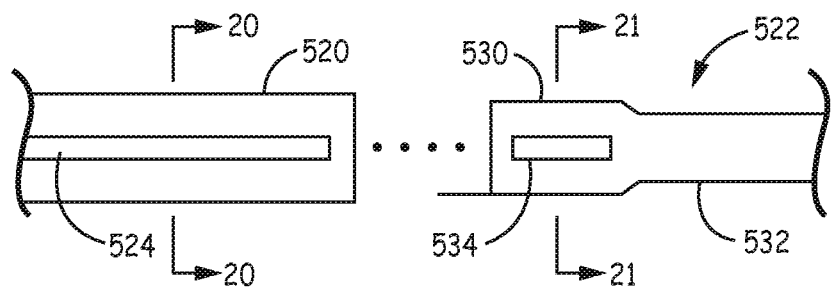
FIG. 19
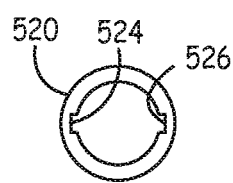 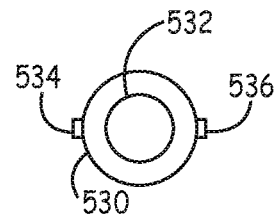
FIG. 20  FIG. 21
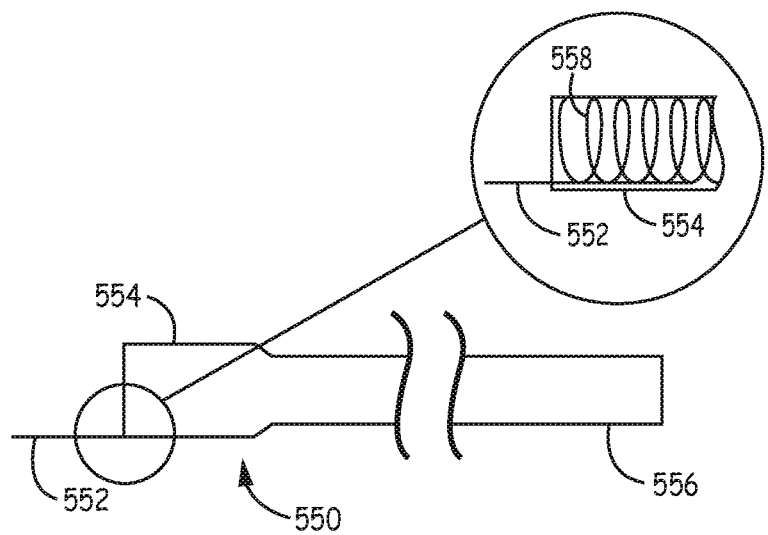
FIG. 22

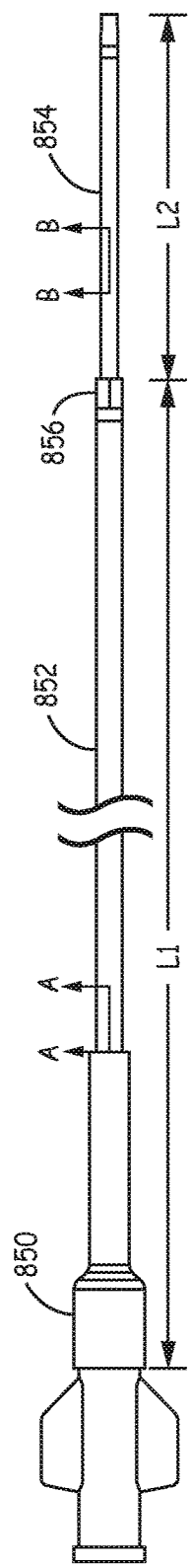
FIG. 40
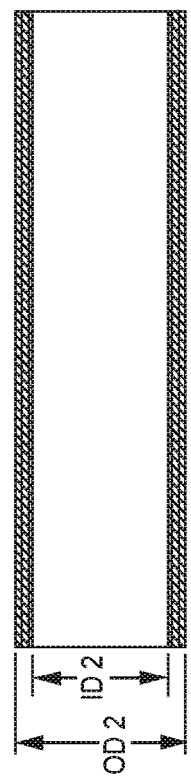
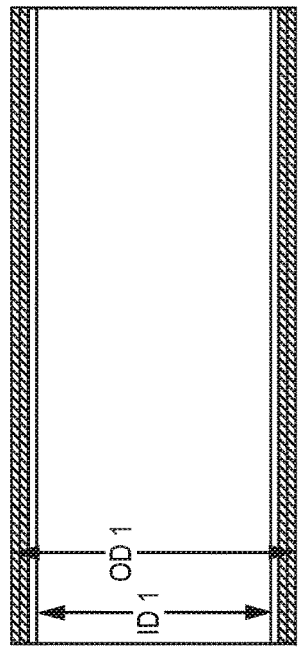
FIG. 41
FIG. 42
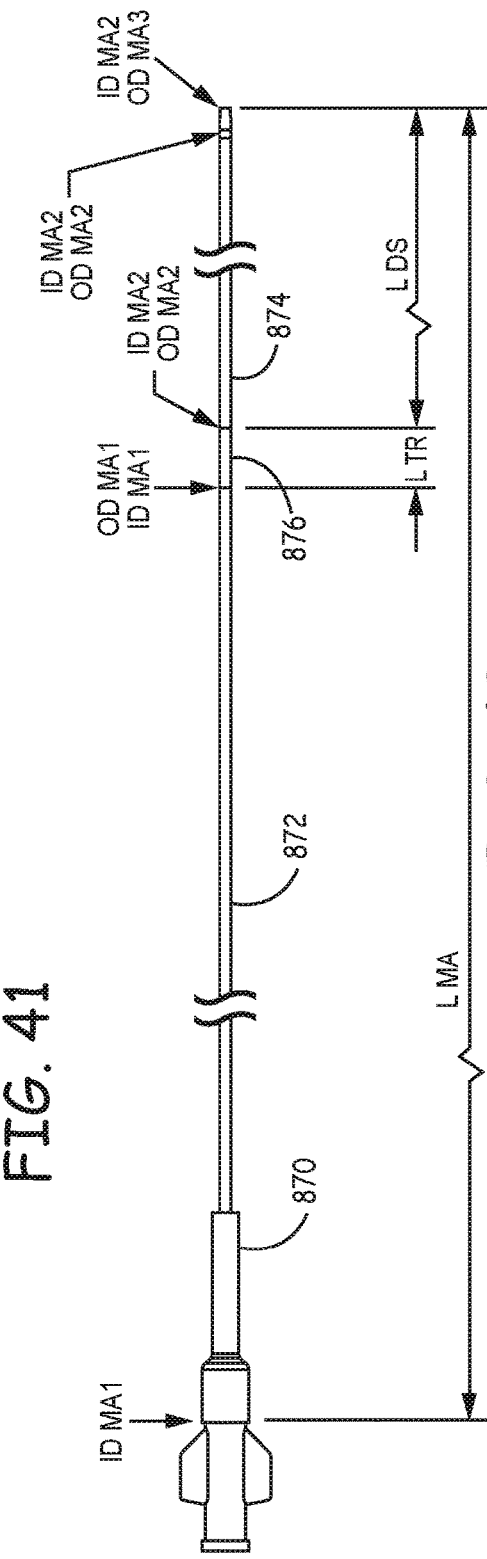
FIG. 43

CATHETER SYSTEMS FOR APPLYING EFFECTIVE SUCTION IN REMOTE VESSELS AND THROMBECTOMY PROCEDURES FACILITATED BY CATHETER SYSTEMS

CROSS REFERENCE TO RELATED APPLICATIONS

This application is a continuation of U.S. patent application Ser. No. 16/877,796 filed on May 19, 2020 to Ogle et al., entitled "Catheter Systems For Applying Effective Suction In Remote Vessels And Thrombectomy Procedures Facilitated By Catheter Systems," which is a continuation of corresponding U.S. patent application Ser. No. 14/949,574 (now U.S. Pat. No. 10,716,915) filed on Nov. 23, 2015 to Ogle et al., entitled "Catheter Systems For Applying Effective Suction In Remote Vessels And Thrombectomy Procedures Facilitated By Catheter Systems," incorporated herein by reference.

FIELD OF THE INVENTION

The invention relates to catheters designed for use in bodily vessels with tortuous paths, such as cerebral arteries. The invention further relates to methods of using such catheters.

BACKGROUND OF THE INVENTION

Procedures in blood vessels of the brain are gaining interest as an approach for ameliorating acute stroke events or other interventions in blood vessels in the brain. Blood vessels in the brain follow particularly tortuous paths which can increase the difficulty of reaching target locations in these vessels. Other vessels in a patient can also follow winding paths that increase the difficulty of reaching target locations.

Aspiration catheters have found use with respect to removal of clots from vessels. Furthermore, a significant reason for ischemic injury during percutaneous procedures can be generation of emboli that block smaller distal vessels. Aspiration catheters used alone or with embolic protection device can be effective to capture emboli generated during procedures. The delivery of effective devices to the small blood vessels of the brain to remove clots and/or to capture emboli remains challenging.

Ischemic strokes can be caused by clots within a cerebral artery. The clots block blood flow, and the blocked blood flow can deprive brain tissue of its blood supply. The clots can be thrombus that forms locally or an embolus that migrated from another location to the place of vessel obstruction. To reduce the effects of the cut off in blood supply to the tissue, time is an important factor. In particular, it is desirable to restore blood flow in as short of a period of time as possible. The cerebral artery system is a highly branched system of blood vessels connected to the interior carotid arteries. The cerebral arteries are also very circuitous. Medical treatment devices should be able to navigate along the circuitous route posed by the cerebral arteries for placement into the cerebral arteries.

SUMMARY OF THE INVENTION

In a first aspect, the invention pertains to a suction catheter system comprising a guide catheter and a suction extension. The guide catheter can comprise a tubular shaft with a central lumen having an inner diameter, a proximal end and a distal opening, and a proximal section operably connected with the proximal end of the tubular shaft and having fittings that connect to a suction device. The suction extension can comprise a proximal portion, a suction tip comprising a distal opening and extending from the proximal portion in a distal direction, and a control structure connecting the proximal portion with the proximal section of the guide catheter. In some embodiments, the suction tip can have a distal inner diameter that is from about 20 percent to about 90 percent of the central lumen inner diameter. Generally, the proximal portion can be configured to slide within the central lumen of the tubular shaft to change the relative position of the proximal portion within the central lumen and provide for at least a portion of the narrow diameter suction extension to extend outward from the distal opening of the tubular shaft at appropriate configurations of the proximal portion. A suction lumen is formed extending from the fitting configured to connect to the suction device through a portion of the central lumen, the proximal portion and the suction tip to a distal opening.

In a further aspect, the invention pertains to a method for using the suction catheter system described above for performing a thrombectomy procedure. In general, the method can comprise applying suction through the suction lumen of the suction catheter system positioned with the guide catheter extending into a vessel of a patient in a percutaneous configuration, to draw fluid into the distal opening of the suction tip to remove thrombus from the vessel. The suction catheter system can be particularly suitable for performing procedures in the cerebral arteries.

In another aspect, the invention pertains to a method for performing a medical procedure in a bodily vessel using a suction catheter system comprising a guide catheter and a suction extension slidably engaged with the guide catheter, the suction extension comprising a proximal portion configured to remain in a central lumen of the guide catheter and a suction tip extending in a distal direction from the proximal portion. The method can comprise tracking the suction tip to a desired location within a vessel by sliding the suction extension relative to the guide catheter.

In additional aspects, the invention pertains to a delivery catheter comprising a proximal tubular element having an outer diameter from about 1 mm to about 3 mm and a distal tubular element comprising a distal opening and extending from the distal end of the proximal tubular element wherein the distal tubular element has an initial inner diameter no more than about 1.5 mm and at least a factor of two smaller than the proximal tubular element inner diameter. The distal tubular element generally is formed from an elastic material that can stretch to at least about 1.5 times greater than the initial inner diameter.

Moreover, the invention pertains to a method based on the delivery catheter described above for placement of a first medical device into a narrow tortuous vessel of the body. In appropriate embodiments, the method can comprise: advancing the first medical device over a guidewire through the delivery catheter out through the distal opening of the distal tubular element, and the first medical device has a radial profile relative to the guidewire axis greater than the initial inner diameter of the distal tubular element.

BRIEF DESCRIPTION OF THE DRAWINGS

FIG. 1 is a side view of a suction system comprising a guide catheter with a suction extension with the guide catheter shown as transparent in this and most subsequent figures, as would be clear from the figure, to allow visualization of structure within the guide catheter.

FIG. 2 is a fragmentary side view of an expanded portion of the catheter system of FIG. 1 showing the interface of the suction extension with the guide catheter.

FIG. 3 is a sectional view taken along line 3-3 of FIG. 2 with two inserts showing expanded views of two embodiments with coatings.

FIG. 4 is a fragmentary side view of an embodiment of a seal between the suction expansion and the guide catheter comprising o-rings.

FIG. 5 is a fragmentary side view of an embodiment of a seal between the suction expansion and the guide catheter comprising an elastic seal.

FIG. 6 is a sectional view taken along line 6-6 of FIG. 5.

FIG. 17 is a fragmentary side view of a suction system having a stop mounted at the distal end of a guide catheter.

FIG. 18 is a sectional view taken along line 18-18 of FIG. 17 showing a stop at the distal opening of the guide catheter.

FIG. 19 is a fragmentary, exploded side view of showing the suction extension separated from the guide catheter, in which a projection along the proximal portion of the suction extension rides within a track within guide catheter.

FIG. 20 is a sectional view depicting the guide catheter having a channel with the section taken along lines 20-20 of FIG. 19.

FIG. 21 is a sectional view depicting the proximal portion of the suction extension along a portion having ridges with the section taken along line 21-21 of FIG. 19.

FIG. 22 is a side view of the suction extension with the expanded insert showing the attachment of a control wire to the proximal portion.

FIG. 40 is a side view of a prototype suction system with a fixed suction tip.

FIG. 41 is a fragmentary sectional view of the guide catheter of the suction system of FIG. 40 with the section taken along line A-A of FIG. 40.

FIG. 42 is a fragmentary sectional view of the suction tip of the suction system of FIG. 40 with the section taken along line B-B of FIG. 40.

FIG. 43 is a side view of a MI-AXUS commercial catheter used for comparative measurements of suction performance.

DETAILED DESCRIPTION OF THE INVENTION

Figure 7A:
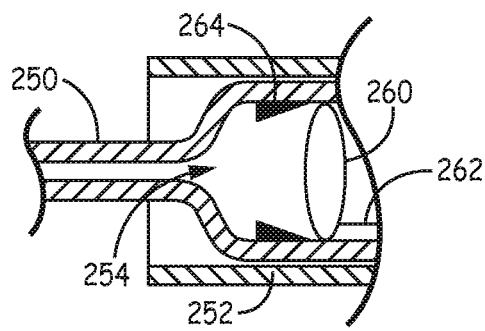
FIG. 7A is a fragmentary side view of an interface between a suction extension and guide catheter comprising a seal involving elastic deformation based on movement of a slidable loop, shown in the unsealed configuration.

A catheter system can include a guide catheter adapted with a suction extension with a narrower distal tube that can provide suction with a high flow rate and a low pressure drop. Suction catheters can be used advantageously for the removal of thrombus and emboli from bodily vessels, such as arteries. Some vessels can have a narrow diameter, and treatment locations can be downstream along a circuitous path, and for such vessels there are constraints on the catheter structures able to reach the treatment locations in the vessel. The designs described herein comprise a slidable extended suction tip that can be adapted for use in conjunction with a guide catheter, which forms a significant portion of the overall suction lumen. The slidable suction tip comprises a slide that engages the inner wall of the guide catheter to make a suitably tight fit and a control wire or other suitable control element can be attached to the suction extension to position the slidable suction tip. The extendable suction tip, which may have an optional curved tip, can be tracked well over a guidewire to reach difficult to reach locations in the vessel. While the suction catheter system can be used in any suitable vessels of the body, the system can be particularly desirable in cerebral blood vessels, such as for the treatment of acute stroke. The catheter system can be effectively used as an effective standalone suction catheter. Furthermore, the catheter system can be effective as a component of a thrombectomy treatment system or other medical system to provide suction with the use of other medical devices, such as an atherectomy device, to disrupt thrombus and/or a filter structure that can catch emboli generated in the procedure as well as to be used to pull toward the suction catheter system. The treatment system can be effectively designed for stroke treatment.

Also herein, a delivery catheter is described with an elastic narrow diameter distal tip. The narrow diameter tip can have an inner diameter just larger than a guidewire, so that the narrow tip can be effectively tracked over the guidewire to difficult to reach locations within the vasculature or other tortuous vessel. Due to the elastic nature of the tip structure, other percutaneous devices can be delivered through the delivery catheter and past the tip, which can expand significantly to accommodate passage of the device through the tip. Once other devices as desired are delivered though the delivery catheter, the delivery catheter can be removed or drawn back to a more proximal position to avoid interfering with subsequent procedures.

Less invasive procedures, which are commonly referred to in the art as minimally invasive procedures, are desirable in the medical context to reduce patient recovery times and hopefully to improve outcomes when appropriate. In particular, less invasive procedures are commonly performed in the vasculature using catheter based system for reaching remote locations in a selected blood vessel for the performance of various treatment processes. These procedures can also be referred to as percutaneous procedures or transluminal procedures, in contrast with open surgical procedures, to emphasize the delivery through a vessel lumen. The discussion herein focuses on treatment of ischemic stroke since the devices can be particularly effective to treat these clinically important conditions, although the devices can be used in other procedures both in the vasculature and other bodily vessels. Patients include humans and can include other mammals, such as pet animals and farm animals. The terms proximal and distal are used in their conventional sense in the art, i.e., proximal refers to closer to the point of entry into the patient along the path in the vasculature or other vessel and distal refers to farther from the point of entry along the path in the vasculature.

For the treatment of strokes, the treatment devices are advanced through arteries to blood vessels of the brain. Blood vessels generally relevant for acute stroke treatment are downstream in the blood flow from the internal carotid arteries, and arteries generally branch and decrease in average diameter as the vessel proceeds in a downstream direction in the arterial vasculature. The body has a right internal carotid artery and a left internal carotid artery. For convenience, the blood vessels downstream from the internal carotid arteries are referred to herein as cerebral arteries. The cerebral arteries can be accessed with catheter based systems from, for example, a femoral artery in the groin, an artery in the arm, or the carotid artery in the neck using hemostatic procedures and appropriate fittings, such as those known in the art. The cerebral arteries are known to follow circuitous paths, and complications in tracking devices along the vessels also follows due to shrinkage in diameter and branching of the vessels in a distal direction from the carotid artery as well as potentially dangerous conditions from damage to the blood vessel. It can be desirable to access tortuous narrow arteries for stroke treatment. The devices described herein are designed for advantageous use in these tortuous narrow cerebral vessels, but a person of ordinary skill in the art will recognize utility of these devices in other medical procedures.

The present suction catheter systems incorporate guide catheters adapted with a slideable suction extension suitable for cerebral procedures. In vascular procedures generally, a guide catheter can be used to facilitate the delivery of therapeutic devices while allowing for more rapid, accurate delivery with less risk to vessel walls through providing a protected channel leading most of the way to the treatment site. In the cerebral procedures, a guide catheter can be placed from exterior of the patient at the point of entry into the vasculature with the distal end of the guide catheter in the carotid artery or interior carotid artery. Thus, a guide catheter provides a lumen to a location relatively near to a treatment site. The size of the guide catheter sets limits on the diameter of treatment structures delivered to the treatment site, but this is generally not a significant issue since extendable devices can be delivered in a lower profile configuration with subsequent deployments to the extended and configuration and since the vessel sizes generally decrease in a distal direction from the guide catheter limiting the need for larger treatment devices. The suction devices described herein provide a suction extension that can protrude from the distal end of the guide catheter an adjustable amount through the positioning of a proximal portion of the suction extension interfacing the suction extension with the walls of the guide catheter. The proximal portion can make a sufficiently tight seal with the guide catheter walls such that suction in the guide catheter lumen is transmitted along the lumen of the suction extension. Desirable degrees of suction can be obtained through the suction extension using suction applied at the proximal end of the guide catheter.

The suction extension generally comprises a proximal portion and a suction tip extending in a distal direction from the proximal portion. The suction extension generally interfaces with the guide catheter and can be designed to be positioned with its tip at a selected position distal to the guide catheter for the performance of a procedure at a selected location, such as near the location of thrombus occluding a vessel. Since the relative position of the treatment location and the distal end of the guide catheter generally vary for a specific medical situation, the degree in which the suction extension extends from the guide catheter can be adjusted through relative movement of the suction extension. A control element, e.g., wire, can be secured to the suction extension to provide for the positioning of the suction extension. The suction extension should move within the guide catheter lumen without the need for excessive force, such as through the use of low friction polymers on one or both adjacent surfaces. Also, the proximal portion of the suction extension should provide for a relatively tight fit with the guide catheter inner wall so that significant amounts of fluid do not flow between the suction extension and the guide catheter wall when negative pressure is applied in the guide catheter lumen. The tight fit can be provided, for example, through a low clearance between the proximal portion of the suction extension and the catheter wall, through the use of a mechanical seal, such as an o-ring, wiper seal, expandable balloon, other suitable elastic seal or the like. Also, since it is desirable to prevent the proximal portion of the suction extension from exiting from the distal end of the catheter, the suction extension and/or catheter can be provided with a stop that limits the distal movement of the suction extension.

By replacing most of the length of the suction element with a control element, the device may have less friction when advanced relative to a suction catheter with a tube extending the whole length of the device since a control wire or other control element can offers less resistance for its movement. The tip of the suction extension can be given a curved tip to facilitate tracking of the device over a guidewire. Suction catheters with a curved tip have been found to improve tracking for a rapid exchange style catheter, as described in U.S. Pat. No. 8,021,351 to Boldenow et al., entitled "Tracking Aspiration Catheter," incorporated herein by reference. Thus, a suction extension for aspiration with a curved tip for tracking the tip over a guidewire can be effectively guided to difficult to reach locations with the use of a control wire or other control element moving the slide portion at or near the distal end of the suction extension, and the design provides for good suction ability without sacrificing the ability to reach difficult to reach vessels, such as within cerebral vessels. While the suction extension is moved, the guide catheter portion of the suction lumen can remain in place When suction is applied at or near the proximal end of the guide catheter with a suitable negative pressure device, fluid is sucked into a distal opening at the end of the suction extension. It has been found that surprisingly strong suction can be transmitted through to the suction extension. A suction lumen extends from a negative pressure device, generally attached at a fitting associated with a proximal section, at or near the proximal end of the suction system through the guide catheter lumen to the suction extension and through the proximal portion of the suction extension and the suction tip of the suction extension to the distal opening. Suitable negative pressure devices include, for example, syringes, pumps or the like. The guide catheter can provide a large lumen proximal section of the overall suction lumen. The effective suction lumen then can appear to have a large proximal section contributed by the guide catheter and a tapered distal section contributed by the suction extension, which can have one or more tapered segments.

The suction tip of the suction extension has a lumen with a reduced diameter relative to the guide catheter lumen and good flexibility to provide for placement of its distal end into smaller vessels. The lumen of the suction tip though is maintained at a sufficiently large diameter that provides for delivery of additional therapeutic devices through the lumen to the treatment location. Thus, the outer diameter of the suction tip generally is (diameter in mm=(Fr value)/3, Fr represents the French catheter scale) at least about 1.5 Fr less than the outer diameter of the distal section of the guide catheter. Based on bench testing and calculations presented below, the pressure drop from the proximal connection of the guide catheter with the negative pressure device and the distal tip of the suction extension can be surprisingly small. However, the decrease in diameter provides access to desirable vessels, such as cerebral vessels.

It was previously discovered that good suction properties could be obtained with a suction catheter with a stepped down diameter in a distal section. Thus, for example, the majority of the length of the suction catheter can be 6 Fr outer diameter while a distal section may be 5 Fr outer diameter, which roughly corresponding decreases in the inner diameters. Such a catheter can provide access into vessels suitable for a 5 Fr catheter, but can provide significantly better suction than a suction catheter with a 5 Fr catheter body along its entire length. Commercial stepped down suction catheters, such as Mi-Axus™ catheters (MIVI Neuroscience, Inc.) and ACE™ 64 catheters (Penumbra, Inc.) are finding good clinical results. The step down suction catheters and their use for thrombectomy procedures in cerebral arteries are described in published U.S. patent application 2012/0253313 A1 to Galdonik et al. (hereinafter the '313 application), entitled "Aspiration Catheters for Thrombus Removal," incorporated herein by reference. Comparisons of suction results from testing of these catheters are also presented below. While these catheters achieve better suction than catheters with constant diameters corresponding with the distal diameters, the present suction catheters with a sliding suction extension are found to provide surprisingly good suction suggesting that the diameter over the majority of the suction lumen length contributes to a large extent to the suction provided at the distal opening of the suction lumen. In particular, while the suction extension may have a longer length of the distal reduced diameter section, these features are more than compensated for by the longer length of the larger diameter guide catheter lumen that extends for a majority of the suction lumen.

Also described herein, a delivery catheter can provide a desirable very flexible distal tip with a narrow diameter that can track along a guidewire into particularly challenging positions in a vessel. For example, in regions of the cerebral vasculature, the arteries can twist and turn very significant amounts. To the extent that a guidewire can be placed at the target location, it still may be difficult to track a catheter or the like over the wire to the desired location. The delivery catheter described herein has an elastic distal section that can have an inner diameter comparable to the guidewire outer diameter so that it tracks closely over the wire which when combined with the desired flexibility provides for tracking. Once the delivery catheter is in place, desired additional medical devices can be tracked over the wire and through the delivery catheter for improved guidance of the device to the treatment location. To actually provide a delivered medical device for use at the treatment location, the medical device should be placed outside of the interior of the delivery catheter. The elasticity of the distal tip of the delivery catheter provides for the pushing of the delivered medical device past the elastic distal tip through the appropriate expansion of the elastic tip, which may or may not resume its narrow diameter following delivery of the medical device through the tip. Suitable medical devices for delivery include, for example, a suction tip associated with a suction system described herein, a microcatheter optionally associated with additional treatment structures, filters, angioplasty balloons, stent delivery devices, atherectomy devices or the like.

The proximal portion of the delivery catheter has a diameter selected to fit within a guide catheter, if relevant, and large enough to allow for delivery through its inner lumen of other percutaneous devices appropriate for delivery through to the treatment site. The elastic distal tip can have a suitable length to reach to appropriate treatment sights accounting for placement of its proximal end in an appropriate location based on its dimensions and flexibility. Since the distal tip may extend many times its original diameter to allow for delivery of medical devices through its lumen, the material forming the distal tip can be selected to stretch many times it diameter without tearing. It may or may not be desired for the elastic polymer to remain within its elastic limit such that it would resume its approximate original shape if the strain is withdrawn. For example, if the polymer is stretched beyond its elastic limit, the polymer remains distorted if the strain is removed. However, the polymers generally should be selected to be stretched to values below their elongation limit to prevent significant failure of the polymers and tearing to avoid any generation of debris within the vessel, although a sufficiently cohesive polymer may tear without creating a significant risk of fragmenting to leave debris in the vessel. Various biocompatible elastomers are suitable for the formation of the proximal portion of the delivery catheter as described further below.

An initial part of the procedure using the devices described herein generally involves accessing the treatment location within the vasculature. Guidewires have been designed to facilitate access to difficult to reach locations. The term guidewire is used herein to refer broadly to wire structures that may or may not have internal structure are referred to as guidewires whether or not they are formed from a solid or woven metal, such as core wire-overtube integrated structures, coils or the like which do not have a closed inner lumen over at least a portion of the devices length.

In particular, with the devices described herein procedures can be performed to provide re-profusion in vessels that are blocked completely or partially with clots. Clots in cerebral arteries can cause strokes with corresponding serious consequences, and time generally is of the essence of treating these conditions. The suction extension with the guide catheter can be used to provide aspiration that can be useful to remove clots or fragments thereof. Thus, the suction extension combined with the guide catheter and negative pressure device can be used as stand alone devices for thrombectomy procedures. However, the suction extension with aspiration can be effectively used as part of a treatment system comprising, for example, also a fiber based filter and/or other components to facilitate removal of a clot or portions thereof. The delivery catheter with the expandable tip is designed to facilitate access, so it is useful as a tool for the practice of various other procedures.

As demonstrated below, the aspiration system formed with a guide catheter and a suction extension provides enhanced suction ability within relatively narrow vessels downstream from the positioning of the guide catheter, such as cerebral vessels. The enhanced suction power can be valuable for the removal of clots from the vessel and thus can improve clinical results, whether used alone or used with additional components of a treatment system. As described below, the guide catheter based suction catheter can be used to generate good flow under aspiration through the tip of the suction extension and with a low pressure drop from the proximal connection of the negative pressure device to the distal opening of the catheter. With the combination of features, the catheter provides good access to smaller vessels, relative ease of placement and desirable degrees of suction power.

In some embodiments of the procedure, a guidewire can be placed at or near an occlusion and a guide catheter with a positionable suction extender can be placed in the vasculature upstream from the occlusion with the guidewire extending through the interior of the suction extender. If the suction catheter is to be used alone, then the suction extender can be advanced using a control wire over the guidewire to a suitable position near the clot. Then, with or without removing the guidewire, suction can be initiated to suck the clot or a portion thereof into the distal opening or against the tip of the suction extender. Suction may or may not be continued as the suction extender and/or guide catheter are removed from the patient.

While suction with the suction extension can be effective as the only device for clot removal, particularly effective systems can combine other devices for use with the suction catheter. In particular, a filter device can be used to provide both embolic protection as well as a tool to facilitate removal of the clot or portions thereof, which may involve direct engagement of the clot with the filter device. Fiber based filters/embolic protection systems have been developed that can be effectively used in the narrow vessels of interest. In particular, fiber-based filter systems with an appropriate actuation system can be used for delivery in a low profile configuration past an occlusion and deployed to provide protection from any clot fragments that may be released during the removal process.

The devices described herein provide improved functionality for performing procedures for the removal of clots from vessels. As noted herein, the devices can be used in various combinations within medical systems for percutaneous procedures.

Suction System with Extendable Suction Tip

Suction Systems are described that take advantage of good suction available with a suction catheter having a larger proximal suction lumen and a narrower diameter suction tip that uses the guide catheter lumen as a proximal suction lumen. A laterally slidable suction tip extends from a proximal section located within the guide lumen, and the suction tip can have a reduced diameter to provide access to narrow vessels while providing for delivery of other treatment structures and/or embolic protection structures as well as for a desirable level of suction for the removal of debris from the vessel. A control wire or other structure can be attached to the slidable suction tip to provide for selective lateral placement of the suction tip relative to a fixed guide catheter and a target treatment location. The catheter generally comprises structure, such as a seal, to limit flow through the guide catheter circumventing the suction tip and/or, such as a stop, to retain the proximal portion of the suction tip within the guide lumen at the distal end of the guide catheter. Some particular embodiments are shown in the figures as discussed in the following.

Referring to FIG. 1, suction system 100 comprises a suction adapted guide catheter 102 and a suction extension 104. The suction adapted guide catheter 102 comprises proximal section 106 and tubular shaft 108. Proximal section 106 generally is suitable for use also as a handle and generally can comprise a proximal fitting 120, a suction port 122 and an optional control wire port 124, as well as possibly other additional ports and/or fittings to provide desired functionality and access, in which all such ports and fittings can be arranged in a branch configuration or other suitable configuration. Proximal fitting 120 can comprise a suitable hemostatic valve, Luer fitting or the like to provide for entry of a guidewire and/or structures delivered over the guidewire into the guide catheter lumen, such as alternative treatment structures and/or embolic protection devices. Suitable embolic protection devices can be mounted on a guidewire. Suitable treatment structures are described further below and can include, for example, stents, stent retrievers, atherectomy devices or the like. As shown in FIG. 1, a negative pressure device 126 is shown connected with suction port 122, and suitable negative pressure devices include, for example, syringes, pumps, such as peristaltic pumps, piston pumps or other suitable pumps, aspirator/venturi, or the like.

Tubular shaft 108 can have an approximately constant diameter along its length, or the guide catheter can have sections with different diameters, generally with a smaller diameter section distal to a larger diameter section. Tubular shaft 108 can have one or more radiopaque marker bands to facilitate positioning of the tubular shaft within the patient, and FIG. 1 shows a marker band 128 near the distal end of tubular shaft 108, although alternative positions can be used as desired. At or near the distal end of the shaft, a stop 130 is positioned to retain a portion of suction extension 104 within the lumen of tubular shaft 108. Suitable designs of stop 130 are presented below. Tubular shaft 108 can further comprise a seal 132 to provide for reducing or eliminating any flow within tubular shaft 108 that avoids suction extension 104. In some embodiments, seal 132 can be combined with stop 130, or seal 132 as a distinct element can be avoided through a design with a sufficiently tight fit between suction extension 104 and the lumen wall of tubular shaft 108. As described below, tubular shaft 108 can have coatings on the inner surface and/or the outer surface or portions thereof.

Suction extension 104 comprises a proximal portion 140, suction tip 142, connection portion 144, optional engagement element 146 and control structure 148, such as a control wire. All or a part of proximal portion 140 can be configured to remain within the lumen of guide catheter 102. As shown in FIG. 1, proximal portion 140 comprises a radiopaque marker band 152, although proximal portion may not have a marker band in some embodiments and in other embodiments can comprise a plurality of marker bands, and suction tip 142 is shown with radiopaque marker band 154 near the distal tip of suction tip 142, although again suction tip 142 can comprise a plurality of radiopaque marker bands if desired. Connection portion 144 connects proximal portion 140 and suction tip 142, which can be a transition portion that gradually changes diameter or a connector that forms a seal between the proximal portion and suction tip. Optional engagement element 146 can engage stop 130 to establish the distal placement limit of suction extension 104 relative to guide catheter 102. In some embodiments, stop 130 is configured to engage an edge or other limiting structure of proximal portion 140 so that engagement element 146 is effectively integrated with the proximal portion 140 or connection portion 144. Control structure 148 can be a control wire or the like that connects with proximal portion 140 and extends exterior to the catheter, such as exiting through control wire port 124. Control structure 148 can be used to control positioning of proximal portion 140 within the lumen of tubular shaft 108. Control structure 148 can comprise a control tool 156, such as a handle, slide or other the like that can anchor a control wire or other connecting element to facilitate movement of the control wire. In some embodiments, alternative structures such as a plurality of wires or wire cylindrical assembly can connect the proximal portion to the proximal end of the suction catheter system to provide a desired level of control with respect to positioning the proximal section.

Referring to FIG. 2, an expanded view is presented of the interface between tubular shaft 108 and proximal portion 140 of suction extension 104. A cross sectional view is shown in FIG. 3. Several seals are described in the subsequent figures to reduce or eliminate flow between the inner surface of tubular shaft 108 and the outer surface of proximal portion 140. Flow arrows indicate desired flow directions when suction is applied. However, in some embodiments, the clearance can be made sufficiently small between the outer surface of proximal portion 140 and the inner surface of tubular shaft 108. For example, the tolerance measured as a difference between the adjacent inner surface and outer surface can be, for example, no more than about 5 mils (1 mil=$\frac{1}{1000}$ of an inch; 5 mil~127 microns), and in further embodiments, no more than about 4 mils (101.6 microns) or in additional embodiments no more than about 3 mils (76.2 microns), and can be approximately zero within the measurement uncertainty. A person of ordinary skill in the art will recognize that additional ranges within the explicit ranges of tolerances above are contemplated and are within the present disclosure. A lubricious coating 160 (see left insert of FIG. 3), which may or may not be a hydrophilic coating, can be placed on the outer surface of the proximal portion 140, and/or a lubricious coating 162 (see right insert of FIG. 3) can be placed on the inner surface of tubular shaft 108 to facilitate longitudinal movement of the suction extension 104 with a low tolerance friction fit. Suitable coatings include, for example, hydrophobic coatings such as polytetrafluoroethyelene, or other fluoropolymers, or hydrophilic coatings, such as polyvinyl alcohol. Suitable coatings can include, for example, a gel or fluid, such as polyfluoropolyether fluid or triglycerides that can be applied at the time of use.

It can be desirable to include specific structural elements to effectuate the seal rather than relying only on friction/coatings. Various embodiments of seal 132 are shown in FIGS. 4-15. Referring to FIG. 4, a portion of a catheter is shown indicating the use of o-rings to form the seal. Specifically, o-rings 200, 202 are positioned within grooves 204, 206 along the surface of proximal portion 208 or suction extension 210. O-rings 200, 202 engage inner surface of tubular shaft 212 to form the seal such that flow is confined to suction lumen 214. While FIG. 4 shows two adjacent o-rings, a seal can comprise a single o-ring, such as either 200 or 202 alone, or three or more o-rings. O-rings can be formed from suitable materials, such as biocompatible elastic polymers, examples of which are provided in the materials summary below.

Referring to FIGS. 5 and 6, an elastic seal 230 is provided around proximal portion 232 of suction extension 234 in which suction tip 236 extends in a distal direction. Elastic seal 230 can be secured to proximal portion 232 with adhesive, heat bonding, or other suitable technique. Elastic seal 230 can provide for relative movement of suction extension 234 and shaft 238 due to the elasticity. Elastic seal 230 can be angled, arched or other suitable configuration. Elastic seal 230 can be formed form elastic polymers presented below.

FIGS. 7A-11 display embodiments in which sealing is based on minor distortion of the catheter elements to releasably engage the shaft with the proximal element of the suction extender to block potential flow between the elements. The different figures involve distinct mechanism to provide corresponding forces to engage the elements. For these embodiments, the sealing engagement is generally performed once the suction extension is laterally placed at a desired position.

Figure 7B:
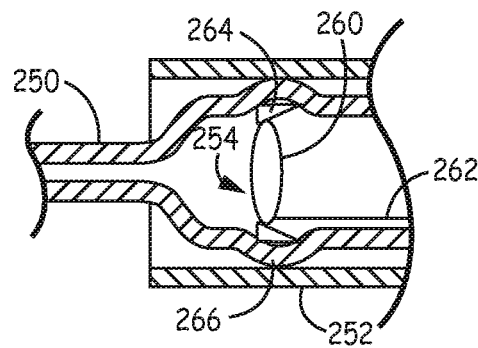
FIG. 7B is a fragmentary side view of the sealing structure of FIG. 7A shown in the sealed configuration.

Referring to FIGS. 7A and 7B, suction extension 250 engages guide catheter 252 with an engageable sealing element 254. Sealing element 254 comprises a slidable loop 260 controllable with a loop control wire 262 that engages a circular ramp 264. Loop control wire 262 extends in a proximal direction and edits the catheter through a proximal port so that the medical professional using the catheter can control the engagement of the seal through positioning of the loop. When slidable loop 260 in a proximal position, as shown in FIG. 7A, the seal is unengaged and suction extension 250 can more longitudinally within the lumen of guide catheter 252. Referring to FIG. 7B, when slidable loop is positioned in a distal direction, slidable loop 260 engages circular ramp 264 and forms a bulge 266 that engages the inner wall of guide catheter 252 to form a seal. Bulge 266 does not need to physically extend very far since the clearance between suction extension 250 and guide catheter 252 can be small.

Figure 8A:
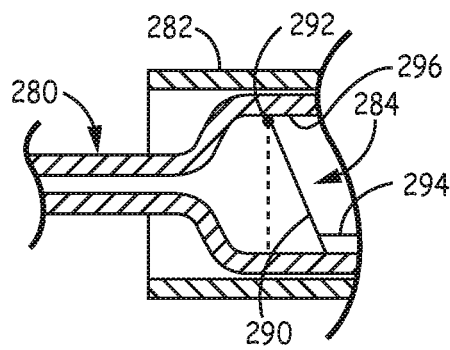
FIG. 8A is a fragmentary side view of an interface between a suction extension and a guide catheter with an elastic deformation based seal incorporating a pivot ring to selectively activate the seal, shown in an unsealed configuration.
Figure 8B:
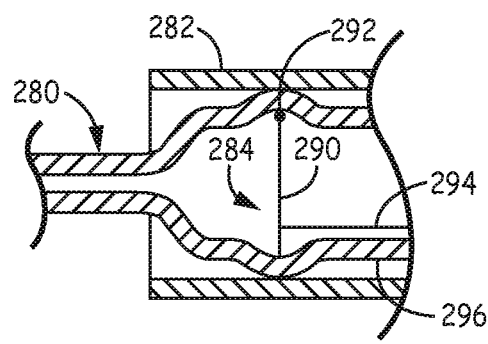
FIG. 8B is a fragmentary side view of the sealing structure of FIG. 8A shown in the sealed configuration.

A similar structure is shown in FIGS. 8A and 8B based on a pivoting loop. In this embodiment, suction extension 280 engages guide catheter 282 with deforming sealing element 284. Deforming sealing element 284 comprises ring 290, secured at pivot 292 and control wire 294. Ring 290 has an outer diameter somewhat larger than inner diameter of proximal portion 296 of suction extension 280 and an inner diameter in some embodiments can be at least as large as the inner diameter of proximal portion 296. Control wire 294 can be used to pivot ring 290 to an engaged configuration shown in FIG. 8B where suction extension 280 deforms slightly at the position of the ring to form a seal with guide catheter 282. Control wire 294 extends in a proximal direction to exit the catheter at a proximal fitting. In alternative embodiments, the unengaged position of ring 290 can be in a distal orientation relative to pivot 292 so that the control wire can be pulled to engage the seal.

Figure 9A:
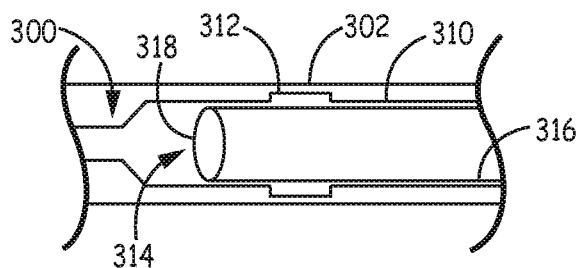
FIG. 9A is a fragmentary side view of an interface between a suction extension and a guide catheter with an elastic deformation based seal incorporating a deformable element of the suction extension activated with a pullable actuation element, shown in an unsealed configuration.
Figure 9B:
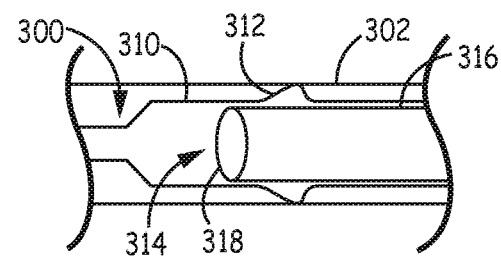
FIG. 9B is a fragmentary side view of the sealing structure of FIG. 9A shown in the sealed configuration.

Referring to FIGS. 9A and 9B, a seal is shown based on a deformable section of the proximal portion of the aspiration extension. FIG. 9A depicts the relevant portion of the device in the un-deformed configuration, and FIG. 9B depicts the relevant portion of the device in the deformed and sealed configuration. Suction extension 300 is positioned within guide catheter 302. Suction extension 300 comprises proximal section 310 having a deformable element 312, and an actuation element 314. Deformable element 312 can have a bridge shaped cross section and can be formed from a distinct material and/or have a distinct structure providing for deformation upon application of suitable forces. The bridge shaped cross section can be rectangular, square, elliptical, round, or more complex shapes, such as an "M" shape, and can be of a suitable catheter material, which can be the same or different relative to the remaining portion of the catheter. As shown in FIGS. 9A and 9B, actuation element 314 comprises inner sleeve 316 secured to proximal section 310 at anchor point 318. Inner sleeve 316 extends proximally to the exterior of the catheter through a fitting such that relative movement of inner sleeve 316 and a control wire (not shown for this embodiment) controlling the position of proximal section 310 applies force that can deform deformable element 312. Inner sleeve is used to transmit force and may be generally cylindrical or other shape that provides for appropriate force transfer. Deformable element 312 may or may not provide for substantial restoration of the deformable element to its original configuration upon the reversal of forces used to deform the deformable element.

Figure 10A:
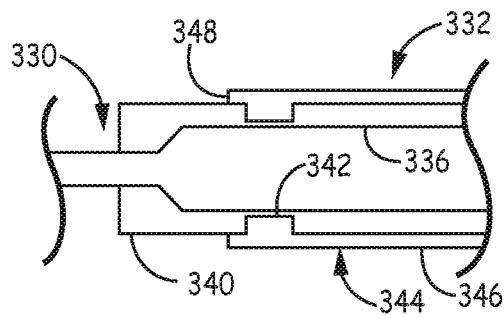
FIG. 10A is a fragmentary side view of an interface between a suction extension and a guide catheter with an elastic deformation based seal incorporating a deformable element of the guide catheter activated with a pullable actuation element, shown in an unsealed configuration.
Figure 10B:
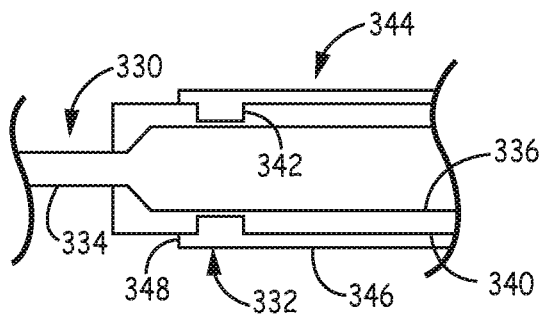
FIG. 10B is a fragmentary side view of the sealing structure of FIG. 10A shown in the sealed configuration.

Referring to FIGS. 10A and 10B, a complementary embodiment is shown in this a deformable element is formed as a portion of the guide catheter rather than the suction extension. Suction extension 330 extends within guide catheter 332. Suction extension comprises suction tip 334 and proximal section 336. Guide catheter 332 comprises catheter body 340, deformable element 342 and actuation element 344. As shown in FIGS. 10A and 10B, actuation element 344 comprises an outer sleeve 346 secured to catheter body 340 at anchor point 348. As with deformable element 312 of FIGS. 9A and 9B, deformable element 342 may or may not provide for substantial restoration of the deformable element to its original configuration upon the reversal of forces used to deform the deformable element. As with inner sleeve 316, outer sleeve 346 is used to transmit force and may be generally cylindrical or other shape that provides for appropriate force transfer.

Figure 11:
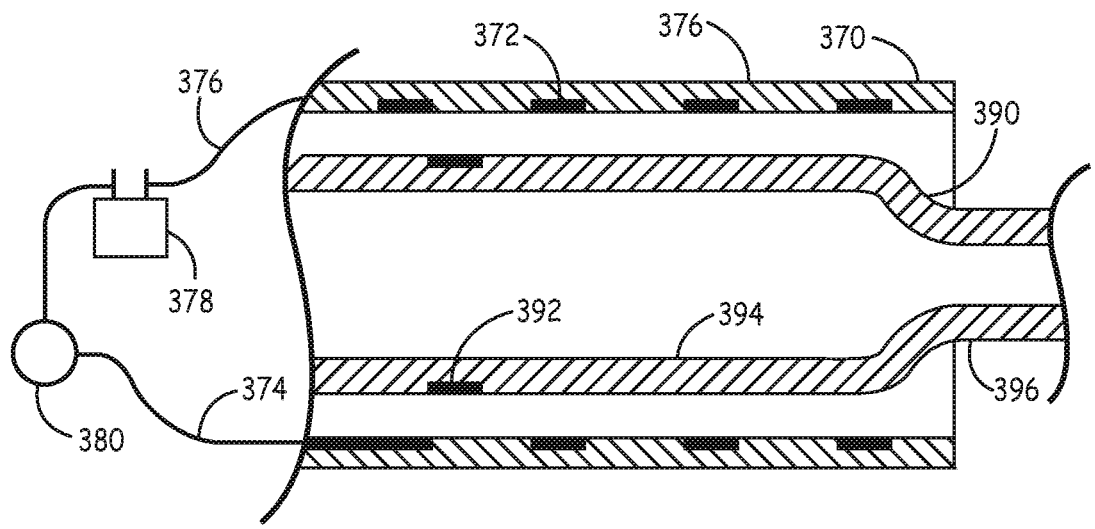
FIG. 11 is a fragmentary side view of an interface between a suction extension and a guide catheter with an elastic deformation based seal with an electromagnetic actuatable seal.

FIG. 11 shows a catheter and suction extension with a magnetic based seal. Guide catheter 370 comprises a metal coil 372 embedded in the polymer wall of the catheter. Metal coil is connected to electrical wires 374, 376 that are electrically insulated from each other and extends down the length of the catheter to a proximal section (not shown). Electrical wires 374, 376 are connected to metal coil 372 such that current can flow between electrical wires 374, 376 along all or a majority of the metal coil such that the current generates an electrical field. At the proximal end of electrical wires 374, 376, electrical wires 374, 376 are connected to a power source 378, such as a battery, through a switch 380. Suction extension 390 comprises a permanent magnet 392 embedded in a polymer wall of proximal section 394 and suction tip 396 extends in a distal direction from proximal section 394. When switch 380 is turned to the on position by a medical professional, current flows through metal coil 372 to generate a magnetic field that attracts permanent magnet 392 to distort the wall of proximal section 394 and form the seal. Turning switch 380 to off can relax the seal such that suction extension 390 can move longitudinally within guide catheter 370.

Figure 12:
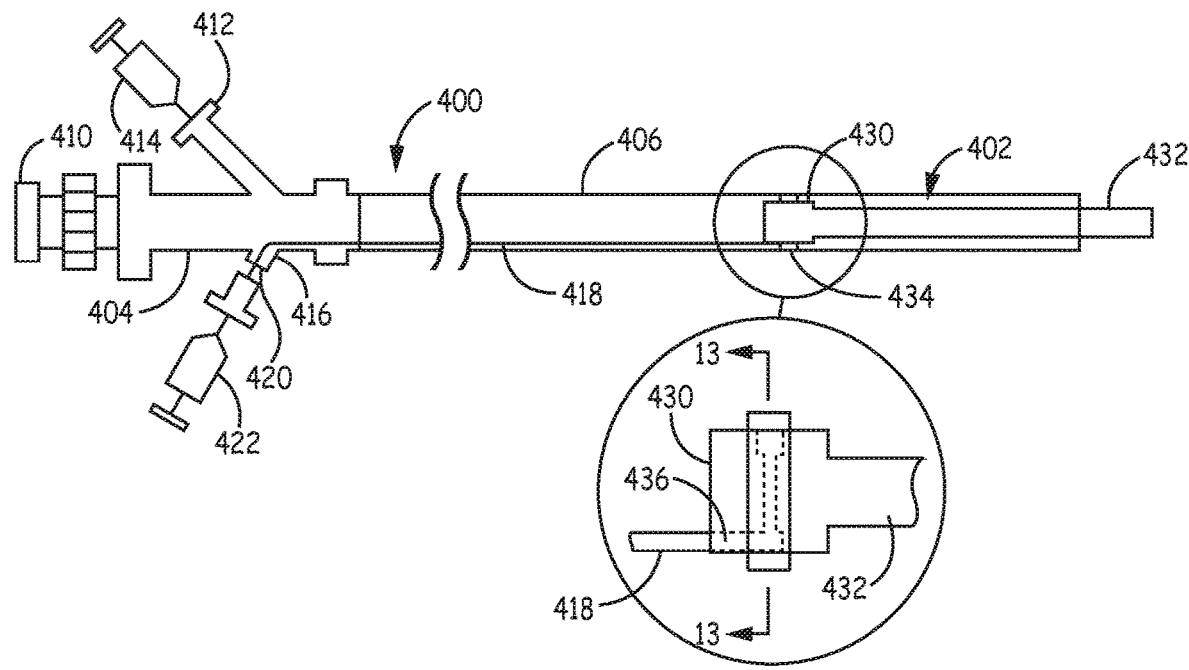
FIG. 12 is a side view of a suction system comprising an interface between a suction extension and a guide catheter with a balloon based seal.

A balloon based seal is shown in the embodiment of FIG. 12. The suction system comprises guide catheter 400 and suction extension 402. Guide catheter 400 comprises proximal section 404 and tubular shaft 406 connected at or near the distal end of proximal section 404. Proximal section 404 comprises a proximal fitting 410, a branched connector 412 for connection to a suction device 414 and a branched connector 416 for passage of tube 418 through a diaphragm seal or the like 420 in which tube 418 is connected to a fluid source 422 for inflating and deflating a balloon seal. Diaphragm seal 420 or a suitable hemostatic fitting can be made of rubber or other suitable material or construction so that tube 418 can be moved in and out from the interior of guide catheter 400 with little or no blood loss. Suction extension 402 comprises a proximal section 430 and suction tip 432.

Figure 13:
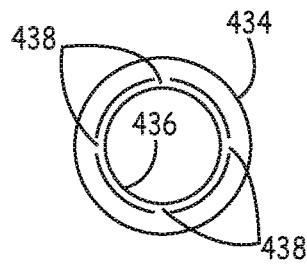
FIG. 13 is a section view of the balloon based seal taken along line 13-13 of FIG. 12.

Referring to the expanded insert of FIG. 12, balloon 434 is located around the circumference of proximal section 430. Tube 418 can connect directly to balloon 434 or as shown in FIGS. 12 and 13 to a channel 436 that extends within proximal section 430 in which the channel is in fluid connection to the interior of balloon 434 through one or more openings 438. Thus, when fluid is injected from fluid source 422, balloon 434 inflates and subsequent removal of fluid back into fluid source 422 or an alternative fluid reservoir, then balloon 434 deflates. Inflation of balloon 434 forms a controllable seal at the contact point of balloon 434 and tubular shaft 406.

Figure 14:
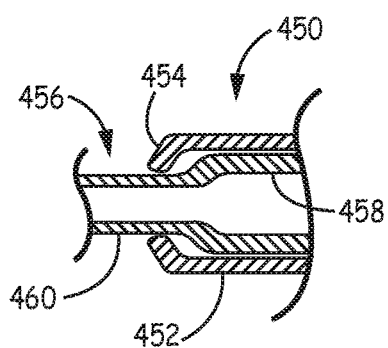
FIG. 14 is a fragmentary side view of a structure providing simultaneous stop and seal functions.
Figure 15:
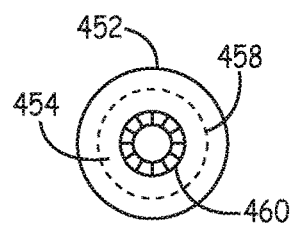
FIG. 15 is an end view from the distal end of the suction system of FIG. 14 with dashed lines showing the outer diameter of the proximal portion of the suction extension.

As noted above, the guide catheter generally comprises a stop that retains at least a significant portion of the proximal section of suction extension within the lumen of the shaft of the guide catheter. In some embodiments, the seal and the stop elements are combined in a single structure, such as shown in FIGS. 14 and 15. Referring to FIG. 14, guide catheter 450 comprises tubular shaft 452 with, at its distal end, an elastic seal 454 having sufficient mechanical rigidity to also function as a stop. Suction extension 456 has a proximal portion 458 and suction tip 460 extending outward from guide catheter 450 through elastic seal 454. For example, as shown in FIG. 14, elastic seal 454 can have elastic polymer contacting suction tip 460 and optionally a more rigid material, such as thermoplastic polymer, metal or other appropriate material, connecting to tubular shaft 452.

Figure 16:
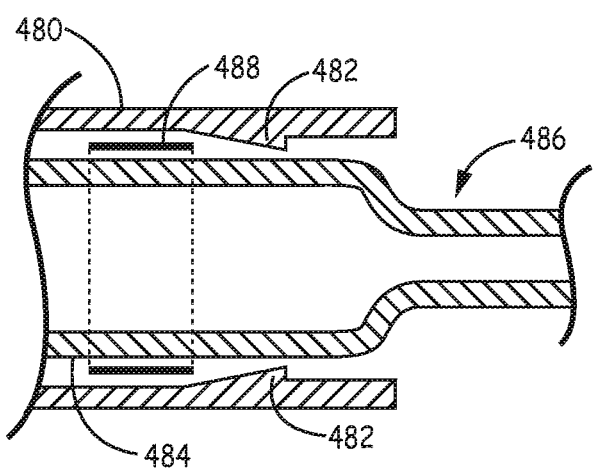
FIG. 16 is a fragmentary side view of a stop design for the engagement of a ridge along the inner diameter of a guide catheter with a widening section along the outer surface of a proximal portion of s suction extension.

Another embodiment of a stop is shown in FIG. 16. In this embodiment, tubular shaft 480 of the guide catheter comprises a ridge 482 that narrows the inner diameter of tubular shaft 480 at a location at or near the distal end of tubular shaft 480. Ridge 482 may or may not go around the circumference of the inner wall of tubular shaft 480, and in some embodiments may be only at 1, 2, 3, 4 or other number of specific locations around the circumference. As shown in FIG. 16, the narrowed inner diameter at ridge 482 (evaluated at diameter through the center of the shaft connecting isolated points providing the narrowing in appropriate embodiments) is wider than the outer diameter of proximal section 484 of suction extension 486. Widening structure 488 along the exterior of proximal section 484 provides a diameter that exceeds the narrowed inner diameter at ridge 482 so that widening structure 488 cannot pass ridge 482 so that ridge 482 functions as a stop. Widening structure 488 can be, but may not be, portions of a balloon seal or other seal components, or widening structure 488 can be provided just to provide the stop function. Widening structure 488 may or may not go around the entire circumference of proximal section 484, but widening structure 488 and ridge 482 can be designed to provide sufficient circumferential coverage so that they cannot circumvent the stop function of the elements.

A similar stop design is shown in FIGS. 17 and 18. In this embodiment, tubular shaft 500 has a lip 502 at the distal opening, although in alternative embodiments, the lip can be moved inside the inner lumen of tubular shaft 500 reasonably near the distal opening. Lip 502 reduces the diameter at the lip to a value less than the outer diameter of proximal section 504 of suction extension 506 with suction tip 508 extending in a distal direction. Due to the reduced diameter at lip 502, it functions as a stop.

Referring to FIGS. 19-21, the stop function is provided by a track that interfaces tubular shaft 520 and suction extension 522. FIG. 19 is a sectional exploded view that cuts the elements through the central axis to render the track elements visible. Referring to tubular shaft 520 in FIGS. 19 and 20, the inner surface of the wall is contoured to have two channels 524, 526 that end prior to the distal end of tubular shaft 520. Referring to FIGS. 19 and 21, suction extension 522 comprises proximal section 530 and suction tip 532, and proximal section 530 has two ridges 534, 536. Ridges 534, 536 fit within channels 524, 526 so that channels limit the movement of ridges 534, 536 and correspondingly the relative movement of suction extension 522 so that the distal termination of channels 524, 526 function as a stop.

Referring to FIG. 1, in some embodiments a control structure, such as a control wire, interfaces with the proximal portion of the suction extension. Referring to FIG. 22, an embodiment is shown in which suction extension 550 has a control wire 552 with its distal end embedded within the polymer wall of proximal portion 554. Suction tip 556 extends in a distal orientation relative to proximal portion 554. As described further below, the polymer walls of components of a suction extension can comprise braided and/or coiled wires embedded within the polymer walls. Referring to the expanded view in the balloon insert, the embedded end of control wire 552 is shown under the embedded braiding/coil reinforcement 558, which can further secure control wire 552 to proximal portion 554. In alternative embodiments such as shown in FIG. 12, a tube or other structure can be used in addition to or as an alternative to a control wire, and such a tube can be securely attached to a proximal portion with suitable reinforcements and can also be under a portion of braiding or coil if desired.

Figure 23:
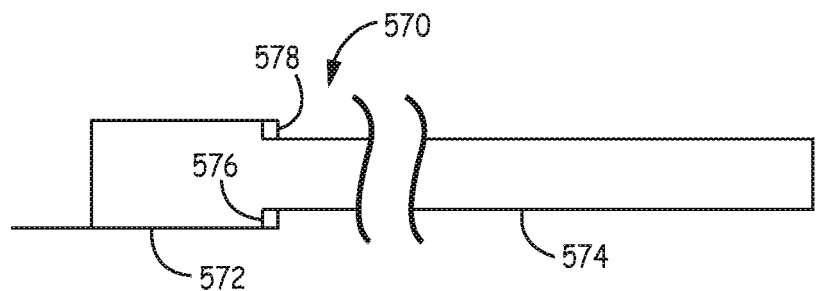
FIG. 23 is a side view of a suction extension embodiment having low or no extent transition portion with reinforcement.
Figure 24:
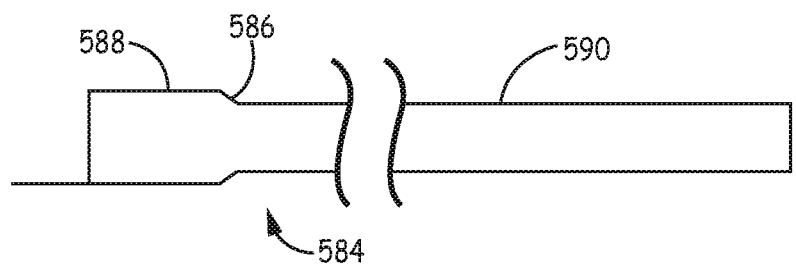
FIG. 24 is a side view of a suction extension embodiment with a gradual tapered transition portion.

As noted above, the suction extension has a connection portion connecting the proximal portion and the suction tip, and the design may generally depend on manufacturing selections. Referring to FIG. 23, an embodiment of suction extension 570 has a connection portion essentially no transition region connecting proximal portion 572 and suction tip 574. Basically, wall 576 connects suction tip 574 to proximal portion 572. An optional reinforcement 578, such as a polymer or metal element at the connection, can be used to help secure the elements. Referring to FIG. 24, an embodiment of suction extension 584 has a transition portion 586 connecting proximal portion 588 with suction tip 590. As shown in FIG. 24, transition portion provides an approximately linear transition of diameters from the wider diameter of proximal portion to the narrower diameter of suction tip 590. In alternative embodiments, a transition portion can have nonlinear changes in diameter if desired, but the change is generally monotonic. The transition regions can be formed through an extrusion process or through confirming of a thermoplastic polymer to a mandrel shape or other suitable process approach known in the art.

A significant aspect of the suction extension is the narrower diameter suction tip. The effective suction lumen then extends through the guide catheter into the proximal portion of the suction extension and then into the suction tip. The narrow diameter of the suction tip provides for reach into small circuitous blood vessels and the use of the larger diameter proximal suction lumen improves the suction performance significantly without detracting from the ability to reach appropriate locations. To further provide for suction strength, the suction tip itself can have different sections with stepped down diameters. In general, the arteries progressively decrease in diameter so a section with a somewhat larger diameter may be desirable consistent with the reach of the suction tip into a selected narrow vessel.

Figure 25:
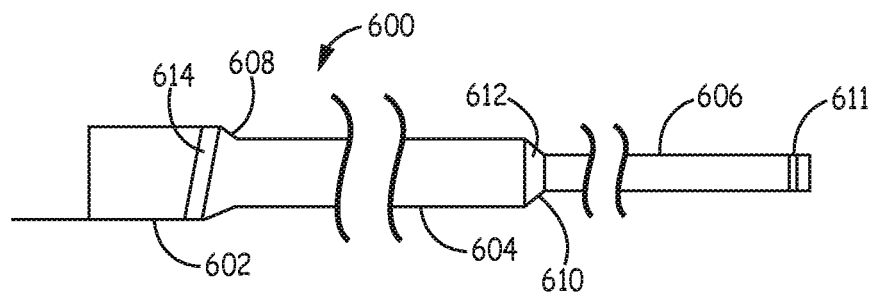
FIG. 25 is a side view of a suction extension embodiment having a suction tip with two successively narrowed sections.

Referring to an embodiment shown in FIG. 25, suction extension 600 comprises proximal portion 602, first tip section 604, distal tip section 606, first optional transition section 608 and second optional transition section 610. Proximal portion 602 can be any of the various embodiments described above with corresponding seal structures. Similarly, optional transition section 608 and 610 can have transition structures as described above or independently replaced with a connection structure such as shown in FIG. 23. Dimensions overall of the proximal portion and suction tip are described further below. With respect to first tip section, this section generally has an approximately constant diameter that is generally from about [d+0.9(D−d)] to about [d+0.1(D−d)], in further embodiments from about [d+0.75 (D−d)] to about [d+0.25(D−d)], and in some embodiments from about [d+0.65(D−d)] to about [d+0.35(D−d)], where d is the diameter of distal tip section 606 and D is the average diameter of proximal portion 602. The length of first tip section can be from about 10% to about 90%, in further embodiments from about 20% to about 80% and in additional embodiments form about 30% to about 70% of the total length of suction tip, i.e., the total length of first tip section 604, distal tip section 606, first optional transition section 608 and second optional transition section 610. A person of ordinary skill in the art will recognize that additional ranges of relative dimensions within the explicit ranges above are contemplated and are within the present disclosure. This embodiment is shown with 3 radiopaque marker bands, marker band 611 near the distal tip, marker band 612 near the second (distal) transition position and marker band 614 near the first (proximal) transition region. While FIG. 25 shows one intermediate tip section between proximal portion and the distal tip section, in other embodiments there can be multiple constant diameter intermediate sections which divide the length available for the intermediate sections specified above and on average have the diameters for the intermediate section specified above, for example, there can be two intermediate sections, three intermediate sections or more than three intermediate sections.

Figure 26:
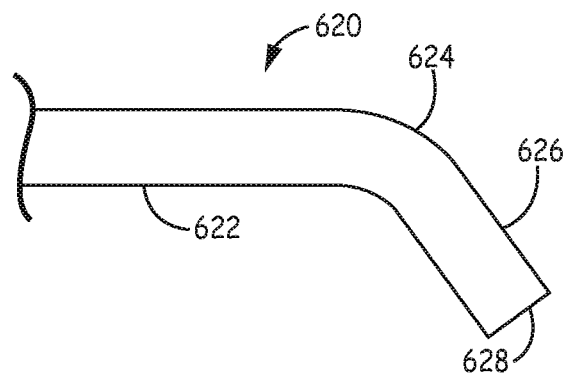
FIG. 26 is a fragmentary side view of a suction tip with a bend.
Figure 27:
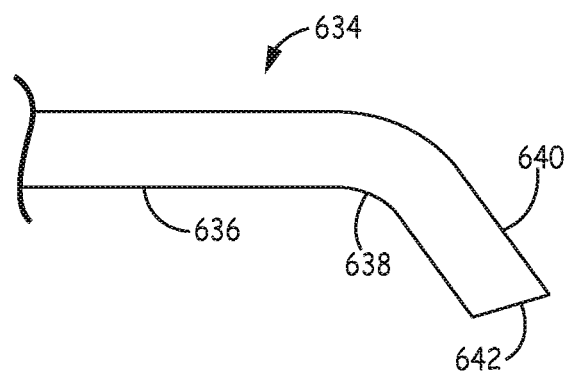
FIG. 27 is a fragmentary side view of a suction tip with a bend and an angled opening.

Regardless of whether or not the suction tip includes intermediate sections, the distal tip of the catheter can be bent or curved in its natural unstressed configuration. It has been found that a bent tip catheter can facilitate tracking of the catheter over a guidewire without adversely altering the suction abilities. See U.S. Pat. No. 8,021,351 to Boldenow et al., entitled "Tracking Aspiration Catheter," incorporated herein by reference. Two version of a bent tip suction tip are shown in FIGS. 26 and 27. Referring to FIG. 26, suction tip 620 comprises a straight section 622, bend 624 and bent tip section 626 with a flat distal opening 628 approximately perpendicular to the axis of bent tip section 626. Referring to FIG. 27, suction tip 634 comprises a straight section 636, bend 638 and bent tip section 640 with an angled distal opening 642 at a non-perpendicular angle to the axis of bent tip section 640. Bent tip sections 626, 640 are generally cylindrical and can have approximately the same diameters as corresponding straight sections 622, 636. While two shapes of openings are shown in FIGS. 26 and 27, any reasonable shape of the opening generally can be used.

The angle of the curved tip relative to a straight tip generally is less than 90 degrees and can be, for example, from about 10 degrees to about 60 degrees and in further embodiments from about 25 degrees to about 50 degrees. The selected angle corresponds with a radius of curvature, and the radius of curvature can be, for example, from about 3 mm to 20 mm and in further embodiments from about 4 mm to about 16 mm. In some embodiments, a straight portion of the tip after the curve can have a length no more than about 1 cm, and in other embodiments from about 0.1 mm to about 6 mm and in further embodiments from about 0.5 mm to about 4 mm. In alternative embodiments, the curve consists of a gradual arc with no significant straight section distal to it, such that the curve or bend is specified by the angle and radius of curvature. A person of ordinary skill in the art will recognize that additional ranges of angles, radii and lengths within the explicit ranges above are contemplated and are within the present disclosure.

Proximal portion of suction extension provides a transition of the suction lumen from the guide catheter to the suction tip. As noted above, the proximal portion generally is associated with a seal and may be designed to be constrained within the lumen of the guide catheter with a stop. The lateral extent of the proximal portion should be sufficient to provide mechanical stability within the guide catheter lumen, but otherwise does not need to be particularly long. In general, the proximal portion can have a lateral extent from about 5 millimeters (mm) to about 25 centimeters (cm), in further embodiments from about 8 mm to about 20 cm and in other embodiments from about 1 cm to about 18 cm. The outer diameter of the proximal section can be close to the inner diameter of the guide catheter, and with respect to the average inner diameter of the proximal section, it can be from about 80% to about 97% of the inner diameter of the guide catheter, in further embodiments from about 82% to about 95% and in additional embodiments from about 84% to about 93% of the inner diameter of the guide catheter. The diameter of the proximal portion may or may not be approximately constant, and structure, such as a small gradual taper or sections with step down diameters generally may be acceptable. The division of the proximal portion and a transition zone may be somewhat arbitrary, although the proximal portion is generally associated with the seal. A person of ordinary skill in the art will recognize that additional ranges of proximal portion dimensions within the explicit ranges above are contemplated and are within the present disclosure.

The suction tip or distal suction tip for appropriate embodiments can have an inner diameter from about 20 percent to about 90 percent of the inner diameter of the tubular shaft of the guide catheter, and in further embodiments from about 30 percent to about 85 percent and in additional embodiments from about 35 percent to about 80 percent of the average diameter of the tube. For example, the distal tip can have an inner outer diameter range from about 0.667 mm to about 2 mm, in further embodiments from about 0.85 mm to about 1.9 mm, and in other embodiments from about 0.9 mm to about 1.75 mm. The distal tip can have a length from about 3 cm to about 50 cm, in some embodiments from about 5 cm to about 40 cm and in further embodiments from about 8 cm to about 35 cm. The guide catheter can have an outer diameter from about 5.5 Fr (1.667 mm diameter) to about 10 Fr (3.333 mm diameter), in further embodiments from about 6 Fr (1.833 mm diameter) to about 9 Fr (3 mm diameter), and in some embodiments from about 6.25 Fr (2 mm diameter) to about 8.5 Fr (2.833 mm diameter). The guide catheter measurement are generally referenced to the outer diameter, and the inner diameter is less than the outer diameter by twice the wall thickness. The length of the guide catheter can be from about 30 cm to about 150 cm, in further embodiments from about 35 cm to about 130 cm and in additional embodiments from about 40 cm to about 120 cm. The length of tubular shaft can be from about 30 cm to about 150 cm, in further embodiments from about 35 cm to about 130 cm and in additional embodiments from about 40 cm to about 120 cm. A person of ordinary skill in the art will recognize that additional ranges of dimensions within the explicit ranges above are contemplated and are within the present disclosure.

Catheter components can be formed from one or more biocompatible materials, including, for example, metals, such as stainless steel or alloys, e.g., Nitinol®, or polymers such as polyether-amide block co-polymer (PEBAX®), nylon (polyamides), polyolefins, polytetrafluoroethylene, polyesters, polyurethanes, polycarbonates, polysiloxanes (silicones), polycarbonate urethanes (e.g., ChronoFlex AR®), mixtures thereof, or other suitable biocompatible polymers. Radio-opacity can be achieved with the addition of metal markers, such as platinum-iridium alloy, tantalum, tungsten, gold, platinum-tungsten alloy or mixtures thereof, such as wire or bands, or through radio-pacifiers, such as barium sulfate, bismuth trioxide, bismuth subcarbonate, powdered tungsten, powdered tantalum or the like, added to the polymer resin. Generally, different sections of aspiration catheter can be formed from different materials from other sections, and sections of aspiration catheter can comprise a plurality of materials at different locations and/or at a particular location. In particular, it may be desirable to form seal components from an elastomeric polymer, such as suitable polyurethanes, polydimethyl siloxane and polytetrafluoroethylene. In addition, selected sections of the catheter can be formed with materials to introduce desired stiffness/flexibility for the particular section of the catheter. Similarly, fitting can be formed from a suitable material, such as one or more metals and/or one or more polymers.

Figure 28:
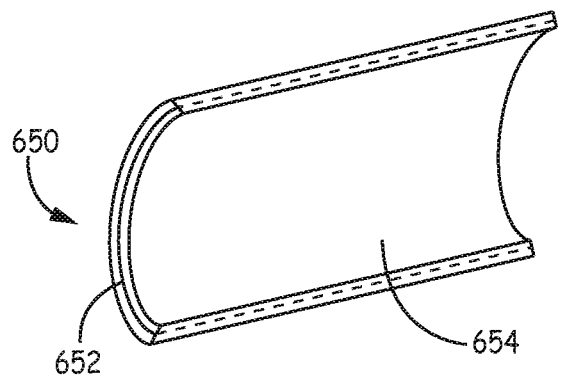
FIG. 28 is a cut-away portion of a catheter wall showing some features of its construction.

In some embodiments, the guide catheter, suction extension or appropriate portions thereof comprises a thermoplastic polymer with embedded metal elements, which reinforces the polymer. Suitable polymers include, for example, polyamides, i.e., nylons, polyolefins, or the like. The wire can be braided, coiled or otherwise placed over a polymer tubing liner with some tension to keep the wire in place over the tubing liner. A cutoff portion of a reinforced catheter section is shown in FIG. 28, in which catheter section 650 has metal reinforcement 652 embedded in the polymer wall 654. In some embodiments, suction tip can comprise both braided wire and a metal coil, which provide desirable flexibility and resilience to the element as well as mechanical strength with a thin wall. A polymer jacket, such as a heat shrink polymer, can then be placed over the top or the polymer softened to allow incorporation of the metal reinforcements. Upon heating to a temperature over the softening temperature or heat shrink temperature of the polymer and subsequent cooling, the wire becomes embedded within the polymer. In appropriate embodiments, the liner and jacket can be the same or different materials. Suitable wire includes, for example, flat stainless steel wire or the like. Wire diameters can range from about 0.00025 inch (0.00635 mm) to about 0.004 inch (0.1 mm) and in further embodiments from about 0.0005 inch (0.013 mm) to about 0.003 inch (0.075 mm). Braid picks per inch can be from about 20 to about 250 picks per inch and in further embodiments from about 50 to about 150 picks per inch. Coils can be single or multiple filament coils having, for example, pitches from about 0.005 inch (0.13 mm) to about 0.1 inch (2.54 mm) and in further embodiments from about 0.01 inch (0.26 mm) to about 0.050 inch (1.27 mm). A person of ordinary skill in the art will recognize that additional ranges within the explicit ranges below are conceived and are within the present disclosure. The wire adds additional mechanical strength while maintaining appropriate amounts of flexibility. The wire can provide some radio-opacity although radiopaque bands generally would provide a darker and distinguishable image relative to the wire. However, the image of the wire can provide further visualization of the catheter during the procedure.

To decrease the chance of accidental removal of the radiopaque band from the catheter and to decrease the chance of the radiopaque band catching onto other objects within the vessel, a metal reinforcing wire can be used to cover or enclose the radiopaque band with the metal wire subsequently being embedded within the polymer. As described in the previous paragraph, the metal wire can comprise interwoven wires, coil, combinations thereof, or the like. A polymer jacket can be placed over the metal wire, which is correspondingly covering the radiopaque band(s), and the heat bonding embeds the radiopaque marked band also. Placement of the marker band under metal wire can prevent the band from being separated from the catheter in the event that the wall is kinked or collapsed. If collapse or kinking of the catheter wall occurs, the braid-wire over the surface of the band collapses down over the marker band to prevent it from separating from the structure.

Figure 29:
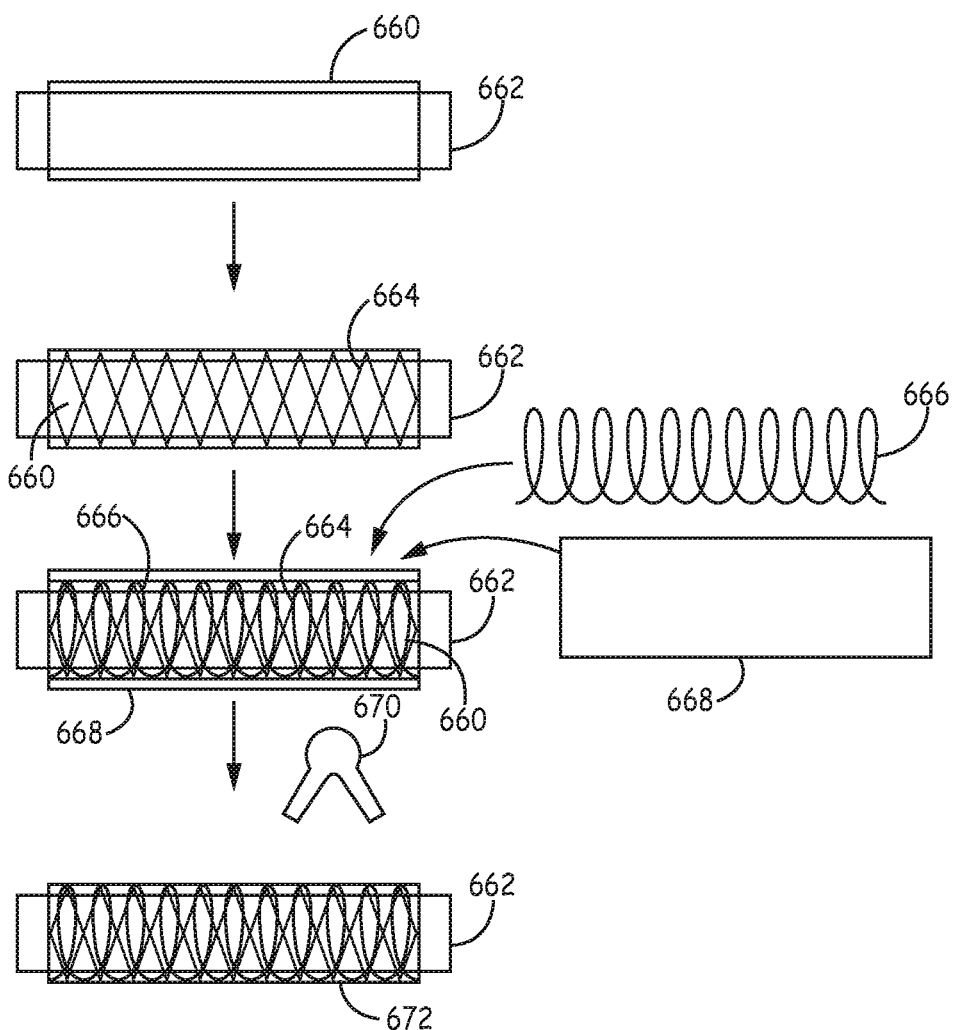
FIG. 29 is a series of side views depicting the construction of a catheter structure on a mandrel in which one or more steps are performed including application of a wire braiding, placement of a metal coil, application of a polymer over sheet and heating the polymer to embed the metal structures within the polymer.

Referring to FIG. 29, an example of a procedure for forming a section of reinforced catheter is shown. Polymer liner 660 is placed over mandrel 662. In the second sequential figure, braided wire 664 has been placed over the polymer liner, and commercial braiding equipment can be used for this step. As shown in the third figure of the series, a metal coil 666 is placed over braided wire 664 and a polymer cover 668 is placed over the metal coil 666. A heat source 670 can be used to heat shrink polymer cover 668 to complete the reinforced catheter section 672, as shown in the fourth sequential figure of FIG. 29.

Catheter Structures—Delivery Catheter with Elastic Guide Tip

In some embodiments, to facilitate delivery of medical devices to vessels along a circuitous route, a delivery catheter can be used with an expandable elastic tip. The delivery catheter comprises an elastic tip having an initial un-stretched diameters relatively small relative to a guidewire diameter. Due to the elasticity and small diameter guiding close tracking, the elastic tip can be guided along the guidewire following a circuitous route. Once the delivery catheter is in place, the lumen of the delivery catheter can provide a relatively low friction pathway for delivery of medical devices that would be more difficult to track solely over the guidewire. Because of the elasticity of the delivery catheter tip, the delivered medical device can be pushed out from the tip, which can expand to accommodate the device, to a treatment location in the vessel. The delivery catheter may or may not be removed following the delivery of the desired devices.

Figure 30:
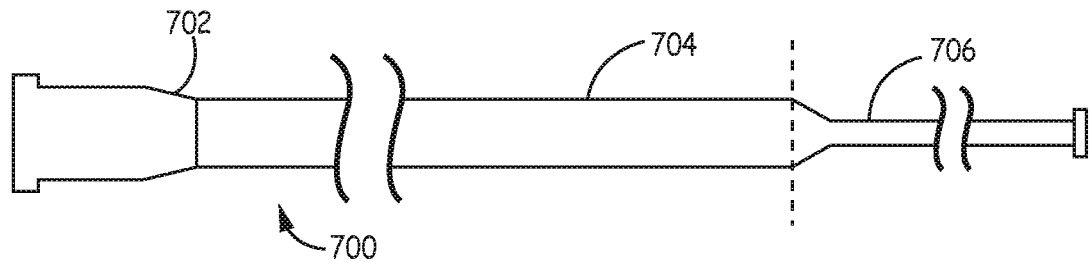
FIG. 30 is a side view of a delivery catheter having a narrow diameter elastic tip.

Referring to FIG. 30, delivery catheter 700 comprises a proximal fitting 702, tubular shaft 704 and narrow diameter elastic distal tip 706. Elastic distal tip 706 can be specified to include portions of the catheter connecting or transitioning from tubular shaft 704 to the distal tip, as shown with the dashed line in FIG. 30 since most or all of a connection/transition portion can be designed to expand to provide for the delivery of medical devices through the delivery catheter. Proximal fittings can be any suitable design, such as a conventional design, e.g., Tuohy-Borst adapter or the like, to allow for the placement of appropriate hemostatic valves or the like. Tubular shaft 704 can be designed similarly to tubular shaft 108 of FIG. 1 and can comprise metal reinforcement, such as braiding, coils or the like. Thus, the discussion of catheter materials and construction above can apply equally to tubular shaft 704 and is included here by reference without expressly repeating the language. With respect to dimensions of tubular shaft 704, the diameter can be selected to allow for passage of the largest medical device planned for delivery through the delivery catheter. Generally, tubular shaft 704 can have an outer diameter from about 1 mm to about 3.5 mm, in further embodiments from about 1.2 mm to about 3 mm, and in other embodiments from about 1.333 mm to about 2.666 mm. The length of tubular shaft 704 can be from about 30 cm to about 150 cm, in further embodiments from about 35 cm to about 130 cm and in additional embodiments from about 40 cm to about 120 cm. A person of ordinary skill in the art will recognize that additional ranges of dimensions of the tubular shaft within the explicit ranges above are contemplated and are within the present disclosure.

The elastic distal tip generally is long enough to provide its tracking function. In some embodiments, elastic distal tip 706 has a length of an approximately constant diameter section from about 5 mm to about 10 cm, in further embodiments from about 7.5 mm to about 8 cm and in other embodiments from about 1 cm to about 7 cm. The inner diameter of the distal end of elastic distal tip 706 generally can be approximately equal to the diameter of a corresponding guidewire or larger by a millimeter or less, in further embodiments, 0.75 mm or less and in some embodiments 0.5 mm or less. With respect to absolute dimensions of the inner diameter of the distal end of elastic distal tip 706, the inner diameter can be at least a factor of two smaller than the inner diameter of tubular shaft 704 and can be no more than about 2.0 mm, in further embodiments from about 0.2 mm to about 1.5 mm and in other embodiments from about 0.25 mm to about 1.25 mm. A person of ordinary skill in the art will recognize that additional ranges of elastic distal tip dimensions within the explicit ranges above are contemplated and are within the present disclosure. The elastic distal tip may have various shapes including the transition region, and as long as the tip appropriately tracks over the guidewire, the shapes are not otherwise limited. For example, the narrowest diameter portion of the elastic distal tip may be a small fraction of the total length of the elastic distal tip or a large fraction of the length of the elastic distal tip.

The materials and dimensions of the delivery catheter tip can be selected to provide for placement of a treatment structure past the delivery catheter through the expansion of the deliver catheter expandable tip. The expansion of the tip may or may not expand the polymer of tip beyond its elastic limit. If stretched beyond the polymer's elastic limit, the tip does not relax back to its original shape once the stresses are removed, but once in position, the tip's original narrow configuration is no longer used to guide the tip. Generally, the elastic tip can stretch to at least 1.5 times the initial inner diameter, in further embodiments at least about 2 times, and in other embodiments at least about 2.5 times the initial inner diameter at the distal end of the distal tip. A plurality of therapeutic devices can be sequentially delivered through the delivery catheter, and previously delivered devices may or may not be removed prior to delivery of additional devices depending on their intended use. At an appropriate time on the procedure, the delivery catheter can be removed, which may be prior to the completion of therapeutic treatments. Various elastomeric polymers can be used to form elastic distal tip 706. Suitable elastomers include, for example, rubber, synthetic rubbers (polyisoprene), polybutadiene, styrene-butadiene copolymer, nitrile rubber, silicone rubber, polyether block amides, vinylidene fluoride, polyurethane elastomers (such as Estane®, Pellethane®, Tecothane®, Tecoflex® and Carbothene™ all from Lubrizol), polychronoprene (such as Neoprene™ from PuPont) and the like.

Figure 31:
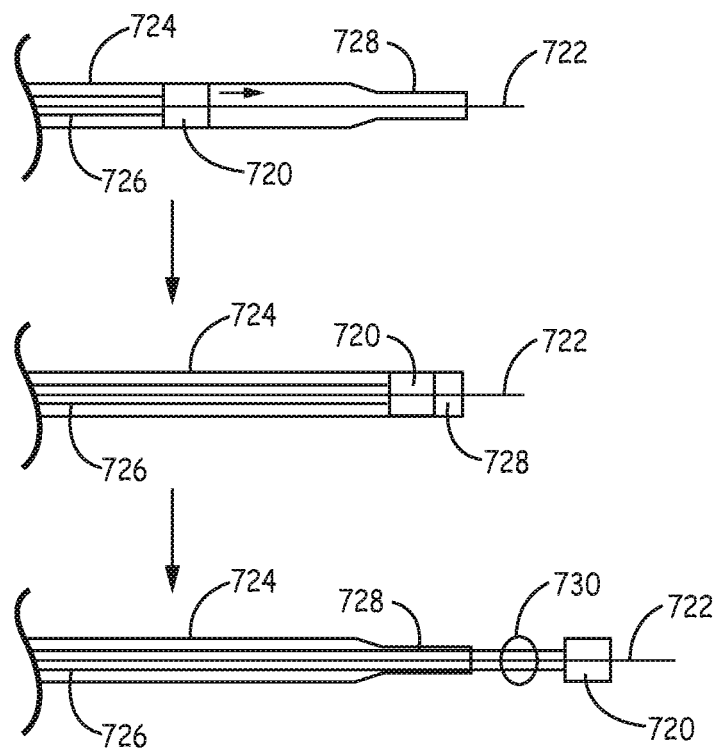
FIG. 31 depicts a series a fragmentary side views with a medical device progressively delivered with assistance of a delivery catheter of FIG. 30 in which the medical device for delivery a) is initially depicted in the proximal section of the catheter, b) is expanding the elastic tip for delivery past the elastic tip, and c) is located on the distal side of the elastic tip.

Delivery of a therapeutic device with the delivery catheter is shown schematically in FIG. 31. In the first view, first medical device 720 is delivered over guidewire 722 through delivery catheter 724, push structure 726, such as a catheter can be used to advance first medical device 720. Downward arrows indicate later stages of the procedure. In the second view, first medical device 720 is being pushed through elastic distal tip 728, which is shown in an extended state to provide for the passage of first medical device 720. Referring to the last view in FIG. 31, first medical device 720 and a second medical device 730 are shown advanced past elastic distal tip 728 of delivery catheter 724. Delivery catheter 724 may or may not be removed prior to performing additional steps of the procedure.

Treatment Systems

The suction system described herein can be used effectively to remove blood clots from the vasculature, including the vasculature of the brain to treat acute stroke conditions. In particular, the narrow tip catheter of the '313 application have performed well in human clinical trials to restore blood flow in persons with an acute embolic stroke with good patient performance. The device described herein may be expected to provide even better suction while maintaining access capability into vessels challenging to navigate. Nevertheless, for some acute stoke conditions or other embolic events, it can be desirable to use the suction catheter systems described herein with other medical tools for performing the therapy.

Figure 32:
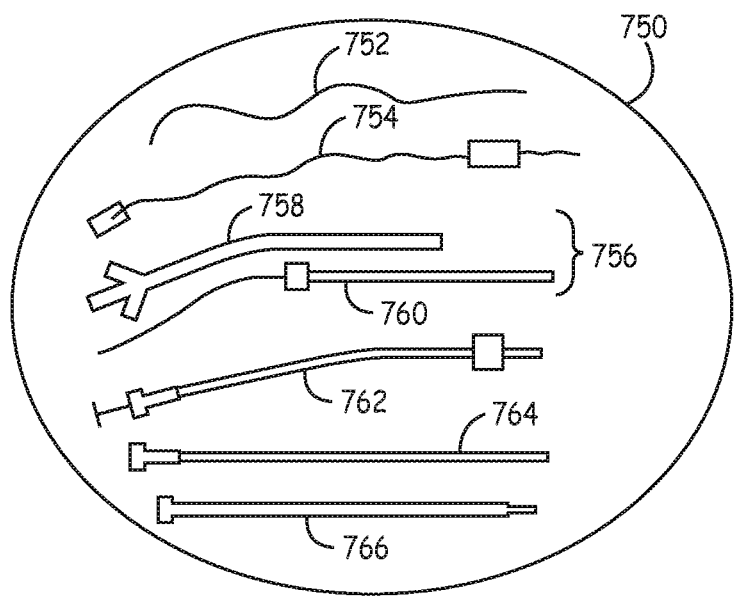
FIG. 32 is a schematic depiction of a collection of medical devices that can be used together or in selected sub-combinations for selected percutaneous procedures in bodily vessels including a suction system as described herein and a delivery catheter as described herein.

Referring to FIG. 32, a treatment system 750 is shown comprising a guidewire 752, embolic protection system 754, suction system 756, shown with guide catheter 758 and suction extension 760 separated, a percutaneous medical device 762, microcatheter 764 and delivery catheter 766.

Not all embodiments of medical systems may have all of these components, and some medical system embodiments may have multiple components of each type, such as multiple distinct percutaneous medical devices. Guidewires suitable for use in tortuous bodily vessels are described in copending published U.S. patent application 2016/0199620 A1 to Pokorney et al., entitled "Medical Guidewires for Tortuous Vessels," incorporated herein by reference. In some embodiments, embolic protection system 754 can comprise a guide structure to provide for delivery of the device as a guide wire, and for these systems a separate guidewire may or may not be used. Suction system 756 embodiments are described in detail herein, and the various embodiments described herein can be adapted for use with the medical systems as well as standalone devices. If desired for particularly challenging device delivery, the medical system can include a delivery catheter 766, as described herein.

Embolic protection devices with small filter lateral extent and designed for suitable manipulations to facilitate delivery in vessels have been developed that are suitable for use in the medical systems described herein. See, for example, U.S. Pat. No. 7,879,062B2 to Galdonik et al., entitled "Fiber Based Embolism Protection Device," and U.S. Pat. No. 8,092,483B2 to Galdonik et al., entitled "Steerable Device Having a Corewire Within a Tube and Combination with a Functional Medical Component," both of which are incorporated herein by reference. FiberNet® embolic protection devices based on the technology in these patents are commercially available from Medtronic Inc. Additional fiber-based filter devices particularly designed for delivery into tortuous vessels are described in U.S. Pat. No. 8,814,892B2 to Galdonik et al. (hereinafter the '892 patent), entitled "Embolectomy Devices and Methods of Treatment for Acute Ischemic Stroke Condition," incorporated herein by reference. The '892 patent describes the use of the filter device as a clot engagement tool for use with an aspiration catheter. The '892 patent also envisions the use of supplementary structures to facilitate engagement of the clot. The use of supplementary structures are also contemplated in procedures described herein.

Microcatheters have been designed to allow for access to small blood vessels, such as cerebral blood vessels, and cerebral microcatheters are available commercially, e.g., Prowler Select™ (Cordis Neurovascular Inc.) and Spinnaker Elite™ (Boston Scientific Co.). Of course the term microcatheter can cover a range of devices, and the present discussion can focus on catheters useful for the procedures described herein. In some embodiments, microcatheters can comprise a distal section that is narrower than a proximal section. However, in further embodiments, a microcatheter can have an approximately constant diameter along its length to facilitate delivery of other devices over the microcatheter. A narrow distal diameter allows for the catheter to navigate the tortuous vessels of the brain. The distal section can be highly flexible enough to navigate the vessels, but resilient enough to resist kinking. A microcatheter comprises at least one lumen. The microcatheter can then be used to deliver other treatment devices, aspiration, therapeutic agents, or other means of treating a condition. While microcatheters can have a selected size, in some embodiments, the microcatheters can have a distal outer diameter from about 1.0 Fr to about 3.5 Fr and in further embodiments from about 1.5 Fr to about 3 Fr, and a length from about 30 cm to about 200 cm and in further embodiments from about 45 cm to about 150 cm. A person of ordinary skill in the art will recognize that additional size ranges within the explicit ranges above are contemplated and are within the present disclosure.

With respect to percutaneous medical devices 762, suitable devices include, for example, angioplasty balloons, stent delivery devices, atherectomy devices, such as stent retrievers, and the like. Stents may be, for example, balloon extendable, self-extendable or extendable using any other reasonable mechanism. Balloon extendable stents can be crimped to the balloon for delivery. Some balloon-stent structures are described further, for example, in U.S. Pat. No. 6,106,530, entitled "Stent Delivery Device;" U.S. Pat. No. 6,364,894, entitled "Method of Making an Angioplasty Balloon Catheter;" and U.S. Pat. No. 6,156,005, entitled "Ballon [sic] Catheter For Stent Implantation," each of which are incorporated herein by reference. Self-expanding stents are described further in U.S. Pat. No. 8,764,813 to Jantzen et al., entitled "Gradually Self-Expanding Stent" and U.S. Pat. No. 8,419,786 to Cottone, Jr. et al., entitled "Self-Expanding Stent," both of which are incorporated herein by reference. Stent retrievers are described, for example, in U.S. Pat. No. 8,795,305 to Martin et al., entitled "Retrieval Systems and Methods for Use Thereof," incorporated herein by reference.

Procedures Making Use of Treatment Systems

As indicated above, the medical systems comprising a suction system described herein can be used with the suction system as stand alone treatment device, perhaps with a guidewire and/or other delivery support devices, or used with supplemental medical devices for treatment of ischemic vessel blockage. In particular, in some embodiments, the suction system is used with an embolic protection device, and in additional embodiments, some form of stent, balloon, atherectomy device or the like may also be used. In any case, a guidewire is generally used to provide access to the treatment site. The guide catheter portion of the suction device may or may not be positioned prior to the introduction of the suction extension. The structures of the particular components are described in detail above, and are not repeated so that this section can focus on the use of the devices.

Figure 33:
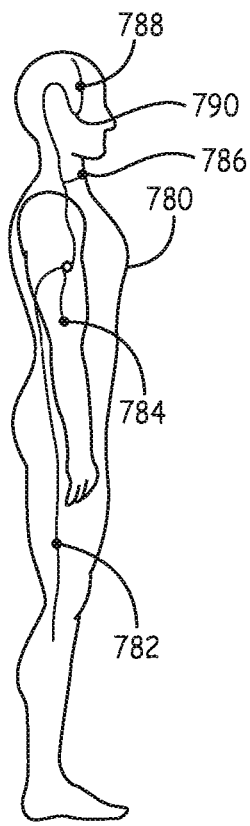
FIG. 33 is a schematic depiction of a human patient with alternative access approaches for directing catheters into the blood vessels of the brain.
Figure 34:
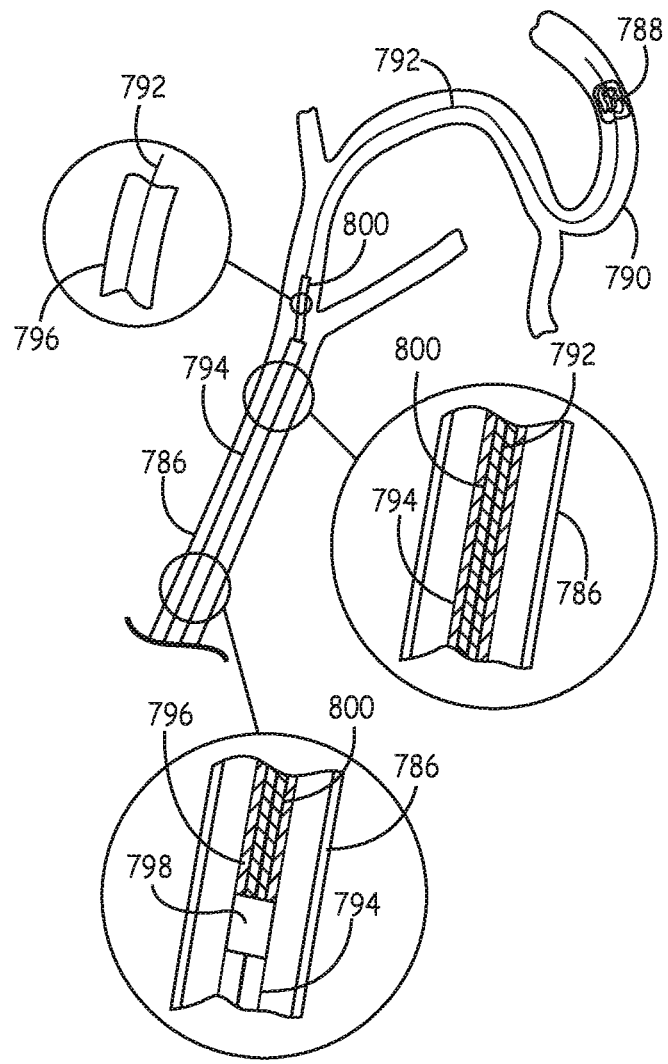
FIG. 34 is a view within a branched blood vessel section showing the delivery of medical devices along a guidewire from a guide catheter to a clot. Inserts show expanded views of two internal sections of the guide catheter.
Figure 35:
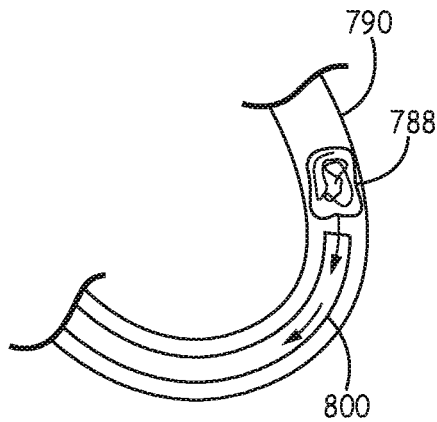
FIG. 35 is a schematic view in a section of blood vessel of a suction system being used to remove a clot.

For the treatment of an acute aschemic stroke condition, referring to FIG. 33, a patient 780 is shown with three alternative access points into the vasculature, femoral artery 782, artery in the arm 784 or carotid artery in the neck 786. Regardless of the access point, the catheter and associated devices are guided to the left or right carotid artery to reach a clot 788 in a cerebral artery 790 of the brain. Referring to the schematic view in FIG. 34, clot 788 is shown in cerebral artery 790 with a guidewire 792 positioned with its distal tip past the clot. Guide catheter 794 is positioned over the guidewire within the carotid artery 786. Suction extension 796 with proximal portion 798 within guide catheter 794 and suction tip 800 extending from guide catheter 794 over guidewire 792. Referring to FIG. 35, the suction tip can be advanced over the guidewire to a position near clot 788. Suction can be applied as shown with the flow arrows in the figure. Guidewire 792 may or may not be removed before suction is applied. Suction catheters have successfully removed clots responsible for ischemic stroke without further medical devices in the intervention. However, for more difficult clots, additional medical devices can be used as described in the following.

Figure 36:
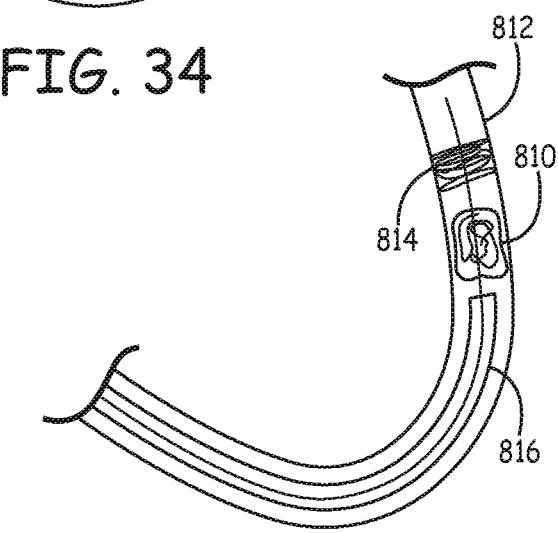
FIG. 36 is a schematic view in a section of blood vessel with a suction system positioned upstream from a clot and a fiber based filter deployed downstream from the clot.
Figure 37:
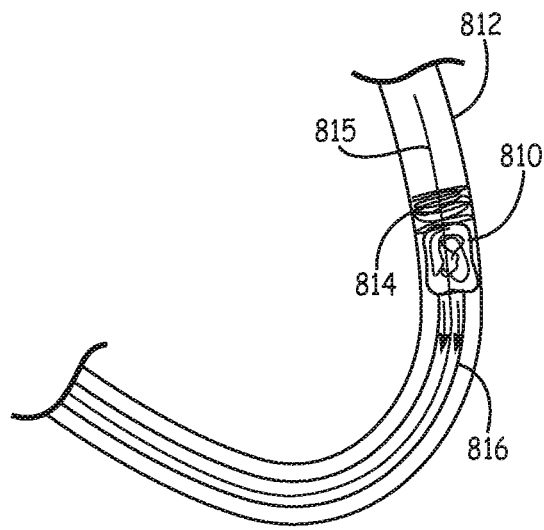
FIG. 37 is a schematic view of the section of blood vessel of FIG. 36 with the fiber based filter being drawn toward the suction tip to draw the clot to the tip for facilitating removal of the clot.

Referring to FIGS. 36 and 37, the use of a fiber-based filter device is shown in use along with the aspiration system. As shown in FIG. 36, clot 810 is shown in cerebral artery 812 with a deployed fiber-based filter 814 supported on a suction tip 816 positioned with the filter deployed past the clot. Fiber-based filter 814 can have fiber elements extending to the wall of the vessel, cerebral artery 812. Suction tip 816 can be positioned just proximal to the clot, and the remaining portions of the suction system are not shown in this view. Referring to FIG. 37, fiber-based filter 814 can be pulled toward suction tip 816 with suction being applied to facilitate removal of clot 810. Clot 810 can be broken up and removed by suction, and/or all or a portion of clot 810 can be pulled into suction tip 816 optionally along with all or part of the fiber-based filter, and/or all or a portion of clot 810 can be held to the opening of suction tip 816 with the fiber-based filter holding the clot. In any case, once the clot is appropriately stabilized, the devices and any clot still within the vessel or catheter can be removed from the patient.

Figure 38:
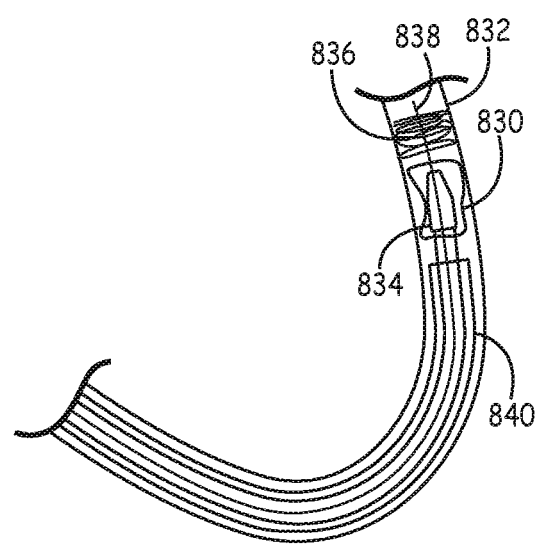
FIG. 38 is a schematic view of a section of blood vessel with a suction system positioned upstream from a clot, a fiber based filter deployed downstream from the clot and another medical device positioned at the clot.
Figure 39:
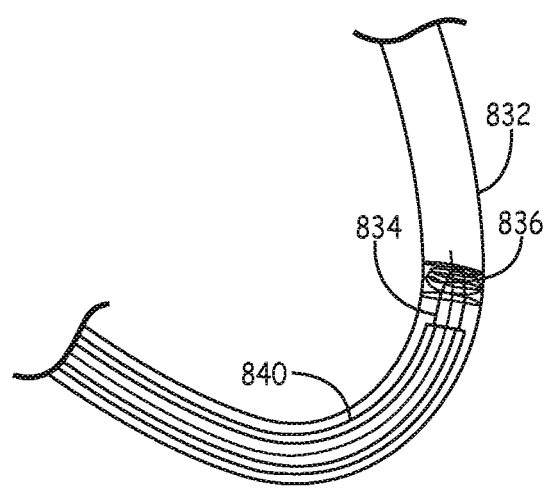
FIG. 39 is a schematic view of the section of blood vessel of FIG. 38 with the various medical devices being used in concert for the removal of the clot.

The further use of an additional medical device to facilitate clot removal is shown in FIGS. 38 and 39. As shown in FIG. 38, clot 830 is shown in cerebral artery 832 with a medical device 834 positioned at the clot and deployed fiber-based filter 836 supported on a guidewire 838 positioned with the filter deployed past the clot. Suitable medical devices include, for example, angioplasty balloons, stents delivery systems, stent retrievers, other atherectomy devices and the like, and these are described further above. The selected medical device is deployed generally with protection from the deployed fiber-based filter and optionally with suction. Once the clot is treated with the medical device, the recovery of the remaining portions of the clot and the medical devices can be removed as shown in FIG. 39, similarly to the process shown in FIG. 37. In particular, the medical device can be removed, although portions such as a stent may be left behind, and the removal can precede or be done in conjunction with removal of the filter and/or remaining fragments of clot. All or a portion of clot 830, if not already broken up and removed with suction can be pulled into suction tip 840 optionally along with all or part of the fiber-based filter, and/or all or a portion of clot 810 can be held to the opening of suction tip 840 with the fiber-based filter holding the clot. Again, once the clot is appropriately stabilized, the devices and any clot still within the vessel or catheter can be removed from the patient. The use of a plurality of additional medical devices can be performed through extension of the procedure outlined above to repeat steps involving the additional medical device.

The suction system is generally appropriately sterilized, such as with e-beam or gas sterilization. The suction system can be packaged together or separately in a sealed package, such as plastic packages known in the art. The package will be appropriately labeled, generally according to FDA or other regulatory agency regulations. The aspiration system can be packages with other components, such as a guidewire, filter device, and/or other medical device. The packaged system generally is sold with detailed instructions for use according to regulatory requirements.

Bench Testing and Calculations

To evaluate the performance of the suction tip with a substantial portion of the aspiration lumen provided by the guide catheter both bench testing and calculations were performed. Both the bench testing and calculation confirm the excellent performance of the suction systems described herein with surprising strong suction obtained with the suction tip. With respect to calculation, both fluid dynamic calculations and modeling were performed with consistent results.

Bench testing was performed with seven suction catheters: two prototype nozzle/suction system along with two MIVI Neuroscience, Inc. commercial suction catheters with a reduced diameter distal portion, and three Penumbra, Inc. suction catheters with reduced diameter distal portions. The prototype suction systems was formed without the ability to slide the suction tip position to simplify the construction, but they were based on a guide catheter used for the corresponding component of the system. FIG. 40 shows one of the prototypes, and cross sections are shown in FIGS. 41 and 42. The prototype has a standard catheter fitting (Luer Lock) 850 attached at its proximal end, a catheter shaft 852, suction tip 854 and a sealed connection 856 with a 2 mm overlap. Catheter shaft 852 including a section of the shaft extending into a designated portion of the catheter fitting 850 has a length of 31.777 inches. Catheter shaft 852 has a constant diameter (FIG. 41) with an inner diameter (ID1) of 0.90 inches and an outer diameter of 0.108 inches (2.74 mm or 8.2 Fr). Suction tip (FIG. 42) had a length of 7.8 inches, an inner diameter (ID2) of 0.054 inch and an outer diameter (OD2) of 0.065 inch (1.65 mm or 5.0 Fr). The suction tip overlapped 2 mm with catheter shaft 852, and the total length was about 1 m (39.4 inches). A second prototype was the same except for having a longer guide catheter (1 m) and a longer suction extension (0.3 m).

For comparison, bench testing was also performed with two sizes of MI-AXUS™ 6 suction catheter (MIVI Neuroscience, Inc.), and 5MAX, 5MAX ACE™ and 3MAX commercial catheters (Penumbra, Inc.). The Mi-Axus™ 6 catheter is shown in FIG. 43 and comprises a proximal fitting 870, proximal shaft 872, distal shaft 874 and transition region 876. Proximal shaft 872 (including a section of proximal shaft extending into the proximal fitting as marked), distal shaft 874, transition region 876 has a total length L MA of 50.906 inches (1.28 m). Transition region 876 has a length L TR of 0.39 inches, and distal shaft 874 has a length L DS of 9.96 inches. Proximal shaft 872 has an inner diameter (ID MA1) of 0.064 inch and an outer diameter (OD MA1) of 0.075 inch, and distal shaft 874 has an inner diameter (ID MA2) of 0.054 inch and an outer diameter (OD MA2) of 0.065 inch except for an outer diameter taper (OD MA3) to 0.058 inch over the last 0.12 inches of length of the catheter. A second MI-AXUS 6 catheter had a shorter total length of about 1.10 m. The properties of the seven catheters that were bench tested is summarized in Table 1.

TABLE 1

| Catheter | Proximal Inner Diameter (Fr) | Distal Inner Diameter (Fr) | Total Length (m) | Distal Tip Length (m) |
|---|---|---|---|---|
| Prototype 1 | 6.705 | 4.11 | 0.98 | 0.18 |
| Prototype 2 | 6.705 | 4.11 | 1.32 | 0.30 |
| MI-AXUS 6 (1) | 4.80 | 4.30 | 1.28 | 0.27 (1 cm transition) |
| MI-AXUS 6 (2) | 4.80 | 3.90 | 1.10 | 0.27 (1 cm transition) |
| 5MAX | 4.89 | 4.11 | 1.32 | |
| 5MAX ACE | 5.19 | 4.56 | 1.32 | |
| 3MAX | 3.27 | 2.67 | 1.53 | |

Figure 44:
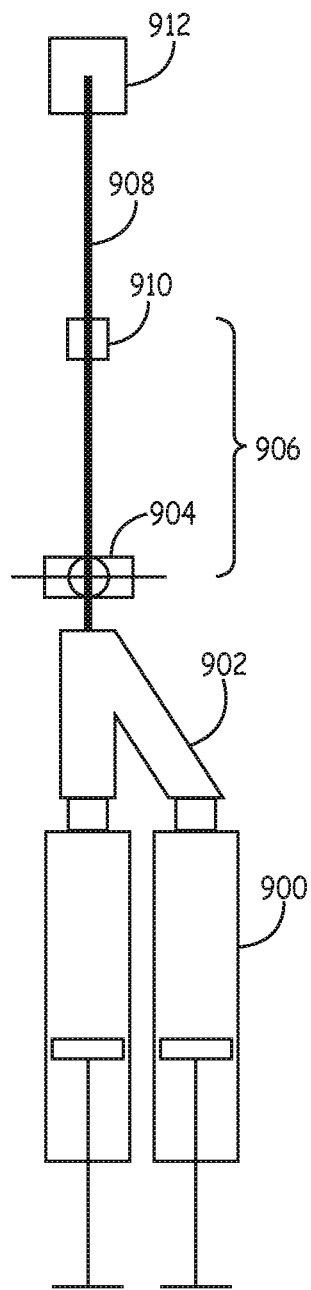
FIG. 44 is a schematic view of a catheter suction test set up used to test the suction system prototype and comparative catheters.

To conduct the bench testing, two 30 cc syringes were used in parallel with a closed stopcock. A schematic diagram of the test set up is shown in FIG. 44. A shown, two 300 cc syringes 900 are connected to a Y-adapter 902, which connects to a 2-way stopcock 904. Stopcock 904 is connected to a short length of tubing 906 that has a luer lock fitting element that then is connected to the corresponding Luer lock fitting element on the catheter 908 to form connected fitting 910. The distal end of the catheter is in a water reservoir 912. The syringes were fully retracted and locked in place. A timer was set and the valve was opened for a selected amount of time. The extracted water was then weighed to obtain an accurate reading of the amount of water. This configuration was measured to produce a maximum gauge pressure of 89 kPa and an average of roughly 78 kPa. The fluid transmission results are presented in Table 2.

TABLE 2

| Catheter | Flow Rate Measured (mL/s) | Flow Rate ANSYS (mL/s) | Flow Rate (Pipeflow)(mL/s) |
|---|---|---|---|
| Prototype 1 | 5.569 | 5.801 | 10.65 |
| Prototype 2 | 5.280 | 4.155 | 7.319 |
| MI-AXUS 6 (1) | 4.550 | 2.872 | 2.648 |
| MI-AXUS 6 (2) | 3.680 | 2.392 | 2.927 |
| 5MAX | 4.036 | 2.880 | 2.701 |
| 5MAX ACE | 4.877 | 3.180 | 3.529 |
| 3MAX | 1.342 | 0.406 | 0.463 |

The prototype catheters had significantly improved suction performance relative to all of the other catheters. Thus, based on the flow rate measurements, a flow rate of at least 5 mL/s and in some embodiments at least about 5.25 mL/s can be established with the catheter systems based on a suction pressure of −78 kPa. A person of ordinary skill in the art will recognize that additional ranges of flow rate within the explicit ranges above are contemplated and are within the present disclosure. For comparison, simulations were performed and fluid dynamics calculations were also performed. In general, the calculated values were not quantitative, but reasonably indicated trends. The ANSYS simulations were somewhat more predictive of the trends than the Pipeflow calculations, such as the correct ordering of the two Mi-AXUS flow rates.

Analytical fluid dynamic calculations were performed using a web based "Pipe Flow Calculator." The analytical calculations were available on http://www.pipeflowcalculations.net/pressuredrop.xhtmp. The following settings were used for calculations: 1060 kg/m$^3$, dynamic viscosity 3.3 centipoise, p1 1 atmosphere, and delta p −75 kPa. To perform these calculations, an average inner diameter had to be input. Calculated flow rates for the catheters used in the bench testing can be found in Table 2.

The simulation results were performed with ANSYS CFX R16.1 software (ANSYS Inc.). To perform the simulations, some assumptions were tested and determined to yield appropriate results with negligible effect on the results. A Steady State solution was determined, neglecting the impact of unsteady and turbulent effects on the flow as in the "flow regime" internal to the catheter is also well within the theoretical limit for "laminar" or steady flow. The fluid directly outside the walls of the catheter was neglected, and it was sufficient to simulate a fluid region of 5 cm forward of the distal tip. The tip was modeled as being of constant diameter, which greatly increases the regularity with which the simulation determined fluid properties at each point while reducing computational time, and while also introducing negligible, conservative inaccuracy. For both cases, the simulation assumed to have "converged" when the "residuals", i.e. the unsolved leftovers from the thousands of approximated differential equations, drop below a certain, specified threshold. This threshold, in standard practice, is 1.0×10$^{-4}$. For these simulations, the threshold was set to be 1.0×10$^{-6}$, which required more computational time, and produced more accurate results. A maximum number of iterations, i.e., the number of times the simulation refines its calculations, is in standard practice 100.

The fluid region is set to be a homogenous fluid, of density 1060 kg/m$^3$, dynamic viscosity of 3.3 centipoise, and temperature equal 20 degrees C. with no heat transfer. Two simulations were done for each geometric configuration. To determine volumetric flow rate in cc/s, a 75 kPa pressure difference was then applied as a boundary condition between the proximal and distal ends of the fluid region. For determining the pressure loss, a mass flow rate was specified across the proximal and distal ends of the fluid region. Simulated flow rates for the catheters used in the bench testing are found in Table 2.

In the spirit of evaluating additional prototype performance using simulation and calculations, additional evaluations were performed with a range of catheter dimensions using both ANSYS and the pipe flow calculator. The catheter parameters are found in Table 3 and the results are presented in Table 4.

TABLE 3

| Model Catheter | Proximal Inner Diameter (Fr) | Distal Inner Diameter (Fr) | Total Length (m) | Distal Tip Length (m) |
|---|---|---|---|---|
| Straight 1 | 6.00 | 6.00 | 1.20 | — |
| Straight 2 | 5.00 | 5.00 | 1.20 | — |
| Straight 3 | 2.10 | 2.10 | 1.20 | — |
| Straight 4 | 4.88 | 4.88 | 1.32 | — |
| Straight 5 | 5.18 | 5.18 | 1.32 | — |
| Extended Tip 1 | 8.00 | 6.00 | 1.20 | 0.20 |
| Extended Tip 2 | 4.00 | 2.10 | 1.20 | 0.20 |
| Extended Tip 3 | 6.81 | 3.90 | 1.20 | 0.60 |
| Extended Tip 4 | 6.81 | 3.90 | 1.20 | 1.00 |
| Extended Tip 5 | 6.705 | 4.70 | 1.32 | 0.30 |
| Extended Tip 6 | 6.705 | 4.60 | 1.32 | 0.30 |
| Extended Tip 7 | 6.705 | 4.50 | 1.32 | 0.30 |
| Extended Tip 8 | 6.705 | 4.25 | 1.32 | 0.30 |
| Extended Tip 9 | 6.705 | 4.11 | 1.20 | 0.30 |
| Extended Tip 10 | 6.705 | 4.88 | 1.32 | 0.30 |
| Extended Tip 11 | 6.705 | 2.10 | 1.50 | 0.60 |

TABLE 4

| Catheter | Pressure Drop ANSYS (kPa) | Flow Rate ANSYS (mL/s) | Flow Rate (Pipeflow)(mL/s) |
|---|---|---|---|
| Straight 1 | — | 3.360 | 7.437 |
| Straight 2 | — | — | 3.590 |
| Straight 3 | — | 0.008 | 0.112 |
| Straight 4 | 88.05 | — | 2.959 |
| Straight 5 | 69.31 | — | 3.756 |
| Extended Tip 1 | — | 8.030 | 13.26 |
| Extended Tip 2 | — | 0.044 | 1.060 |
| Extended Tip 3 | — | 4.084 | 4.772 |
| Extended Tip 4 | — | 3.162 | 2.112 |
| Extended Tip 5 | 41.77 | 5.682 | 7.960 |
| Extended Tip 6 | 43.83 | 5.460 | 7.858 |
| Extended Tip 7 | 46.14 | 5.212 | 7.714 |
| Extended Tip 8 | 53.24 | 4.533 | 7.463 |
| Extended Tip 9 | — | 5.387 | 7.739 |
| Extended Tip 10 | 38.53 | 6.147 | 8.218 |
| Extended Tip 11 | — | 0.311 | 2.561 |

As demonstrated by these experiments and calculations, the suction catheter systems described herein can achieve improve suction through a narrow tip that can be used to access remote blood vessels.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A suction catheter system comprising:
a guide catheter comprising a tubular shaft with a central lumen having an inner diameter, a proximal end and a distal opening, and a proximal section operably connected with the proximal end of the tubular shaft and having fittings that connect to a suction device; and
a suction extension comprising:
a proximal portion comprising a polymer tube having a metal reinforcement structure embedded within the polymer tube;
a suction tip comprising a distal opening and extending from the proximal portion in a distal direction; and
a control structure comprising a distal end region coupled to the proximal portion,
wherein the suction tip has a distal inner diameter that is from about 20 percent to about 90 percent of the central lumen inner diameter,
wherein the proximal portion is configured to slide within the central lumen of the tubular shaft to change the relative position of the proximal portion within the central lumen and provide for at least a portion of the suction extension to extend outward from the distal opening of the tubular shaft at appropriate configurations of the proximal portion,
wherein the distal end region of the control structure couples to the metal reinforcement structure and is embedded within the polymer tube of the proximal portion forming a sealing region with the central lumen of the guide catheter, and
wherein a seal provided by the sealing region forms a suction lumen extending from the fittings configured to connect to the suction device through a portion of the central lumen, the proximal portion, and the suction tip to the distal opening.

2. The suction catheter system of claim 1, wherein the guide catheter comprises a stop configured to retain a portion of the proximal portion of the suction extension within the central lumen.

3. The suction catheter system of claim 1, wherein the proximal portion comprises a deformable element.

4. The suction catheter system of claim 3, wherein the deformable element has an engaged configuration where the proximal portion is at a fixed location within the central lumen and wherein the deformable element has an unengaged configuration where the proximal portion is configured to slide within the central lumen of the tubular shaft.

5. The suction catheter system of claim 4, wherein the deformable element engages with a rod that can apply mechanical force to extend the deformable element.

6. The suction catheter system of claim 4, wherein the deformable element engages with conductive wires that actuate engagement upon the application of current.

7. The suction catheter system of claim 6, wherein the deformable element comprises a magnet.

8. The suction catheter system of claim 4, wherein the deformable element is a bulge formed by a slidable loop engaging a circular ramp.

9. The suction catheter system of claim 4, wherein the deformable element is a bulge formed by a pivot ring.

10. The suction catheter system of claim 4, wherein the deformable element is a balloon located around the circumference of the proximal portion.

11. The suction catheter system of claim 10, wherein an interior of the balloon is in fluid communication with a fluid source.

12. The suction catheter system of claim 1, wherein the metal reinforcement structure is a braided wire and/or a coil.

13. The suction catheter system of claim 12, wherein the coil is a flat wire having a dimension of 0.0005"-0.003".

14. The suction catheter system of claim 12, wherein the coil has a pitch from about 0.005" to about 0.100".

15. The suction catheter system of claim 1, wherein the polymer tube is a heat shrink polymer jacket positioned over the metal reinforcement structure.

16. The suction catheter system of claim 15, further comprising a polymer liner.

17. The suction catheter system of claim 1, wherein a difference between an outer diameter of the proximal portion and the inner diameter of the central lumen is no more than about 127 microns.

18. The suction catheter system of claim 17, wherein the suction extension further comprises a lubricious coating along an outer surface of the suction extension.

19. The suction catheter system of claim 1, wherein the suction tip of the suction extension has a length of about 3 cm to about 50 cm.

20. The suction catheter system of claim 19, wherein the proximal portion of the suction extension has a length of about 5 mm to about 25 cm.

21. The suction catheter system of claim 20, wherein the guide catheter tubular shaft has a length of about 30 cm to about 150 cm.

22. The suction catheter system of claim 1, wherein the distal inner diameter of the suction tip is about 0.667 mm to about 2 mm.

\* \* \* \* \*